United States Patent [19]

Ishihara et al.

[11] Patent Number: 5,710,334
[45] Date of Patent: Jan. 20, 1998

[54] AROMATIC DINITRO AND DIAMINO INTERMEDIATES

[75] Inventors: Yuko Ishihara; Mitsunori Matsuo, both of Kanagawa-ken; Keizaburo Yamaguchi, Chiba-ken; Akihiro Yamaguchi, Kanagawa-ken, all of Japan

[73] Assignee: Mitsui Toatsu Chemicals, Inc., Tokyo, Japan

[21] Appl. No.: 453,073

[22] Filed: May 26, 1995

Related U.S. Application Data

[60] Division of Ser. No. 280,551, Jul. 26, 1994, Pat. No. 5,480,965, which is a continuation-in-part of Ser. No. 63,322, May 19, 1993, abandoned.

[30] Foreign Application Priority Data

| May 25, 1992 | [JP] | Japan | 4-132081 |
| Sep. 28, 1992 | [JP] | Japan | 4-258004 |
| Nov. 12, 1992 | [JP] | Japan | 4-302270 |
| Feb. 19, 1993 | [JP] | Japan | 5-030082 |
| Mar. 17, 1993 | [JP] | Japan | 5-056977 |
| Aug. 18, 1993 | [JP] | Japan | 5-203871 |
| Dec. 27, 1993 | [JP] | Japan | 5-331996 |
| Jun. 8, 1994 | [JP] | Japan | 6-126128 |

[51] Int. Cl.[6] .................. C07C 217/84; C07C 217/90
[52] U.S. Cl. ........................... 561/328; 568/306
[58] Field of Search .................. 564/328, 329; 568/306

[56] References Cited

U.S. PATENT DOCUMENTS

| 4,405,770 | 9/1983 | Schoenberg et al. | 526/259 |
| 4,489,185 | 12/1984 | Schoenberg | 524/104 |
| 4,588,804 | 5/1986 | Pryd | 528/125 |
| 5,116,939 | 5/1992 | Fletcher et al. | 528/420 |
| 5,231,160 | 7/1993 | Tamai et al. | 528/125 |

FOREIGN PATENT DOCUMENTS

| 313407 | 4/1989 | European Pat. Off. |
| 474501 | 3/1992 | European Pat. Off. |
| 572196 | 12/1993 | European Pat. Off. |
| 3701249 | 7/1988 | Germany |
| 1-113461 | 5/1989 | Japan |

OTHER PUBLICATIONS

Volz et al., Chemical Abstracts, vol. 113, abstract 211746, 1990.
Model, Chemical Abstracts, vol. 91, abstract 212574, 1979.
Gorvin et al., Chemical Abstracts, vol. 91, abstract 157570, 1979.
Suzuki et al., Chemical Abstracts, vol. 73, abstract 78636, 1970.

(List continued on next page.)

*Primary Examiner*—Richard L. Raymond
*Attorney, Agent, or Firm*—Burns, Doane, Swecker & Mathis

[57] ABSTRACT

This invention relates to a novel thermoplastic and amorphous polyimide which is readily soluble in organic solvent, a novel aromatic diamino compound used for the polyimide, a preparation process thereof, a polyimide-based resin composition comprising the thermoplastic polyimide and a fibrous reinforcement, a process for preparing the resin composition, an injection molded article of the resin composition, a polyimide-based composite obtained by molding the above soluble and thermoplastic polyimide in combination with a fibrous reinforcement, and a fibrous reinforcement having a surface modified with the above polyimide.

The polyimide comprise a requisite structural unit having one or more recurring structural units of the formula:

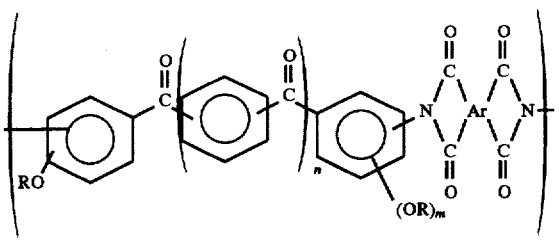

wherein m and n are individually an integer of 0 or 1, and R is

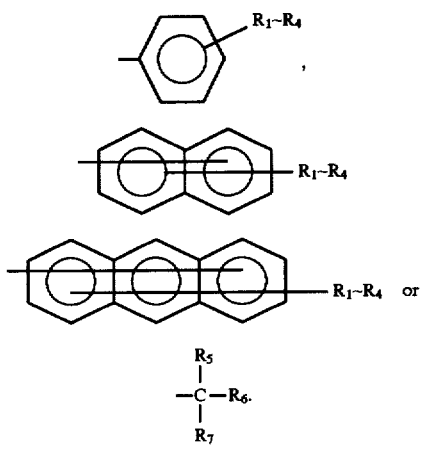

The polyimide of the invention is essentially amorphous, excellent in melt flow stability in the decreased temperature as compared with conventionally known polyimide and has greatly improved processability.

The polyimide of the invention obtained by using a novel aromatic diamino compound as a monomer can control various properties such as melt flow ability and solubility in solvents by side chains and not by principal chain of polyimide. Thus, excellent melt flow property and solubility in solvents can be obtained while maintaining high heat resistance and adhesive property which are derived from benzophenone structure of the diamino compound of the the invention.

7 Claims, 8 Drawing Sheets

OTHER PUBLICATIONS

Asanuma et al., Chemical Abstracts, vol. 123, abstract 230772, 1995.

Gorvin, Chemical Abstracts, vol. 120, abstract 244617, 1993.

Srivastava et al., Chemical Abstracts, vol. 120, abstract 323289, 1993.

Nowakowski et al., Chemical Abstracts, vol. 115, abstract 49137, 1990.

Patent Abstracts of Japan, vol. 10, No. 112 (C–342), Apr. 25, 1986.

Polymer Letters Edition, vol. 13, pp. 701–709 (1975).

Polymer Letters Edition, vol. 12, pp. 697–710 (1974).

Chemical Abstracts, vol. 110, No. 96035d, 1989.

AROMATIC DINITRO AND DIAMINO INTERMEDIATES

CROSS REFERENCE TO RELATED APPLICATION

This application is a divisional of application Ser. No. 08/280,551, filed Jul. 26, 1994, now U.S. Pat. No. 5,480,965, which is a continuation-in-part of application Ser. No. 08/063,322 filed on May 19, 1993, now abandoned.

BACKGROUND OF THE INVENTION

1. Field of the Invention

The present invention relates to a novel polyimide, a process for preparing the polyimide, a novel aromatic diamino compound used for preparing the polyimide, and a process for preparing the aromatic diamino compound. More particularly, the invention relates to a novel, thermoplastic and amorphous polyimide which is readily soluble in organic solvents and a process for preparing the polyimide.

The novel aromatic diamino compound of the invention is useful for preparing the polyimide of the invention and can also be used as a raw material for other polyimides, polyamides, polyamideimides, bismaleimides and epoxy resins, and as a curing agent for other maleimide compounds and epoxy compounds.

The present invention further relates to a soluble and thermoplastic polyimide-based resin composition, a process for preparing the resin composition and an injection molded article of the resin composition. More particularly, the invention relates to a polyimide-based resin composition comprising a thermoplastic polyimide having good solubility in general purpose organic solvents and a fibrous reinforcement such as carbon fiber, glass fiber, aromatic polyamide fiber and/or a potassium titanate fiber; a process for preparing the polyimide base resin composition; and an injection molded article prepared from the polyimide-based resin composition.

The present invention more further relates to a polyimide-based composite, and more particularly relates to a polyimide-based laminated composite obtained by molding the above soluble and thermoplastic polyimide in combination with a fibrous reinforcement and a process for molding the same.

The present invention still further relates to a fibrous reinforcement having a surface modified with the above polyimide.

The fibrous reinforcement having a surface modified with the above polyimide which can be used for the invention has an improved applicability. That is, polyimide used for the invention can be applied as a surface modifier for the fibrous reinforcement particularly in the form of a solution.

2. Related Art of the Invention

Recently, materials composed of heat resistant resin have been required to satisfy thermal and mechanical properties as well as flexibility in a composite. The material are also required to have other properties such as processability.

Polyimide resin has received attention as a material that can satisfy these requirements.

Conventionally, polyimide has been excellent in mechanical properties, chemical resistance, flame retardance and electrical properties in addition to its essentially excellent heat resistance. Consequently, polyimide has been widely used in many fields such as processing materials, composite materials and electric and electronic devices.

However, polyimide resin has the disadvantage of poor processability. A typically known polyimide is, for example, an aromatic polyimide prepared from 4,4'-diaminodiphenyl ether and pyromellitic dianhydride and having recurring structural units of the formula (A):

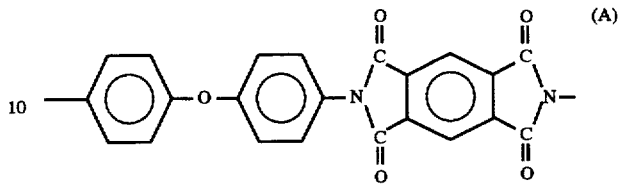

(Trade Mark: Kapton and Vespel, manufactured by E. I. Du Pont de Nemours & Co.). The polyimide is insoluble and infusible and must be molded by special techniques such as sintering of powder. Molded articles having complex shapes are difficult to obtain by the technique and sintered products must be further finished by cutting or other operations to obtain satisfactory articles. Thus, the polyimide has a great disadvantage of high processing cost and cannot be used for polyimide varnish. Consequently, research and development on soluble or fusible (thermoplastic) polyimide has been extensively carried out in order to provide processability for polyimide.

Soluble polyimide is expected in the future to be used for heat resistant varnish, coating and sealant. Solubilizing methods are summarized, for example, in "Polyimide Resin" published by Technical Information Association (1991). The methods include an increase in the molecular chain flexibility by introducing a flexible bond or by conducting copolymerization and increasing the mutual action with a solvent by introducing an alkyl group. Most of the soluble polyimides, however, can be soluble only in high boiling point solvents such as N-methyl-2-pyrrolidone, N,N-dimethylacetamide and cresol as disclosed in, for example, Japanese Laid-Open Patent Sho 61-130342. The soluble polyimide also has a problem of containing a sulfonyl group which has a high moisture absorption. A series of recent Japanese Laid-Open Patents has disclosed polyimide which is soluble in low boiling point solvents such as acetone, toluene and dichloromethane. Such polyimide, however, has a disadvantage that an alkyl group having poor heat resistance is present in the molecular chain as disclosed in, for example, Japanese Laid-Open Patent Hei 1-263116, 1-263117 and 2-160832.

On the other hand, various soluble (thermoplastic) polyimides have also been developed. For example, an improvement of the raw material diamine component has also been tried to improve in order to eliminate the above disadvantage.

Polyimide has been known to be capable of having its transition temperature and melt flowability controlled by changing a bonding radical in the monomer units or by introducing a folded structure into the molecule. For example, polyimide LARC TPI from NASA is prepared from 3,3'-diaminobenzophenone and benzophenonetetracarboxylic dianhydride and has a fundamental skeleton of the formula (B) below. The polyimide has been further improved and thermoplastic polyimide has been developed by reacting 1,3-bis(3-aminobenzoyl)benzene with various tetracarboxylic dianhydrides (Japanese Patent Application Hei 03-223930).

Such polyimide exhibits excellent heat resistance and adhesive property. On the other hand, the melt flow property is still insufficient and the polyimide is primarily used in the form of polyamic acid varnish. Such varnish has a difficulty in treating the moisture formed in the final step of hot ring-closure from polyamic acid to polyimide, and leads to a problem of void generation in the adhesive layer.

As a result, it is a disadvantage that the desired property is difficult as an exhibit and the application step as an adhesive is complex.

The present inventors have controlled the molecular weight of the polymer having the fundamental skeleton of the formula (B):

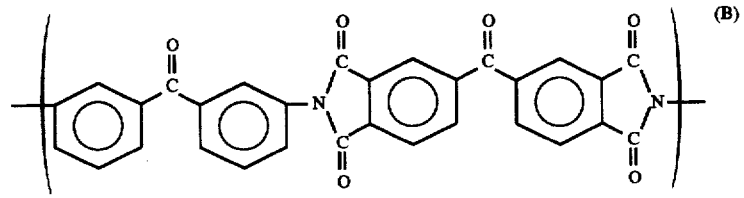

by capping the reactive end of the polymer chain and found polyimide which can be injection molded and extruded as disclosed in Japanese Laid-Open Patent Hei 2-018419.

The polyimide powder thus obtained, however, has a melting point of around 340° C. and must be converted to amorphous form in order to use the powder for processing or adhesion.

Further, the polyimide of the above formula (B) can be used for an adhesive having excellent heat resistance and is now primarily used for adhesion of metals, prepregs, ceramics and polyimide films of FPC base material and is expected to develop in a further broad field of adhesive by making the best use of the excellent thermoplasticity.

Polyimide has been conventionally applied to for adhesive purposes by the following methods.
1) Varnish of polyamic acid precursor is applied to an adhesive surface and hot-pressed to perform adhesion through solvent removal and imidization.
2) A polyimide film is inserted between adhesive surfaces and hot-pressed to perform adhesion.
3) Polyimide powder is suspended in a volatile solvent, successively applied to the adhesive surface, subjected to solvent removal by evaporation and hot-pressed to perform adhesion.

The method 3) is particularly advantageous in view of simple procedures and is often used. Development of polyimide which can be applied to the method has been desired.

It is clear in the method that adhesion cannot be performed unless the melting point of the polyimide powder is exceeded.

In many research experiments, polyimide powder was suspended in a solvent, a prepreg was prepared by impregnating the suspension into a carbon cloth, and a composite was prepared from the prepreg and used for a structured material. In such procedures, a processing temperature exceeding the melting point of polyimide is required as in the case of the above method 3).

Thus, development of polyimide having good solubility and fusibility has been strongly desired in view of processing temperature and adhesion temperature.

Provision of polyimide having increased solubility in organic solvents or having a decreased melting point due to conversion of the polyimide powder from crystalline structure to amorphous structure as a substitute for polyimide of the formula (B) which is essentially excellent in various properties while insoluble in almost organic solvents has a great contribution to the improvement of processability and adhesive property of polyimide, extension of fields of use, and improvement and rationalization of application methods.

However, the polyimide has also poor solubility in the general purpose organic solvents although thermoplasticity is provided, and thus it has been difficult to impregnate fibrous reinforcements with a solution of the polyimide.

Further, the polyimide has led to the above problems because of low resistance to water and moisture absorption as compared with conventional engineering plastics.

One of the techniques utilizing the heat resistance and mechanical strengths of polyimide is to apply the polyimide in the form of a composite material in combination with glass fiber or carbon fiber. Non-thermoplastic polyimide is usually applied to such process. A fibrous material is generally impregnated with a solution of polyamic acid precursor of the polyimide, the solvent is removed by evaporation and thereafter imidization and curing are simultaneously carried out by hot compression molding (Japanese Laid-Open Patent SHO 60-240740 and 61-235437). The process, however, requires imidization and molding to be conducted at the same time and is liable to cause voids and other defects due to water generated by imidization.

Utilization of thermoplastic polyimide has been proposed as a countermeasure against these difficulties (Japanese Laid-Open Patent HEI 01-113461 and 03-199234). In such a case, however, polyimide is insufficient in melt-flowability though heat-resistant and thermoplastic, and it has been found difficult to completely inhibit generation of voids and other defects as in the above process of using polyamic acid.

As mentioned above, known polyimide has problems of water generated in the imidization step, although good impregnation of fibrous materials can be carried out by using the solution of polyamic acid precursor even in the case of non-thermoplastic polyimide.

On the other hand, thermoplastic polyimide has no problem of generating water and other low molecular weight substances.

However, flowability of polyimide is unsatisfactory, fibrous materials can not be fully impregnated with polyimide, and thus it has been difficult to obtain molded articles having excellent properties.

Fibrous reinforcements which are used for various resin composites are modified on the surface depending upon the kind of resin to be reinforced in order to enhance compatibility with the resin and to improve properties of the composite obtained.

For example, carbon fiber is excellent in high elasticity and light-weight properties in a variety of fibrous reinforcement is very suited for a reinforcement of super heat resistant resins such as polyimide, polyether ether ketone, polyether sulfone, polyetherimide and polyphenylene sulfide, improves mechanical strength and other properties, and can be used as an excellent material of automotive and machinery parts.

Conventionally, it has been widely known to modify a surface of carbon fiber with epoxy resin. Epoxy resin, however, is effective as a surface modifier for a matrix of thermosetting resin such as epoxy resin whereas often has poor adhesion to a matrix of thermoplastic resin. Thus, carbon fiber modified with epoxy resin has not sufficiently improved mechanical strength and other properties of molded articles. As a result, polyamide resin has been tried to use as a surface modifier of carbon fiber and other fibrous reinforcements for the matrix of thermoplastic resin in Japanese Laid-Open Patent SHO 53-106752.

However, in the case of using super heat-resistant thermoplastic resin as a matrix, molding is conducted at a high temperature exceeding 300° C. and thus the surface modifier of polyamide resin is heat decomposed in the course of molding and leads to problems such as formation of voids and reduction of weld strength. Polyimide resin has not provided a satisfactory surface modifier. On the other hand, it has been proposed to use polyether imide resin and polyimide resin which have excellent heat resistance as surface modifiers for solving the above problem of heat decomposition in Japanese Laid-Open Patent SHO 62 -299580 and 64-40569. However, problems have been found concerning the adhesion between these resins and the matrix of thermoplastic resin. A surface modifier and a surface-modified fibrous reinforcement which can sufficiently exhibit modification effect have not yet been found.

SUMMARY OF THE INVENTION

The first object of the invention is to provide a thermoplastic and amorphous polyimide which has high solubility in organic solvents and good processability in addition to exhibiting the essentially excellent heat resistance of polyimide. More particularly, the object is to provide an amorphous polyimide powder which essentially has the excellent heat resistance of polyimide of the above formula (B) and additionally can be processed at a temperature lower than conventional, that is, at a temperature lower than the melting point 340° C. of the polyimide of the formula (B).

The second object of the invention is to provide a heat resistant adhesive and adhesion method which have essentially excellent heat resistance of polyimide of the formula (B) and additionally can conduct adhesion at a temperature lower than conventional, that is, at temperature lower than the melting point 340° C. of the polyimide of the formula (B).

The third object of the invention is to provide polyimide having high solubility in low boiling point organic solvents.

The fourth object of the invention is to provide a novel aromatic diamino compound which can provide processability and flexibility in the resulting polyimide and is therefor useful as a raw material of polyimide for adhesive.

The fifth object of the invention is to provide a polyimide-based resin composition which has essentially high heat resistance and other excellent properties of polyimide resin, and additionally is excellent in resistance to absorption of water and moisture and can maintain excellent mechanical properties even under conditions of high temperature and high humidity; a process for preparing the polyimide-based resin composition; and a molded article obtained by using the composition.

The sixth object of the invention is to provide a polyimide-based laminated composite which has the above properties and does not generate structural defects and a process for preparing composite.

The seventh object of the invention is to provide a fibrous reinforcement which has a surface improved with polyimide having the above properties.

As a result of an intensive investigation in order to achieve the above objects, the present inventors have found that polyimide derived from aromatic diamine having a specific structure as a monomer ingredient is a thermoplastic and amorphous polyimide having high solubility and excellent processability without giving adverse effect on the essential properties of polyimide. Thus, the invention has been completed.

The inventors have also found a novel aromatic diamino compound which is useful as a monomer of polyimide having these properties, succeeded in preparing the compound, and thus the present invention has been completed.

The inventors have further found that a polyimide-based resin composition, polyimide-based laminated composite and a surface-modified fibrous reinforcement which have excellent heat resistance, mechanical properties and resistance to water and moisture absorption can be prepared by using polyimide of the below formula (1) which has an excellent solubility in solvents; that use of polyimide of the formula (1) in the form of a solution can provide a polyimide composite which does not generate structural defects, an efficient production of the polyimide-based resin composition and a surface modification of the fibrous reinforcement; and that a molded article of polyimide having particularly excellent resistance to water and moisture absorption can be prepared from the polyimide based resin composition. Thus, the present invention has been completed.

That is, one aspect of the present invention is;

1) A polyimide comprising a requisite structural unit consisting of one or more recurring structural units of the formula (1):

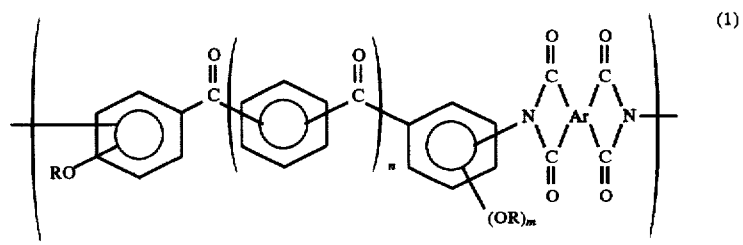

wherein m and n are individually an integer of 0 or 1, and R is

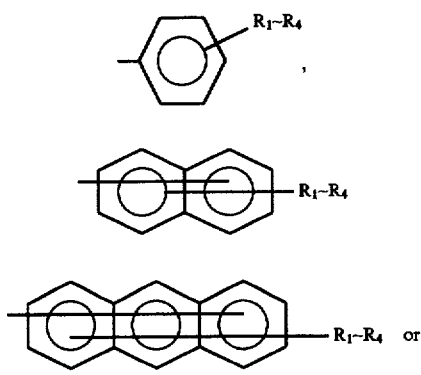

-continued

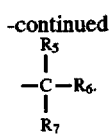

wherein $R_1$, $R_2$, $R_3$ and $R_4$ are individually a hydrogen atom, halogen atom, alkyl having 1 to 8 carbon atoms, aryl, alkenyl, aralkyl or alkoxy having 1 to 5 carbon atoms; $R_5$, $R_6$ and $R_7$ are individually a hydrogen atom, alkyl having 1 to 8 carbon atoms, aryl, alkenyl, aralkyl or ω-alkyloxyoligo(alkyleneoxy)alkyl having 1 to 10 carbon atoms and 1 to 3 oxygen atoms; and Ar is a tetravalent radical having 2 to 27 carbon atoms and being selected from group consisting of an aliphatic radical, alicyclic radical, monoaromatic radical, condensed polyaromatic radical and noncondensed aromatic radical connected to each other with a direct bond or a bridge member.

2) A polyimide comprising a requisite structural unit consisting of one or more recurring structural units of the formula (1):

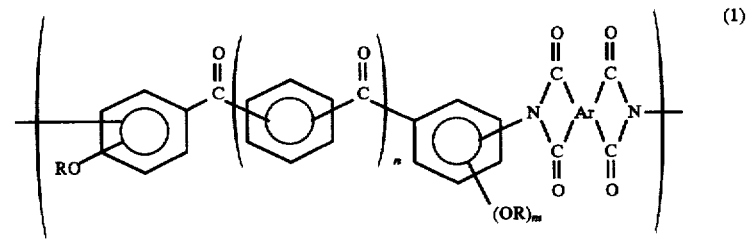

wherein m, n, R and Ar are the same as above, and having at the polymer chain end thereof an aromatic ring which is essentially unsubstituted or substituted with a radical having no reactivity with amine and/or dicarboxylic anhydride.

3) A polyimide of 1) or 2) wherein the polyimide having recurring structural units of the formula (1) is derived from a precursor polyamic acid having an inherent viscosity of 0.01 to 3.0 dl/g at 35° C. in a dimethylacetamide solution at a concentration of 0.5 g/dl.

4) A polyimide of 1) or 2) wherein the polyimide having recurring structural units of the formula (1) has an inherent viscosity of 0.01 to 3.0 dl/g at 35° C. at a concentration of 0.5 g/dl in a solvent mixture composed of 9 parts by weight of p-chlorophenol and 1 part by weight of phenol.

5) A polyimide comprising a requisite structural unit consisting of one or more recurring structural units of the formula (2):

having 2 to 27 carbon atoms and being selected from the group consisting of an aliphatic radical, alicyclic radical, monoaromatic radical, condensed polyaromatic radical and noncondensed aromatic radical connected to each other with a direct bond or a bridge member.

6) A polyimide comprising a requisite structural unit consisting of one or more recurring structural units of the formula (2):

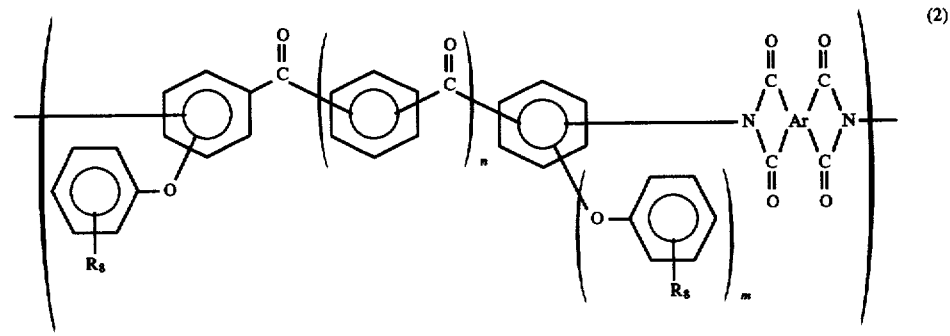

wherein m and n are individually an integer of 0 or 1, $R_8$ is a hydrogen atom, halogen atom, alkyl having 1 to 4 carbon atoms, alkoxy or phenyl, and Ar is a tetravalent radical

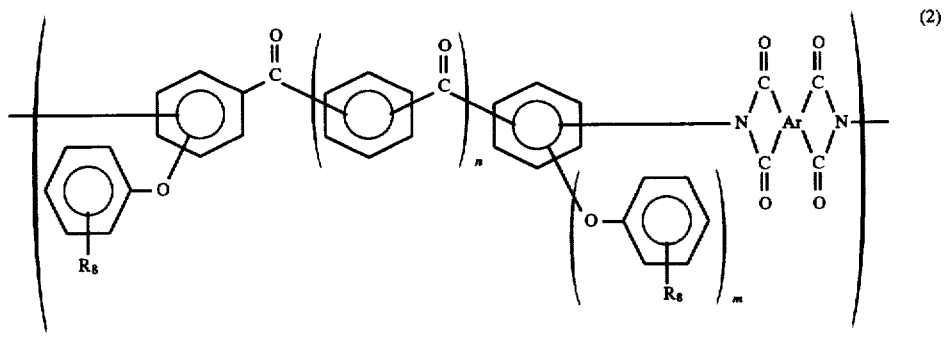

wherein m, n, $R_8$ and Ar are the same as above, and having at the polymer chain end thereof a radical which is essentially unsubstituted or substituted with a radical having no reactivity with amine and/or dicarboxylic anhydride.

7) A polyimide comprising a requisite structural unit consisting of one or more recurring structural units selected from the group consisting of ① the units of the formula (3);

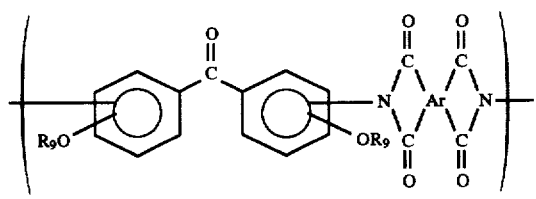

wherein $R_9$ is

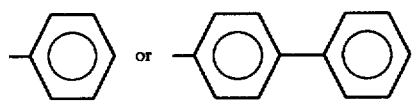

and Ar is a tetravalent radical having 2 to 27 carbon atoms and being selected from the group consisting of aliphatic radical, alicyclic radical, monoaromatic radical, condensed polyaromatic radical and noncondensed aromatic radical connected to each other with a direct bond or a bridge member, ② the units of the formula (4):

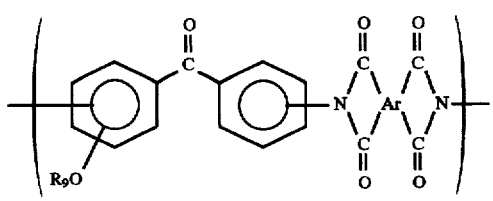

wherein $R_9$ and Ar are the same as above, and

③ the units of the formula (5):

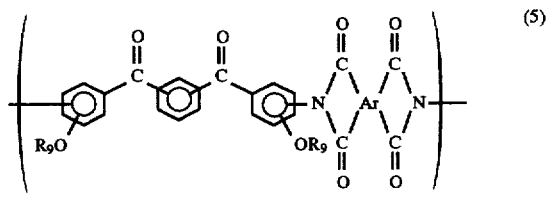

wherein $R_9$ and Ar are the same as above, or said polyimide having at the polymer chain end thereof a radical which is essentially unsubstituted or substituted with a radical having no reactivity with amine and/or dicarboxylic anhydride.

8) A polyimide copolymer comprising a requisite structural unit consisting of 1 to 99% by mol of recurring structural units of the formula (1):

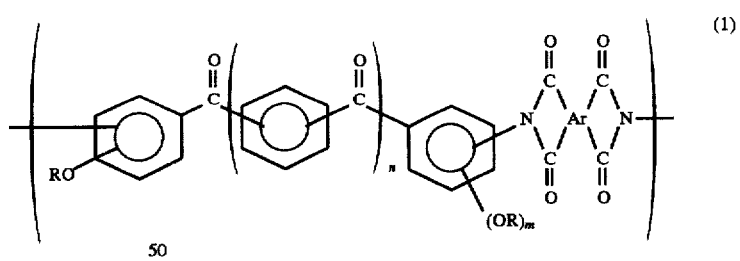

wherein m, n, R and Ar are the same as above, 99 to 1% by mol of recurring structural units of the formula (6):

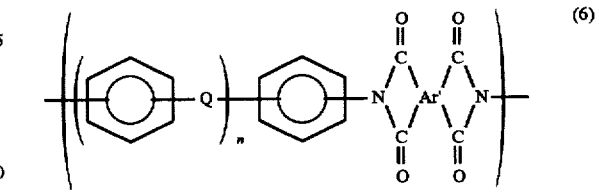

wherein n is an integer of 0 to 5, Q is a direct bond, —O—, —S—, —CO—, —$SO_2$—, —$CH_2$—, —$C(CH_3)_2$— or —$C(CF_3)_2$— and may be the same or different when aromatic rings are connected to each other with two or more connecting radicals Q, and Ar' is a tetravalent radical having 2 to 27 carbon atoms and being selected from the group consisting of an aliphatic radical, alicyclic radical, monoaromatic radical, condensed polyaromatic radical and noncondensed aromatic radical connected to each other with a direct bond or a bridge member, or said polyimide copolymer having at the polymer chain end a radical which is essentially unsubstituted or substituted with a radical having no reactivity with amine and/or dicarboxylic anhydride.

9) A polyimide copolymer comprising a requisite structural unit consisting of 1 to 99% by mol of recurring structural units of the formula (2):

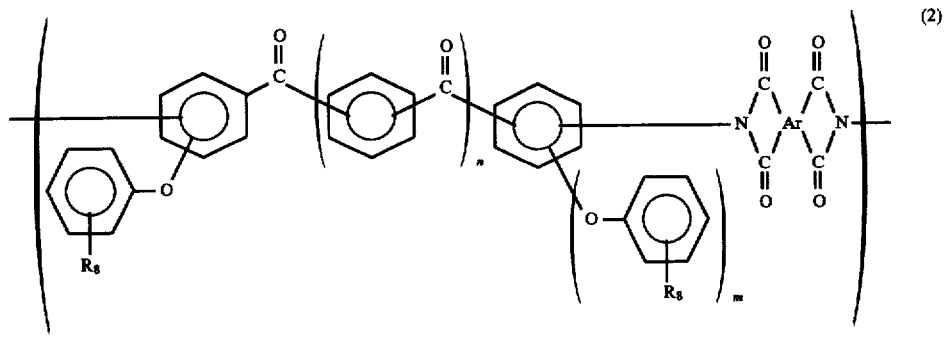

wherein m and n are individually an integer of 0 or 1, $R_8$ is a hydrogen atom, halogen atom, alkyl of 1 to 4 carbon atoms, alkoxy or phenyl, and Ar is a tetravalent radical having 2 to 27 carbon atoms and being selected from the group consisting of an aliphatic radical, alicyclic radical, monoaromatic radical, condensed polyaromatic radical and noncondensed aromatic radical connected to each other with a direct bond or a bridge member, and 99 to 1% by mol of recrring structural units of the formula (6):

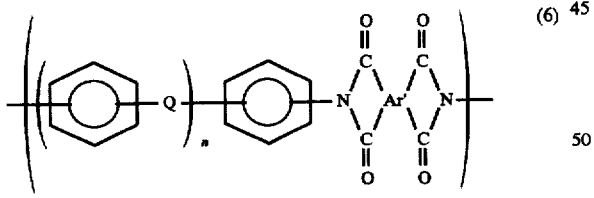

wherein n, Q and Ar' are the same as above, or said polyimide copolymer having at the polymer chain end a radical which is essentially unsubstituted or substituted with a radical having no reactivity with amine and/or dicarboxylic anhydride.

10) A polyimide copolymer comprising two or more recurring strutural units of the formula (1) described in claim 1 or said polyimide copolymer having at the polymer chain end a radical which is essentially unsubstituted or substituted with a radical having no reactivity with amine and/or dicarboxylic anhydride.

Another aspect of the present invention is a process for preparing these polyimide homopolymers and copolymers, that is:

11) A process for preparing a polyimide having a requisite structural unit consising of one or more recurring structurel units of the formula (1):

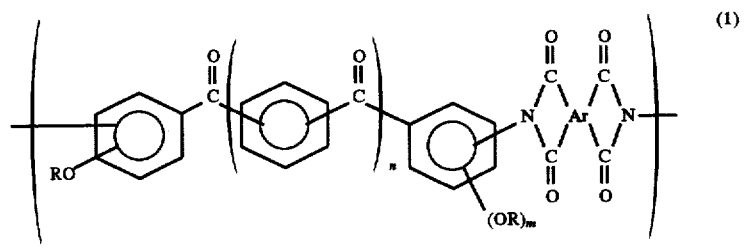

wherein m, n, R and Ar are the same as above, comprising reacting aromatic diamine essentially consisting of one or more aromatic diamino compounds of the formula (7):

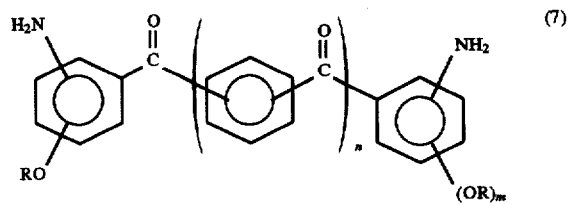

wherein m, n and R are the same as above, with tetracarboxylic dianhydride primarily having the formula (8):

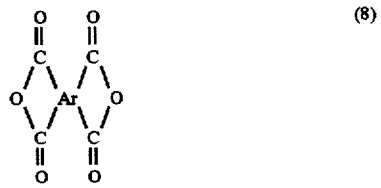

wherein Ar is a tetravalent radical having 2 to 27 carbon atoms and being selected from the group consisting of an aliphatic radical, alicyclic radical, monoaromatic radical, condensed polyaromatic radical and noncondensed aromatic radical connected to each other with a direct bond or a bridge member, and thermally or chemically imidizing the resultant polyamic acid.

12) A process for preparing a polyimide having a requisite structural unit consisting of one or more recurring structural units of the formula (1):

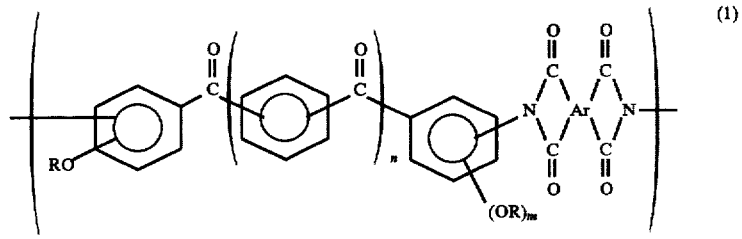

wherein m, n, R and Ar are the same as above, and having at the polymer chain end a radical which is essentially unsubstituted or substituted with a radical having no reactivity with amine and/or dicarboxylic anhydride, comprising reacting aromatic diamine essentially consisting of one or more of aromatic diamino of the formula (7):

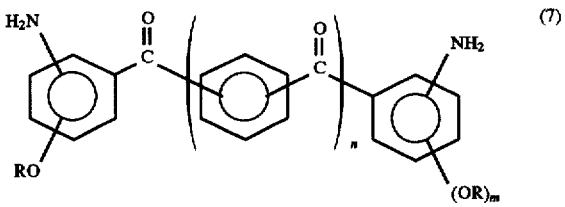

wherein m, n and R are the same as above, with tetracarboxylic dianhydride primarily having the formula (8):

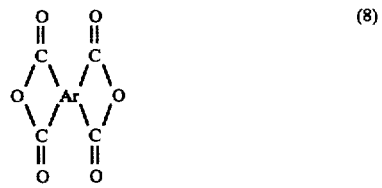

wherein Ar is the same as above, in the presence of aromatic dicarboxylic anhydride of the formula (9):

wherein Z is a divalent radical having 6 to 15 carbon atoms and being selected from the group consisting of a monoaromatic radical, condensed polyaromatic radical and noncondensed aromatic radical connected to each other with a direct bond or a bridge member, and/or aromatic monoamine of the formula (10):

$$Z_1-NH_2 \qquad (10)$$

wherein $Z_1$ is a monovalent radical having 6 to 15 carbon atoms and being selected from the group consisting of a monoaromatic radical, condensed polyaromatic radical and noncondensed aromatic radical connected to each other with a direct bond or a bridge member, and thermally or chemically imidizing the resultant polyamic acid.

In these processes, the preferred aromatic dicarboxylic anhydride is phthalic anhydride and the preferred aromatic monoamine is aniline. Amount of aromatic dicarboxylic anhydride (phthalic anhydride) is 0.001 to 1.0 mol per mol of aromatic diamine. Amount of aromatic monoamine (aniline) is 0.001 to 1.0 mol per mol of aromatic tetracarboxylic dianhydride.

Still another aspect of the present invention is a novel aromatic diamino compound and the raw material aromatic dinitro compound, that is, 13) An aromatic dinitro compound of the formula (11);

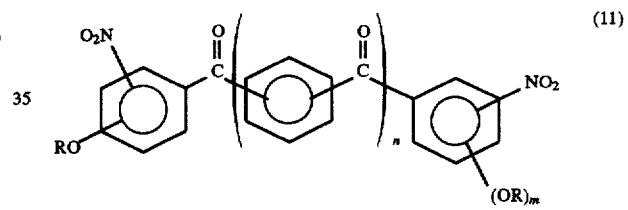

wherein m, n and R are the same as in the formula (1).

14) An aromatic diamino compound of the formula (7):

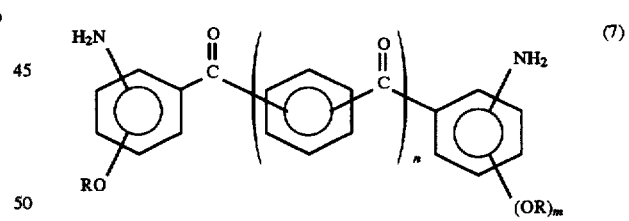

wherein m, n and R are the same as in the formula (1).

15) An aromatic diamino compound of the formula (12):

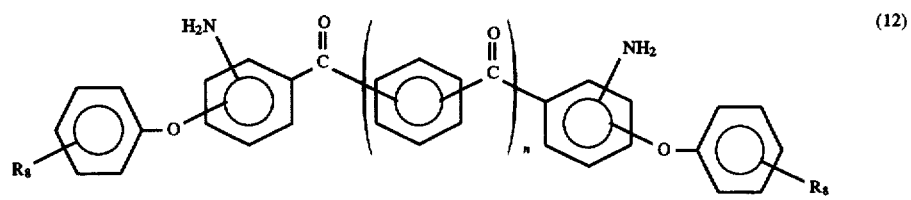

wherein n is an integer of 0 or 1, and $R_8$ is a hydrogen atom, halogen atom, alkyl of 1 to 4 carbon atoms, alkoxy or phenyl.

16) An aromatic diamino compound of the formula (13):

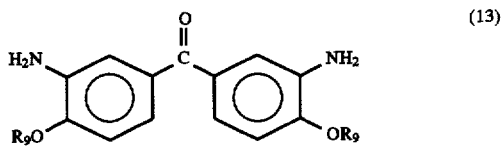
(13)

wherein R₉ is

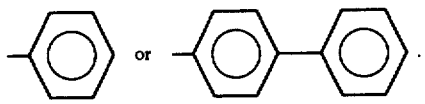

17) An aromatic diamino compound of the formula (14):

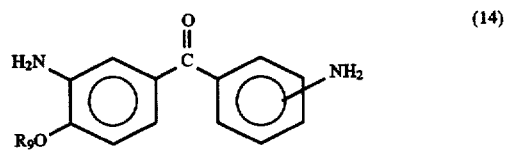
(14)

wherein R₉ is the same as above.

18) An aromatic diamino compound of the formula (15):

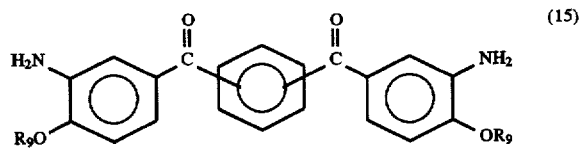
(15)

wherein R₉ is the same as above.

A still further aspect of the present invention is a process for preparing these aromatic diamino compounds.

20) A process for preparing an aromatic diamino compound of the formula (7):

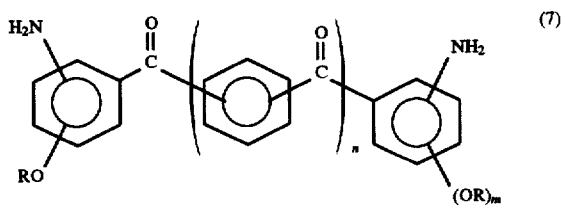
(7)

wherein m and n are individually an integer of 0 or 1, and R is

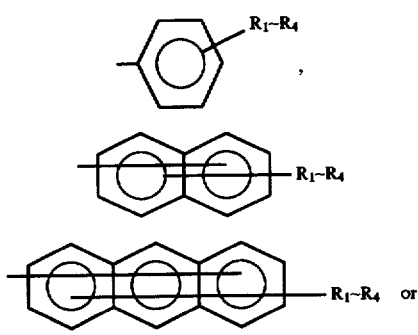

-continued

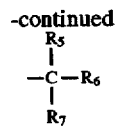

wherein $R_1$, $R_2$, $R_3$ and $R_4$ are individually a hydrogen atom, halogen atom, alkyl having 1 to 8 carbon atoms, aryl, alkenyl, aralkyl or alkoxy having 1 to 5 carbon atoms; $R_5$, $R_6$ and $R_7$ are individually a hydrogen atom, alkyl having 1 to 8 carbon atoms, aryl, alkenyl, aralkyl or ω-alkyloxyoligo (alkyleneoxy)alkyl having 1 to 10 carbon atoms and 1 to 3 oxygen atoms; and Ar is a tetravalent radical having 2 to 27 carbon atoms and being selected from group consisting of an aliphatic radical, alicyclic radical, monoaromatic radical, condensed polyaromatic radical and noncondensed aromatic radical connected to each other with a direct bond or a bridge member, comprising carrying out condensation of a dinitro compound of the formula (16):

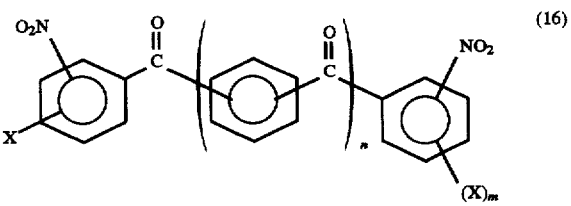
(16)

wherein X is a halogen atom, and m and n are individually an integer of 0 or 1, and a hydroxy compound of the formula (17):

R—OH (17)

wherein R is the same as above, in an aprotic polar solvent in the presence of a base to obtain an aromatic dinitro compound of the formula (11):

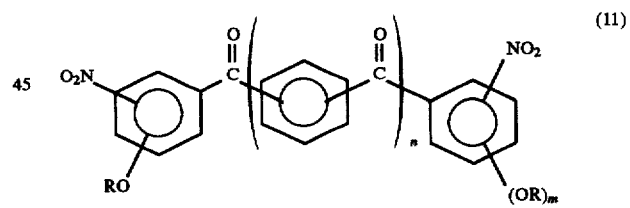
(11)

wherein m, n and R are the same as above, and successively reducing the aromatic dinitro compound.

Further, still another aspect of the invention is a polyimide-based resin composition, polyimide based resin composite, especially, multi-layered composite or a reinforcement having surface modified by the polyimide of the present invention, that is:

a polyimide based resin composition comprising a polyimide having a requisite structural unit consisting of one or more recurring structural units of the formula (1):

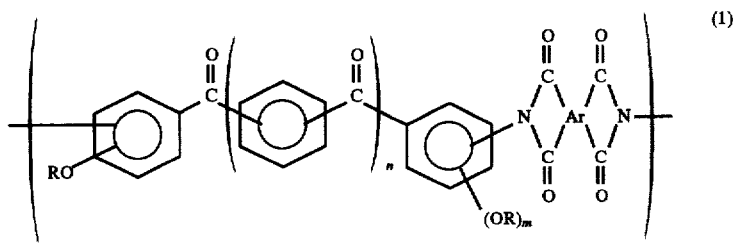

wherein m, n, R and Ar are the same as above, and a fibrous reinforcement;

- a polyimide-based resin composition composition wherein the polyimide has an inherent viscosity of 0.3 dl/g or more;
- a polyimide-based resin composition comprising 0.5–65 parts by weight of a fibrous reinforcement for 100 parts by weight of the polyimide;
- a composition of a polyimide having recurring structural units of the above formula (1) wherein the polymer chain end is capped with aromatic dicarboxylic anhydride and/or aromatic monoamine, that is, an end-capped polyimide obtained by conducting the preparation reaction in the presence of an aromatic dicarboxylic anhydride of the formula (9):

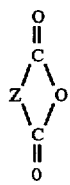
(9)

wherein Z is a divalent radical having 6~15 carbon atoms and being selected from the group consisting of a monoaromatic radical, condensed polyaromatic radical and noncondensed aromatic radical connected to each other with a direct bond or a bridge member, and/or aromatic monoamine represented by the formula (10):

$$Z_1-NH_2 \qquad (10)$$

wherein $Z_1$ is a monovalent radical having 6~15 carbon atoms and being selected from the group consisting of a monoaromatic radical, condensed polyaromatic radical or noncondensed aromatic radical connected to each other with a direct bond or a bridge member;

- a polyimide-based resin composition comprising the end-capped polyimide;
- a process for preparing these resin compositions;
- a polyimide-based composite in practice, a polyimide-based laminated composite obtained by impregnating a fibrous reinforcement with polyimide which is soluble in a solvent and heat-fusible under impregnating conditions and has recurring structural units of the formula (1) and successively by laminating and molding the resultant prepreg;
- a fibrous reinforcement having a surface which is modified by using polyimide, practically a solution of polyimide, having recurring structural units of the above formula (1), preferred polyimide of the formula (1) is obtained by heat-reacting a diamine compound of the formula (13-1):

and/or a diamine compound of the formula (15-1):

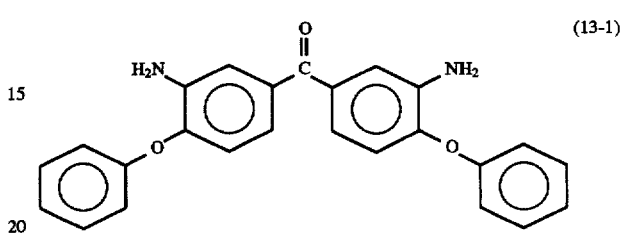

with one or more tetracarboxylic dianhydride selected from pyromellitic dianhydride, benzophenone tetracarboxylic dianhydride, biphenyltetracarboxylic dianhydride, diphenylethertetracarboxylic dianhydride, naphthalenetetracarboxylic dianhydride, bis(dicarboxyphenyl)sulfone dianhydride, bis[(dicarboxyphenyl)phenyl]propane dianhydride, bis(dicarboxyphenyl)propane dianhydride, bis(dicarboxyphenyl)benzene dianhydride and bis(dicarboxyphenyl)hexafluoropropane dianhydride; and preferred fibrous reinforcement is carbon fiber having a surface modified with a surface modifier comprising the polyimide; and

- a polyimide-based composite and a surface-modified fibrous reinforcement wherein the polyimide is obtained by heat-reacting a diamine compound with tetracarboxylic dianhydride in the presence of dicarboxylic acid dianhydride and/or aromatic monoamine, the polyimide comprises end-capped polyimide obtained by the process.

The fiber-surface modifier comprising polyimide of the invention is practically used in the form of powder or a solution and can be marketed.

The polyimide of the invention is essentially amorphous, is excellent in melt flow stability at a lower temperature as compared with conventionally known polyimide, has greatly improved processability and can be applied to structural materials because of its high elastic modulus. That is, the polyimide of the invention obtained by using a novel aromatic diamino compound as a monomer can control various properties such as melt flow ability and solubility in solvents by side chains and not by the principal chain of the polyimide. Thus, excellent melt flow property and solubility in solvents can be obtained while maintaining high heat resistance and adhesive property which are derived from the benzophenone structure of the diamino compound of the invention.

Further, the polyimide of the invention can exhibit satisfactory adhesive strength at relatively decreased temperatures and can hence be applied to adhesive. The polyimide is soluble in general purpose organic solvents such as chloroform and thus can also be used in the form of polyimide varnish. In the case being used as an adhesive, the polyimide is previously ring-closed and can be used as varnish in the state of imide. As a result, a conventional disadvantage of void generation due to moisture can also be eliminated. Hot press type adhesion can also be carried out by using a polyimide film.

DETAILED DESCRIPTION OF THE INVENTION

Figure 1:
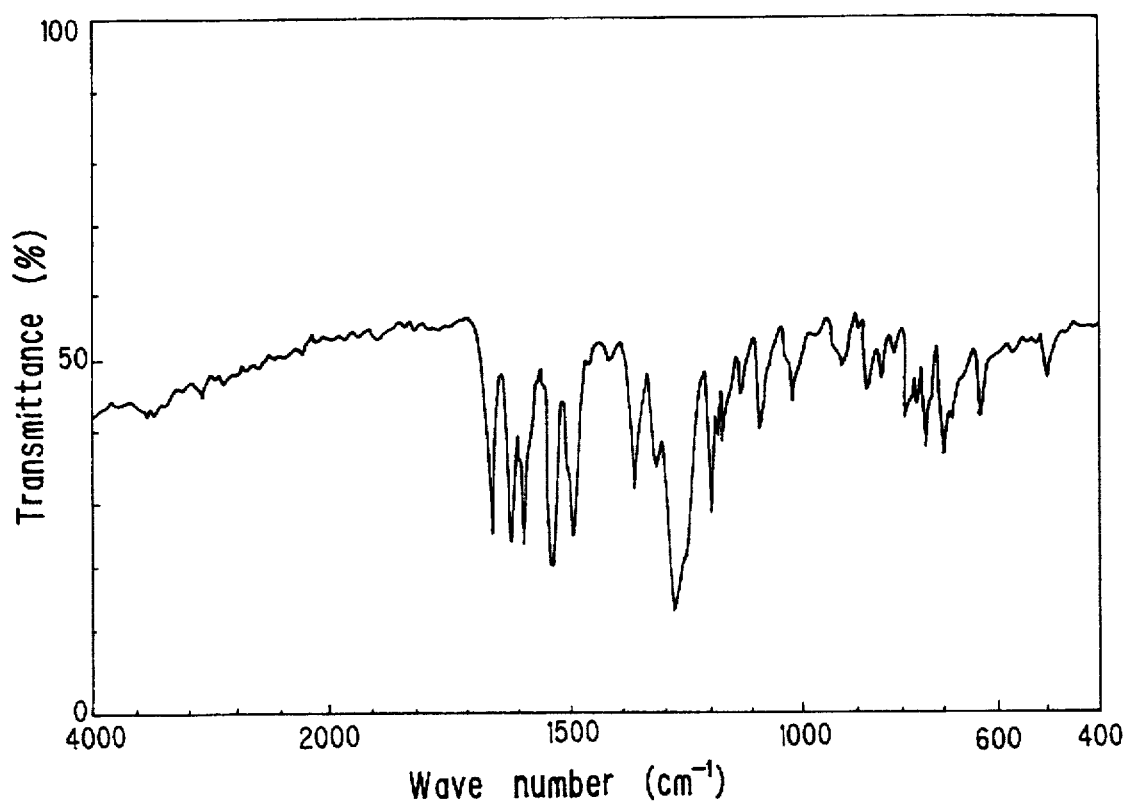
FIG. 1 illustrates an infrared absorption spectrum of 3,3'-dinitro-4-phenoxybenzophenone obtained in Example 3.

The polyimide of the invention comprises a requisite structural unit consisting of one or more recurring structural units of the formula (1):

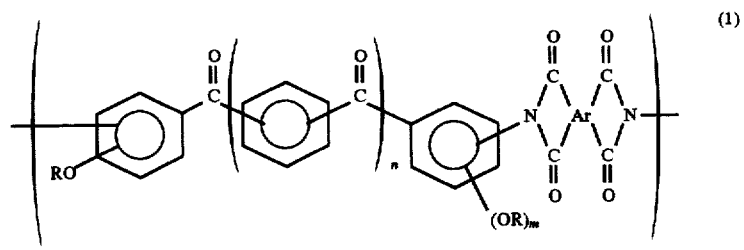

wherein m and n are individually an integer of 0 or 1, and R is

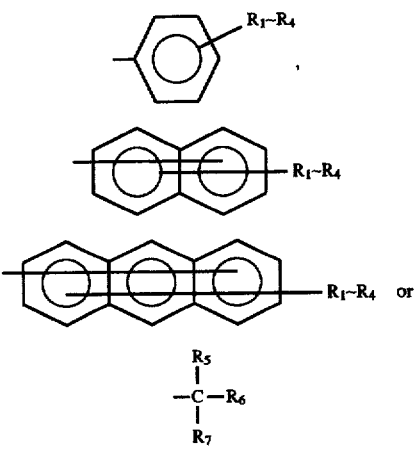

wherein $R_1$, $R_2$, $R_3$ and $R_4$ are individually a hydrogen atom, halogen atom, alkyl having 1 to 8 carbon atoms, aryl, alkenyl, aralkyl or alkoxy having 1 to 5 carbon atoms, and $R_5$, $R_6$ and $R_7$ are individually a hydrogen atom, alkyl of 1 to 8 carbon atoms, aryl, alkenyl, aralkyl or ω-alkyloxyoligo (alkyleneoxy)alkyl having 1 to 10 carbon atoms and 1 to 3 oxygen atoms, and Ar is a tetravalent radical having 2 to 27 carbon atoms and being selected from the group consisting of an aliphatic radical, alicyclic radical, monoaromatic radical, condensed polyaromatic radical and noncondensed aromatic radical connected to each other with a direct bond or a bridge member.

That is, one aspect of the invention is a polyimide comprising a requisite structural unit having recurring structural units of the formula (1), and more specifically, can be a homopolymer having one of the recurring structural units of the formula (1) or can be a copolymer having two or more of the recurring structural units. The polyimide of the invention can also be a copolymer of recurring structural units of the formula (1) and other recurring structural units of polyimide in the range giving no adverse effect on the properties of polyimide of the invention. Further, the polyimide of the invention can have at the polymer chain end an aromatic ring which is essentially unsubstituted or substituted with a radical having no reactivity for amine and dicarboxylic anhydride. That is, the polyimide of the invention can be capped at the polymer chain end thereof with an aromatic dicarboxylic anhydride of the formula (9):

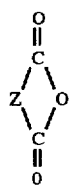 (9)

wherein Z is a divalent radical having 6 to 15 carbon atoms and being selected from the group consisting of a monoaromatic radical, condensed polyaromatic radical and noncondensed aromatic radical connected to each other with a direct bond or a bridge member, and/or aromatic monoamine of the formula (10):

 (10)

wherein $Z_1$ is a monovalent radical having 6 to 15 carbon atoms and being selected from the group consisting of a monoaromatic radical, condensed polyaromatic radical and noncondensed aromatic radical connected to each other with a direct bond or a bridge member.

Preferred aromatic polyimide is capped at the polymer chain end thereof with phthalic anhydride and/or aniline.

The polyimide of the invention includes a polyimide homopolymer having one of the above recurring structural units, a polyimide copolymer having two or more of the above recurring structural units, a mixture of two or more of said polyimide homopolymer and/or said polyimide copolymers, a polyimide copolymer having the recurring structural units of the formula (1) and other recurring structural units which are comprised in a proportion giving no adverse effect on the essential properties of polyimide, and a mixture of polyimide having one or more recurring structural units of the formula (1) and polyimide having said other recurring structural units.

Consequently, when the polyimide of the invention is a polyimide copolymer having two or more recurring structural units of the formula(1) or a mixture of polyimide, the polyimide has two or more recurring structural units wherein one or more radicals selected from m, n, Ar and R in the formula (1) are different from each other.

The polyimide of the invention can be prepared by reacting the raw material monomers, aromatic diamine and aromatic tetracarboxylic dianhydride in the absence or presence of aromatic dicarboxylic anhydride and/or aromatic monoamine and by thermally or chemically imidizing the resulting polyamic acid.

Aromatic diamine used for preparing these polyimides essentially consists of one or more of aromatic diamino compound of the formula (7):

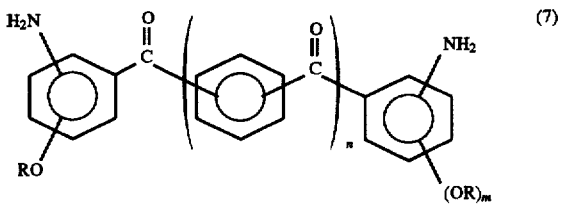 (7)

wherein m and n are individually an integer of 0 or 1, and R is

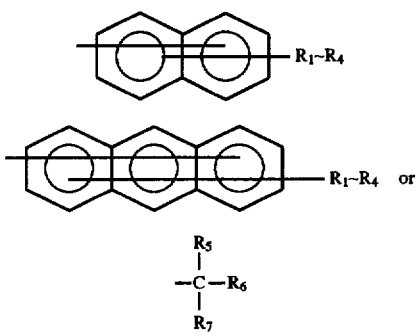

wherein $R_1$, $R_2$, $R_3$ and $R_4$ are individually a hydrogen atom, halogen atom alkyl having 1 to 8 carbon atoms, aryl, alkenyl, aralkyl or alkoxy having 1 to 5 carbon atoms, and $R_4$, $R_5$ and $R_6$ are individually a hydrogen atom, alkyl having 1 to 8 carbon atoms aryl, alkenyl, aralkyl or ω-alkyloxyoligo (alkyleneoxy) alkyl having 1 to 10 carbon atoms and 1 to 3 oxygen atoms. Preferred aromatic diamine is an aromatic diamine compound of formula (12):

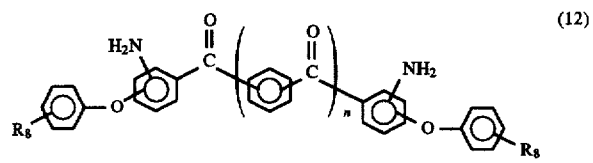 (12)

wherein n is an integer of 0 or 1, and $R_8$ is hydrogen atom, halogen atom, alkyl having 1 to 4 carbon atoms, alkoxy and phenyl.

More preferred aromatic diamine is aromatic diamino compounds the formula (13):

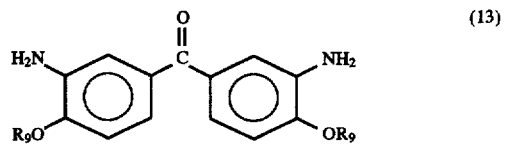 (13)

wherein R, is

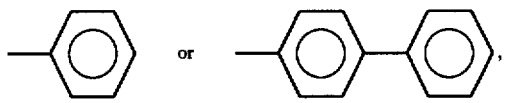

the formula (14):

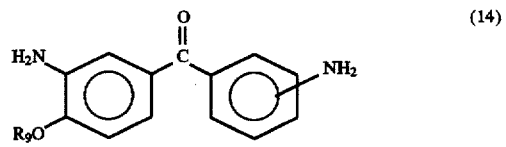 (14)

wherein $R_9$ is same as above, and the formula (15):

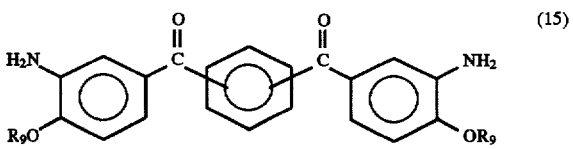 (15)

wherein $R_9$ is same as above.

Exemplary aromatic diamino compounds which can be used are 3,3'-diamino-4,4'-diphenoxybenzophenone,
4,4'-diamino-5,5'-diphenoxybenzophenone,
3,4'-diamino-4,5'-diphenoxybenzophenone,
3,3'-diamino-4-phenoxybenzophenone,
4,4'-diamino-5-phenoxybenzophenone,
3,4'-diamino-4-phenoxybenzophenone,
3,4'-diamino-5'-phenoxybenzophenone,
3,3'-diamino-4,4'-dibiphenoxybenzophenone,
4,4'-diamino-5,5'-dibiphenoxybenzophenone,
3,4'-diamino-4,5'-dibiphenoxybenzophenone,
3,3'-diamino-4-biphenoxybenzophenone,
4,4'-diamino-5-biphenoxybenzophenone,
3,4'-diamino-4-biphenoxybenzophenone,
3,4'-diamino-5'-biphenoxybenzophenone.
3,3'-diamino-4,4'-dimethoxybenzophenone,
4,4'-diamino-5,5'-dimethoxybenzophenone,
3,4'-diamino-4,5'-dimethoxybenzophenone,
3,3'-diamino-4-methoxybenzophenone,
4,4'-diamino-5-methoxybenzophenone,
3,4'-diamino-4-methoxybenzophenone,
3,4'-diamino-5'-methoxybenzophenone,
1,3-bis(3-amino-4-phenoxybenzoyl)benzene,
1,4-bis(3-amino-4-phenoxybenzoyl)benzene,
1,3-bis(4-amino-5-phenoxybenzoyl)benzene,
1,4-bis(4-amino-5-phenoxybenzoyl)benzene,
1,3-bis(3-amino-4-biphenoxybenzoyl)benzene,
1,4-bis(3-amino-4-biphenoxybenzoyl)benzene,
1,3-bis(4-amino-5-biphenoxybenzoyl)benzene,
1,4-bis(4-amino-5-biphenoxybenzoyl)benzene,
1,3-bis(3-amino-4-methoxybenzoyl)benzene,
1,4-bis(3-amino-5-methoxybenzoyl)benzene,
1,3-bis(4-amino-5-methoxybenzoyl)benzene and
1,4-bis(4-amino-5-methoxybenzoyl)benzene.

These aromatic diamino compounds can be used singly or as a mixture.

These aromatic diamino compounds can be prepared, for example, the following process.

An aromatic dinitro compound of the formula (16):

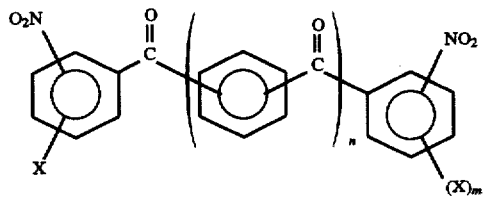

(16)

wherein X is a halogen atom and m and n are individually an integer of 0 or 1 is subjected to condensation with a hydroxy compound of the formula (17):

R—OH  (17)

wherein R is

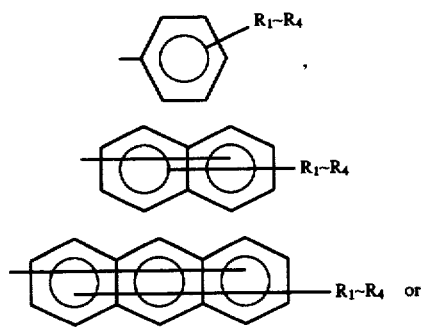

-continued

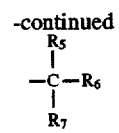

wherein $R_1$, $R_2$, $R_3$ and $R_4$ are individually a hydrogen atom, halogen atom alkyl of 1 to 8 carbon atoms, aryl, alkenyl, aralkyl or alkoxy of 1 to 5 carbon atoms, and $R_5$, $R_6$ and $R_7$ are individually a hydrogen atom, alkyl of 1 to 8 carbon atoms aryl, alkenyl, aralkyl or ω-alkyloxyoligo (alkyleneoxy)alkyl having 1 to 10 carbon atoms and 1 to 3 oxygen atoms, in an aprotic polar solvent in the presence of a base to obtain an aromatic dinitro compound of the formula (11):

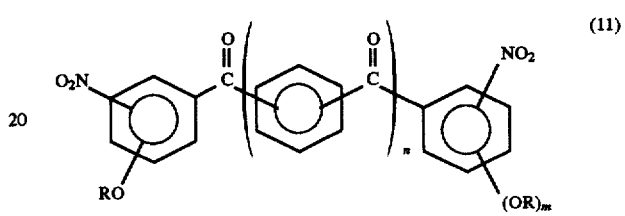

(11)

wherein m, n and R are the same as above. Successively, the thus-obtained dinitro compound is reduced to prepare the aromatic diamino compound of the formula (7):

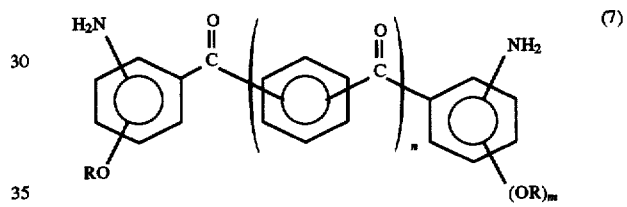

(7)

wherein m, n and R are the same as above.

Following aromatic halogeno dinitro compounds of the formula (16) are preferably used for preparing the aromatic dinitro combed of the formula (11) which is used in the process.

Dihalogenodinitrobenzophenone of the formula (16-1):

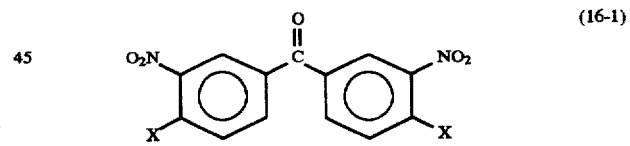

(16-1)

wherein X is a halogen atom, includes, for example, 4,4'-dihalogeno-3,3'-dinitrobenzophenone.

Monohalogenodinitrobenzophenone of the formula (16-2):

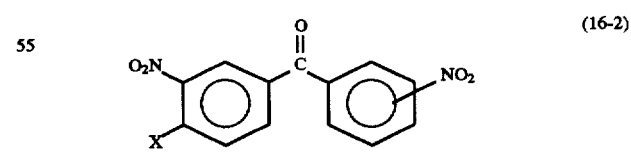

(16-2)

wherein X is a halogen atom, includes, for example, 4-halogeno-3,3'(or 4')-dinitrobenzophenone such as
4-chloro-3,3'-dinitrobenzophenone,
4-chloro-3,4'-dinitrobenzophenone,
4-bromo-3,3'-dinitrobenzophenone,
4-bromo-3,4'-dinitrobenzophenone,
4-fluoro-3,3'-dinitrobenzophenone and
4-fluoro-3,4'-dinitrobenzophenone and 4-iodo-3,3'-dinitrobenzophenone.
4-iodo-3,4'-dinitrobenzophenone.
4-Chloro-3,3'-dinitrobenzophenone or 4-chloro-3,4'-dinitrobenzophenone is more preferably used.

1,3(Or 1,4)-bis(3-nitro-4-halogenobenzoyl)benzene of the formula (16-3):

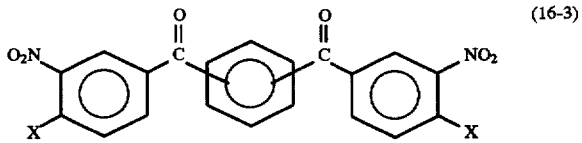

wherein X is a halogen atom, includes, for example,
1,3-bis(3-nitro-4-chlorobenzoyl)benzene,
1,4-bis(3-nitro-4-chlorobenzoyl)benzene,
1,3-bis(3-nitro-4-fluorobenzoyl)benzene,
1,4-bis(3-nitro-4-fluorobenzoyl)benzene,
1,3-bis(3-nitro-4-bromobenzoyl)benzene and
1,4-bis(3-nitro-4-bromobenzoyl)benzene and
1,3-bis(3-nitro-4-iodobenzoyl)benzene.
1,4-bis(3-nitro-4-iodobenzoyl)benzene.

1,3-Bis(3-nitro-4-chlorobenzoyl)benzene or 1,4-bis(3-nitro-4-chlorobenzoyl)benzene is more preferably used.

The aromatic dinitro compound of the formula (11) can be prepared in high yield by reacting these aromatic halogenodinitro compounds with phenols or alcohols in an aprotic polar solvent in the presence of a base.

The aromatic halogeno dinitro compound used for a raw material of the process, for example, 4,4'-dihalogeno-3,3'-dinitrobenzophenone can be obtained with ease by nitration of 4,4'-dihalogenobenzophenone through a known process of Japanese Laid-Open Patent Sho 58-121256. Other aromatic dinitro compounds can also be prepared by similar processes.

Exemplary phenols which can be used include, for example, phenol; cresol, dimethyl phenol and other alkylphenols; guaiacol, dimethoxyphenol and other alkoxyphenols; chlorophenol, fluorophenol, dichlorophenol, difluorophenol and other halogenophenols; phenylphenol, diphenylphenol and other arylphenols; phenoxyphenol, diphenoxyphenol and other aryloxyphenols; and naphthol, anthrol and other polycyclic phenols and alkyl, alkoxy, halogeno and aryl derivatives of these polycyclic phenols. Phenols and polycyclic phenols having two or more kinds of substituents such as halogenoalkylphenol and halogenoarylphenol can also be used.

Alcohols which can be used include, for example, methanol, ethanol, isopropyl alcohol, tert-butyl alcohol and other alkyl alcohols; ethylene glycol monomethyl ether, diethylene glycol monomethyl ether, propylene glycol monomethyl ether, dipropylene glycol monomethyl ether and other oligoalkylene glycol monoalkyl ethers; benzyl alcohol and other arylalkyl alcohols; and propenyl alcohol, isopropenyl alcohol and other alkenyl alcohols. Phenols and alcohols are not restricted to these enumerated compounds.

The amount of these phenols or alcohols is 1.0 to 1.5 mols, preferably 1.03 to 1.3 mols per mol of the aromatic halogenodinitro compound of the formula (16) when aromatic monohalogenodinitro compound is used, and 2.0 to 3.0 mols, preferably 2.05 to 2.6 mols when aromatic dihalogenodinitro compound is used.

Bases which can be used are carbonate, hydrogen carbonate, hydroxide and alkoxide of alkali metals, and include, for example, potassium carbonate, potassium hydrogen carbonate, potassium hydroxide, sodium carbonate, sodium hydroxide, sodium hydrogen carbonate, lithium carbonate, lithium hydroxide, sodium methoxide and potassium isopropoxide.

The amount of these bases is more than equivalent, practically 1 to 2 equivalents per equivalent of a halogen radical in the aromatic halogenodinitro compound of the formula (16), (16-1), (16-2) or (16-3).

Exemplary aprotic polar solvents used include N,N-dimethylformamide N,N-diethylformamide, N,N-dimethylacetamide, N-methylpyrrolidone, 1,3-dimethyl-2-imidazolidinone, dimethyl sulfoxide, sulfolane and tetrahydrofuran. No particular limitation is imposed upon the amount of these solvents and the amount of 1 to 10 times by weight of the raw materials is usually sufficient.

Catalysts which can be used for accelerating the reaction are copper powder, copper compounds and phase transfer catalysts such as crown ether, polyethylene glycol, quaternary ammonium bases and quaternary phosphonium bases.

The reaction temperature is in the range of −10° C. to 250° C., preferably −5° C. to 180° C. The reaction time is in the range of 0.5 to 30 hours, preferably 1 to 10 hours.

The reaction can be generally carried out by the following procedures.

① Prescribed amounts of a phenol or alcohol, a base and a solvent are charged to form an alkali metal salt of the phenol or alcohol, and the aromatic dinitro compound of the formula (16), for example, 4,4'-dihalogeno-3,3'-dinitrobenzophenone is successively added to carry out the reaction.

② The aromatic dinitro compound of the formula (16), for example, 4,4'-dihalogeno-3,3'-dinitrobenzophenone is charged to a solvent, and successively an alkali metal salt of the phenol or alcohol formed previously is added to the mixture to carried out the reaction.

③ All the materials including the aromatic dinitro compound of the formula (16), for example, 4,4'-dihalogeno-3,3'-dinitrobenzophenone are charged at one time and the mixture is heated as intact to carry out the reaction. The procedures are not limited to these embodiments and other suitable procedures can also be applied.

When water is present in the reaction system, water is removed from the reaction system by ventilating nitrogen gas during the reaction. However, a general method is to azeotropically distill off water by addition of a small amount of benzene, toluene, xylene and chlorobenzene.

End point of the reaction can be determined by decrease of the raw materials according to thin layer chromatography or high performance liquid chromatography. After finishing the reaction, the reaction mixture is poured as intact or after concentration into water to obtain the crude dinitro compound. The crude compound can be purified by recrystallization from or sludging in a solvent.

The aromatic dinitro compound of the formula (11):

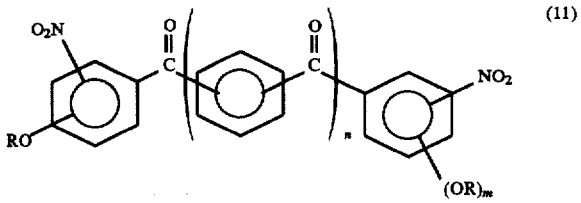

wherein m, n and R are the same as above, which can be obtained by the above reaction is, for example, a compound of the formula (11-1):

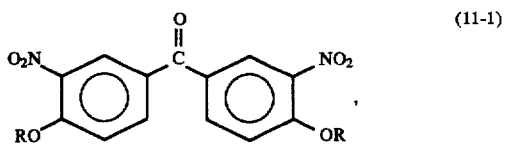

the formula (11-2):

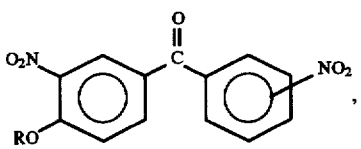  (11-2)

or the formula (11-3):

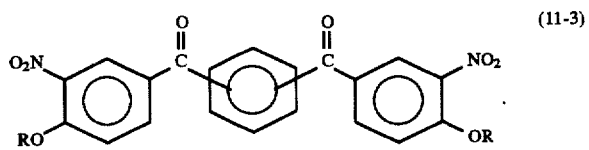  (11-3)

In the formula (11-1), (11-2) and (11-3), R is the same as above, preferably

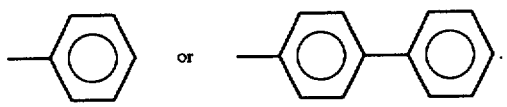

The aromatic dinitro compound obtained above is reduced to give the aromatic diamino compound.

That is, the aromatic diamino compound of the invention can be prepared by reducing the corresponding aromatic dinitro compound obtained by the above process.

No particular restriction is placed upon the reduction method of dinitro compound.

A method for reducing a nitro radical to an amino radical described, for example, in Shin Jikken Kagaku Koza, vol. 15, Oxidation and Reduction II, Published from Maruzen (1977), can be usually applied. Catalytic reduction is preferred in industry. Exemplary reducing catalysts which can be used include metal catalysts used generally for catalytic reduction, for example, nickel, palladium, platinum, rhodium, ruthenium, cobalt and copper. Palladium catalysts are preferred in industry.

These catalysts are generally used, though can be used in the state of metal, by supporting on the surface of a carrier such as carbon, barium sulfate, silica gel, alumina and cerite, or also used in the form of a Raney catalyst of nickel, cobalt or copper.

No particular limitation is put upon the amount of these catalysts. The amount is in the range of 0.01 to 10% by weight for the raw material dinitro compound, usually 2 to 8% by weight in the form of metal and 0.1 to 5% by weight when supported on the carrier.

In the case of iron powder reduction, the reaction temperature is in the range of 0° C. to 150° C., preferably 0° C. to 70° C.

The reaction can be carried out by gradually adding iron powder to a solution or suspension of the raw material and a catalytic amount of hydrochloric acid, or by previously charging the raw materials containing iron powder into a solvent to conduct the reaction.

No particular restriction is imposed upon the solvents used in the reduction as long as the solvent is inactive for the reaction.

Preferred solvents include, for example, methanol, ethanol, isopropyl alcohol and other alcohols; ethylene glycol, propylene glycol and other glycols; ether, dioxane, tetrahydrofuran, methyl cellosolve and other ethers. Other solvents which can also be used in some cases are hexane, cyclohexane and other aliphatic hydrocarbons; benzene, toluene, xylene and other aromatic hydrocarbons; ethyl acetate, butyl acetate and other esters; dichloromethane, chloroform, carbon tetrachloride, 1,2-dichloroethane, 1,1,2-trichloroethane, tetrachloroethane and other halogenated hydrocarbons; and N,N-dimethylformamide. No particular limitation is placed upon the amount of these solvents. These solvents are used in an amount sufficient to suspend or completely dissolve raw materials, that is, usually 0.5 to 10 times by weight for the weight of raw materials.

No particular limitation is placed on the reaction temperature. The reaction temperature is in the range of usually 20° to 200° C., preferably 20° to 100° C. Reaction pressure is in the range of atmospheric pressure to 50 atm.

Reducing reaction is usually carried out by suspending or dissolving the dinitro compound in a solvent, adding the catalyst and introducing hydrogen into the reaction system with stirring at a prescribed temperature. End point of the reaction can be determined by the amount of hydrogen, thin layer chromatography or high performance liquid chromatography. After finishing the reaction, the catalyst is removed by filtration and the solvent is distilled out of the filtrate to obtain the desired product.

The polyimide of the invention can be prepared from the above aromatic diamino compound.

More preferred recurring structural units of the polyimide include, for example, units of the formula (2):

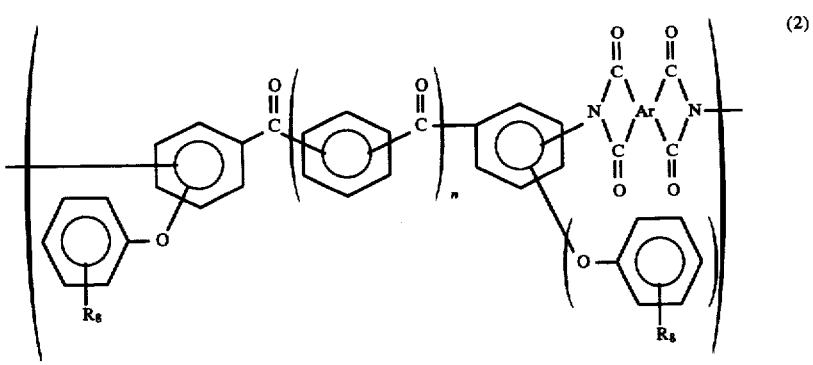  (2)

wherein m and n are individually an integer of 0 or 1, $R_8$ is a hydrogen atom, halogen atom, alkyl having 1 to 4 carbon atoms, alkoxy or phenyl, d Ar is tetravalent radical having 2 to 27 carbon atoms and being selected from the group consisting of an aliphatic radical, alicyclic radical, monoaromatic radical, condensed polyaromatic radical and noncondensed aromatic radical connected to each other with a direct bond or a bridge member, units of the formula (3):

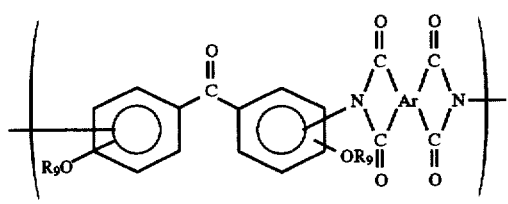
(3)

wherein $R_9$ is

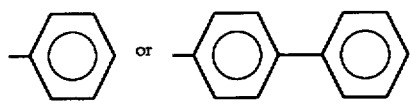

and Ar is the same as in the formula (2), units of the formula (4):

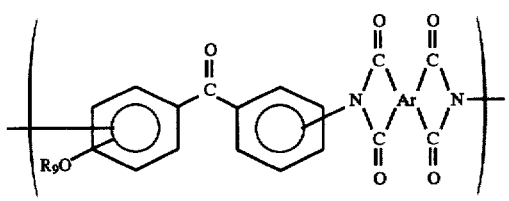
(4)

wherein $R_9$ and Ar are the same as in the formula (3), and units of the formula (5):

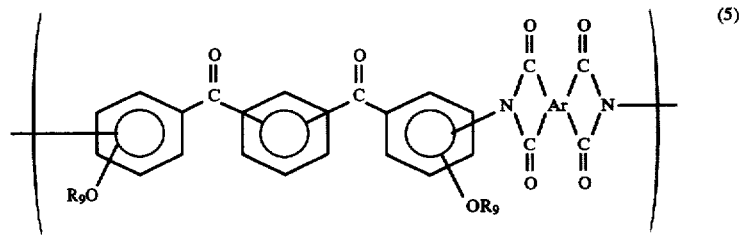
(5)

Another preferred polyimide is a copolymer comprising a requisite structural unit consisting of 1 to 99% by mol of the recurring structural units of the above formula (1), (2), (3), (4) or (5) and 99 to 1% by mol of the recurring structural units of the formula (6):

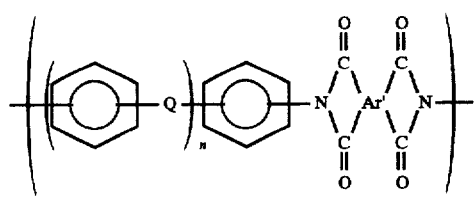
(6)

wherein n is an integer of 0 to 5, Q is a direct bond, —O—, —S—, —CO—, —SO$_2$—, —CH$_2$—, —C(CH$_3$)$_2$— or —C(CF$_3$)$_2$— and may be the same or different when aromatic rings are connected to each other with two or more connecting radicals Q, and Ar' is a tetravalent radical having 2 to 27 carbon atoms and being selected from the group consisting of an aliphatic radical, alicyclic radical, monoaromatic radical, condensed polyaromatic radical and noncondensed aromatic radical connected to each other with a direct bond or a bridge member.

Still another polyimide is a copolymer comprises structual units of the formula (1)

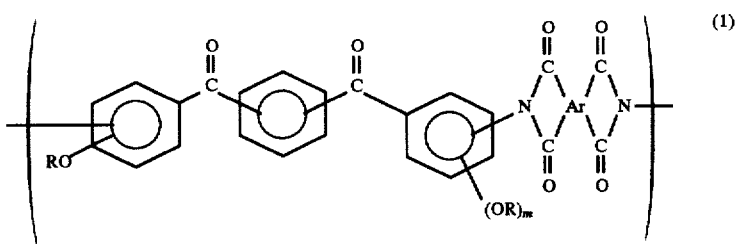
(1)

wherein m, R and Ar are the same as in the formula (1), and structural units of the formula (1-1):

(1-1)

wherein m, R and Ar are the same as in the formula (1).

The polyimide of the invention is prepared by using the above aromatic diamines for the requisite raw material monomer.

Other aromatic diamines can be used in combination with these diamines so long as giving no adverse effect on the good properties the polyimide.

Other aromatic diamines which can be used in combination include, for example, m-phenylenediamine, o-phenlenediamine,
p-phenylenediamine, m-aminobenzylamine, p-aminobenzylamine,
4,4'-diaminodiphenyl ether,
3,3'-diaminodiphenyl ether,
3,4'-diaminodiphenyl ether,
bis(3-aminophenyl)sulfide,
(3-aminophenyl)(4-aminophenyl)sulfide,
bis(4-aminophenyl)sulfide,
bis(3-aminophenyl)sulfoxide, (3-aminophenyl)(4-aminophenyl)sulfoxide,
bis(3-aminophenyl)sulfone,
(3-aminophenyl)(4-aminophenyl)sulfone,
bis(4-aminophenyl)sulfone,
3,3'-diaminobenzophenone, 3,4'-diaminobenzophenone,
4,4'-diaminobenzophenone,
3,3'-diaminodiphenylmethane, 3,4'-diaminodiphenylmethane,
4,4'-diaminodiphenylmethane,
bis[4-(3-aminophenoxy)phenyl]methane,
bis[4-(4-aminophenoxy)phenyl]methane,
1,1-bis[4-(3-aminophenoxy)phenyl]ethane,
1,1-bis[4-(4-aminophenoxy)phenyl]ethane,
1,2-bis[4-(3-aminophenoxy)phenyl]ethane,
1,2-bis[4-(4-aminophenoxy)phenyl]ethane,
2,2-bis[4-(3-aminophenoxy)phenyl]propane,
2,2-bis[4-(4-aminophenoxy)phenyl]propane,
2,2-bis[4-(3-aminophenoxy)phenyl]butane,
2,2-bis[4-(3-aminophenoxy)phenyl]-1,1,1,3,3,3-hexafluoropropane,
2,2-bis[4-(4-aminophenoxy)phenyl]-1,1,1,3,3,3-hexafluoropropane,
1,3-bis(3-aminophenoxy)benzene,
1,3-bis(4-aminophenoxy)benzene,
1,4-bis(3-aminophenoxy)benzene,
1,4-bis(4-aminophenoxy)benzene,
1,3-bis(3-aminobenzoyl)benzene,
1,3-bis(4-aminobenzoyl)benzene,
1,4-bis(3-aminobenzoyl)benzene,
1,4-bis(4-aminobenzoyl)benzene,
1,3-bis(3-amino-α,α-dimethybenzyl)benzene,
1,3-bis(4-amino-α,α-dimethybenzyl)benzene,
1,4-bis(3-amino-α,α-dimethybenzyl)benzene,
1,4-bis(4-amino-α,α-dimethybenzyl)benzene,
4,4'-bis(3-aminophenoxy)biphenyl,
4,4'-bis(4-aminophenoxy)biphenyl,
bis[4-(3-aminophenoxy)phenyl]ketone,
bis[4-(4-aminophenoxy)phenyl]ketone,
bis[4-(3-aminophenoxy)phenyl]sulfide
bis[4-(4-aminophenoxy)phenyl]sulfide
bis[4-(3-aminophenoxy)phenyl]sulfoxide,
bis[4-(4-aminophenoxy)phenyl]sulfoxide,
bis[4-(3-aminophenoxy)phenyl]sulfone,
bis[4-(4-aminophenoxy)phenyl]sulfone,
bis[4-(3-aminophenoxy)phenyl]ether,
bis[4-(4-aminophenoxy)phenyl]ether,
1,4-bis[4-(3-aminophenoxy)benzoyl]benzene,
1,3-bis[4-(3-aminophenoxy)benzoyl]benzene,
4,4'-bis[3-(4-aminophenoxy)benzoyl]diphenyl ether,
4,4'-bis[3-(3-aminophenoxy)benzoyl]diphenyl ether,
4,4'-bis[4-(4-amino-α,α-dimethybenzyl)phenoxy]benzophenone,
4,4'-bis[4-(4-amino-α,α-dimethybenzyl)phenoxy]diphenyl sulfone,
bis[4-{4-(4-aminophenoxy) phenoxy}phenyl]sulfone,
1,4-bis[4-(4-aminophenoxy)-α,α-dimethybenzyl]benzene,
1,4-bis[4-(3-aminophenoxy)-α,α-dimethybenzyl]benzene,
1,3-bis[4-(4-aminophenoxy)-α,α-dimethybenzyl]benzene,
1,3-bis[4-(3-aminophenoxy)-α,α-dimethybenzyl]benzene,
3,3'-diamino-4,4'-difluorobenzophenone,
3,3'-diamino-5,5'-bis(trifluoromethyl)diphenyl ether, and
4,4'-diamino-5,5'-bis(trifluoromethyl)diphenyl ether.

These aromatic diamines can be used singly or as a mixture.

Aromatic tetracarboxylic dianhydride which can be used in the invention is one or more compounds of the formula (8):

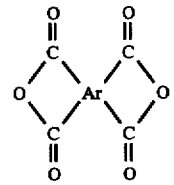

wherein Ar is a tetravalent radical having 2 to 27 carbon atoms and being selected from the group consisting of an aliphatic radical, alicyclic radical, monoaromatic radical, condensed polyaromatic radical and noncondensed aromatic radical connected to each other with a direct bond or a bridge member.

In the aromatic tetracarboxylic dianhydride of the formula (8), Ar is specifically a tetravalent radical selected from the group consisting of an aliphatic radical having 2 to 10 carbon atoms, alicyclic radical having 4 to 10 carbon atoms, monoaromatic radical of the formula (a):

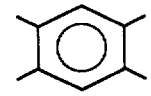

condensed polyaromatic radical of the formula (b):

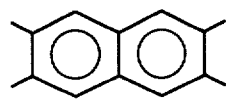

and noncondensed aromatic radical being connected to each other with a direct bond or a bridge member and having the formula (c):

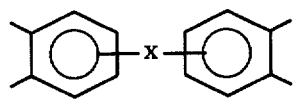

wherein X is a direct bond, —CO—, —O—, —S—, —SO₂—, —CH₂—, —C(CH₃)₂—, —C(CF₃)₂—,

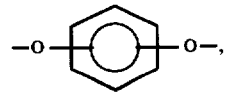

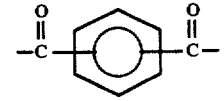

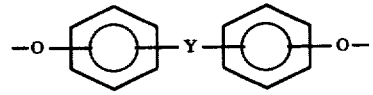

wherein Y is a direct bond, —CO—, —O—, —S—, —SO₂—, —CH₂—, —C(CH₃)₂— or —C(CF₃)₂—.

Exemplary tetracarboxylic dianhydrides of the formula (8) which can be used in the invention include,
ethylenetetracarboxylic dianhydride,
cyclopentanetetracarboxylic dianhydride,
pyromellitic dianhydride,
3,3',4,4'-benzophenonetetracarboxylic dianhydride,
2,2',3,3'-benzophenonetetracarboxylic dianhydride,
3,3',4,4'-biphenyltetracarboxylic dianhydride,
2,2',3,3'-biphenyltetracarboxylic dianhydride,
2,2-bis(3,4-dicarboxyphenyl)propane dianhydride, 2,2-bis(2,3-dicarboxyphenyl)propane dianhydride,
bis(3,4-dicarboxyphenyl)ether dianhydride,
bis(3,4-dicarboxyphenyl)sulfone dianhydride,
1,1-bis(2,3-dicarboxyphenyl)ethane dianhydride,
bis(2,3-dicarboxyphenyl)methane dianhydride,
bis(3,4-dicarboxyphenyl)methane dianhydride,
2,2-bis(3,4-dicarboxyphenyl)-1,1,1,3,3,3-hexafluoropropane dianhydride,
2,2-bis(2,3-dicarboxyphenyl)-1,1,1,3,3,3-hexafluoropropane dianhydride,
1,3-bis[(3,4-dicarboxy)benzoyl]benzene dianhydride,
1,4-bis[(3,4-dicarboxy)benzoyl]benzene dianhydride,
2,2-bis[4{4-(1,2-dicarboxy)benzoyl}phenyl]propane dianhydride,
2,2-bis[4{3-(1,2-dicarboxy)phenoxy}phenyl]propane dianhydride,
bis[4-{4-(1,2-dicarboxy)phenoxy}phenyl]ketone dianhydride,
bis[4-{3-(1,2-dicarboxy)phenoxy}phenyl]ketone dianhydride,
4,4'-bis[4-(1,2-dicarboxy)phenoxy]biphenyl dianhydride,
4,4'-bis[3-(1,2-dicarboxy)phenoxy]biphenyl dianhydride,
bis[4-{4-(1,2-dicarboxy)phenoxy}phenyl]sulfone dianhydride,
bis[4-{3-(1,2-dicarboxy)phenoxy}phenyl]sulfone dianhydride,
bis[4-{4-(1,2-dicarboxy)phenoxy}phenyl]sulfide dianhydride,
bis[4-{3-(1,2-dicarboxy)phenoxy}phenyl]sulfide dianhydride,
2,2-bis[4-{4-(1,2-dicarboxy)phenoxy}phenyl]-1,1,1,3,3,3-hexafluoropropane dianhydride,
2,2-bis[4-{3-(1,2-dicarboxy)phenoxy}phenyl]-1,1,1,3,3,3-hexafluoropropane dianhydride,
2,3,6,7-naphthalenetetracarboxylic dianhydride,
1,4,5,8-naphthalenetetracarboxylic dianhydride,
1,2,5,6-naphthalenetetracarboxylic dianhydride,
1,2,3,4-benzenetetracarboxylic dianhydride,
3,4,9,10-perylenetetracarboxylic dianhydride,
2,3,6,7-anthracenetetracarboxylic dianhydride, and
1,2,7,8-phenanthrenetetracarboxylic dianhydride.

These dianhydrides can be used singly or as a mixture.

The polyimide of the invention prepared by using the above aromatic diamine and aromatic tetracarboxylic dianhydride as monomer components comprises a requisite structural unit primarily having recurring structural units of the formula (1). That is, the invention includes polyimide which is derived from a selected aromatic diamine and a selected aromatic tetracarboxylic dianhydride in the above enumerated raw materials of the invention and has recurring structural units of the formula (1)–(5), a polyimide copolymer which is derived from one or more selected aromatic diamines and one or more selected aromatic tetracarboxylic dianhydrides (both one, exclusive) in the above enumerated raw materials of the invention, and a polyimide copolymer which is derived from one or more selected aromatic diamines and one or more selected aromatic tetracarboxylic dianhydride in the above enumerated raw materials of the invention in combination with other diamines added in the range of giving no adverse effect on the properties of resulting polyimide.

The aromatic polyimide copolymer comprising a fundamental skeleton consisting of recurring structural units of the formula (1) and recurring structural units of the formula (6) can be obtained by reacting aromatic diamino compound of the formula (7):

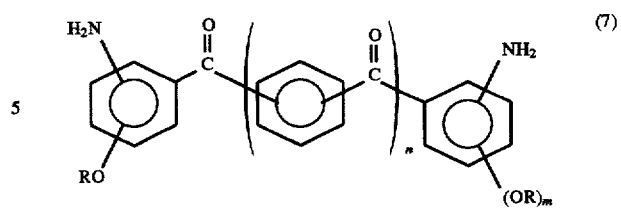

in the presence of one or more diamine represented by the formula (6-1):

wherein X is

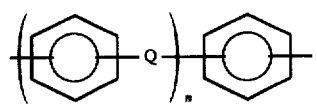

wherein n is an integer of 0 to 5; Q is a direct bond, —O—, —S—, —CO—, —SO$_2$—, —CH$_2$—, —C(CH$_3$)$_2$— or —C(CF$_3$)$_2$— and may be the same or different when two or more Q connects three or more aromatic rings each other; with one or more aromatic tetracarboxylic dianhydride selected from the above formula (8) or the formula (6-2):

wherein Ar' is a tetravalent radical selected from the group consisting of

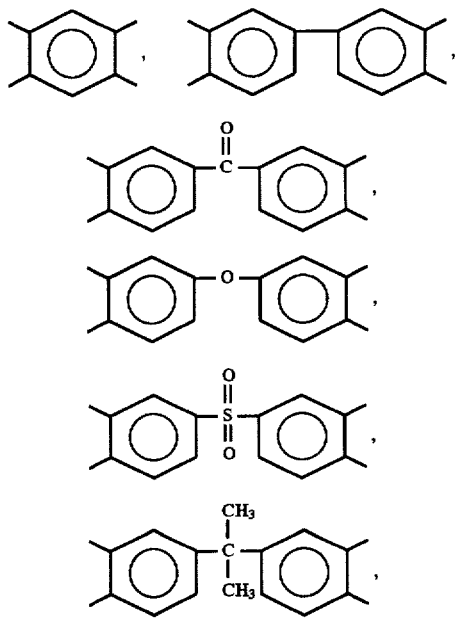

-continued

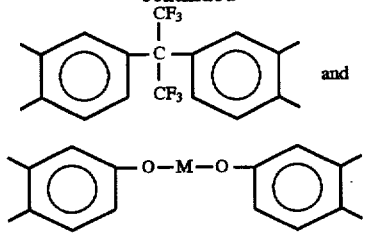

wherein M is a divalent radical selected from the group consisting of

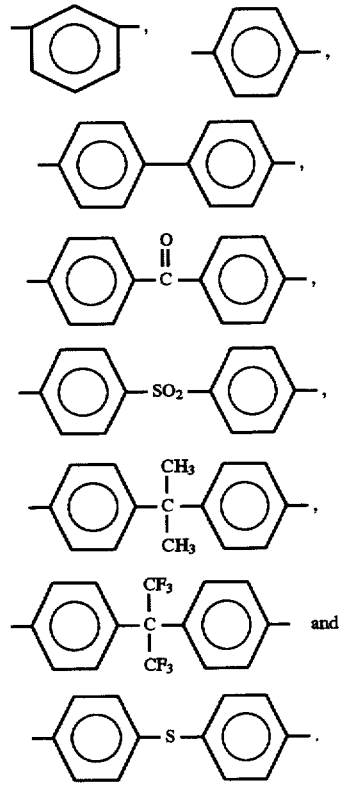

Exemplary aromatic diamines of the formula(6-1) used in the reaction include
m-phenylenediamine, o-phenylenediamine and p-phenylenediamine, benzidine, 3,3'-diaminodiphenyl ether,
3,4'-diaminodiphenyl ether, 4,4'-diaminodiphenyl ether,
3,3'-diaminodiphenyl sulfide, 3,4'-diaminodiphenyl sulfide,
4,4'-diaminodiphenyl sulfide, 3,3'-diaminodiphenyl sulfone,
3,4'-diaminodiphenyl sulfone, 4,4'-diaminodiphenyl sulfone,
3,3'-diaminobenzophenone, 3,4'-diaminobenzophenone,
4,4'-diaminobenzophenone, 3,3'-diaminodiphenylmethane,
3,4'-diaminodiphenylmethane, 4,4'-diaminodiphenylmethane,
2,2'-bis(4-aminophenyl)propane, 2,2-bis(3-aminophenyl)propane,
2-(3-aminophenyl)-2-(4-aminophenyl)propane,
2,2-bis(3-aminophenyl)-1,1,1,3,3,3-hexafluoropropane,
2,2-bis(4-aminophenyl)-1,1,1,3,3,3-hexafluoropropane, and
2-(3-aminophenyl)-2-(4-aminophenyl)propane,
1,3-bis(3-aminophenoxy)benzene, 1,3-bis(4-aminophenoxy)benzene,
1,4-bis(3-aminophenoxy)benzene, 1,4-bis(4-aminophenoxy)benzene,
1,3-bis(3-aminobenzoyl)benzene, 1,3-bis(4-aminobenzoyl)benzene,
1,4-bis(4-aminobenzoyl)benzene,
1,3-bis(3-amino-α,α-dimethylbenzyl)benzene,
1,3-bis(4-amino-α,α-dimethylbenzyl)benzene,
1,4-bis(3-amino-α,α-dimethylbenzyl)benzene and
1,4-bis(4-amino-α,α-dimethylbenzyl)benzene.
4,4'-bis(4-aminophenoxy)biphenyl, 3,3'-bis(4-aminophenoxy)biphenyl,
3,4'-bis(3-aminophenoxy)biphenyl,
bis[4-(4-aminophenoxy)phenyl]ketone,
bis[4-(3-aminophenoxy)phenyl]ketone,
bis[3-(3-aminophenoxy)phenyl]ketone,
bis[4-(4-aminophenoxy)phenyl]sulfide,
bis[4-(3-aminophenoxy)phenyl]sulfide,
bis[3-(4-aminophenoxy)phenyl]sulfide,
bis[3-(3-aminophenoxy)phenyl]sulfide,
bis[4-(4-aminophenoxy)phenyl]sulfone,
bis[4-(3-aminophenoxy)phenyl]sulfone,
bis[3-(4-aminophenoxy)phenyl]sulfone,
bis[3-(3-aminophenoxy)phenyl]sulfone,
bis[4-(3-aminophenoxy)phenyl]ether,
bis[4-(4-aminophenoxy)phenyl]ether,
bis[3-(4-aminophenoxy)phenyl]ether,
bis[3-(3-aminophenoxy)phenyl]ether,
bis[4-(3-aminophenoxy)phenyl]methane,
bis[4-(4-aminophenoxy)phenyl]methane,
bis[3-(3-aminophenoxy)phenyl]methane,
bis[3-(4-aminophenoxy)phenyl]methane,
2,2-bis[4-(3-aminophenoxy)phenyl]propane,
2,2-bis[4-(4-aminophenoxy)phenyl]propane,
2,2-bis[3-(3-aminophenoxy)phenyl]propane,
2,2-bis[3-(4-aminophenoxy)phenyl]propane,
2,2-bis[4-(3-aminophenoxy)phenyl]-1,1,1,3,3,3-hexafluoropropane,
2,2-bis[4-(4-aminophenoxy)phenyl]-1,1,1,3,3,3-hexafluoropropane,
2,2-bis[3-(3-aminophenoxy)phenyl]-1,1,1,3,3,3-hexafluoropropane, and
2,2-bis[3-(4-aminophenoxy)phenyl]-1,1,1,3,3,3-hexafluoropropane. These aromatic diamines can be used singly or as a mixture.

Exemplary aromatic tetracarboxylic dianhydrides of the formula (6-2) include;
pyromellitic dianhydride,
3,3',4,4'-biphenyltetracarboxylic dianhydride,
3,3',4,4'-benzophenonetetracarboxylic dianhydride,
bis(3,4-dicarboxyphenyl)ether dianhydride,
bis(3,4-dicarboxyphenyl)sulfone dianhydride,
2,2-bis(3,4-dicarboxyphenyl)propane dianhydride,
2,2-bis(3,4-dicarboxyphenyl)-1,1,1,3,3,3-hexafluoropropane dianhydride,
1,3-bis[4-(1,2-dicarboxy)phenoxy]benzene dianhydride,
1,4-bis[4-(1,2-dicarboxy)phenoxy]benzene dianhydride,
4,4'-bis[4-(1,2-dicarboxy)phenoxy]biphenyl dianhydride,
4,4'-bis[4-(1,2-dicarboxy)phenoxy]benzophenone dianhydride,
bis[4-{4-(1,2-dicarboxy)phenoxy}phenyl]sulfone dianhydride,
2,2-bis[4-{4-(1,2-dicarboxy)phenoxy}phenyl]sulfone dianhydride, and
2,2-bis[4-{4-(1,2-dicarboxy)phenoxy}phenyl]-1,1,1,3,3,3-hexafluoropropane dianhydride.

The aromatic polyimide copolymer comprising 99 to 1% by mol of the fundamental skeleton having recurring structural units of the formula (1),(2),(3),(4) or (5) and 1~99% by mol of the fundamental skeleton having recurring structural units of the formula (6) are prepared from corresponding monomers above. In addition to the requisite aromatic diamine and aromatic dicarboxylic dianhydride, other aromatic diamines or aromatic tetracarboxylic dianhydrides can be used in combination so long as giving no adverse effect on the good properties of the resulting homopolymer and copolymer of aromatic polyimide.

The invention also includes capped polyimide having at the polymer chain end thereof an aromatic ring which is unsubstituted or substituted with a radical having no reactivity for amine and dicarboxylic anhydride.

Further, the invention includes compositions including these polyimides. Compositions have better properties than polyimides as such in some cases.

The polyimide having at the polymer chain end thereof an aromatic ring which is unsubstituted or substituted with a radical having no reactivity with amine and/or dicarboxylic anhydride can be obtained by capping the terminal radical of the polymer chain which is derived from aromatic amine of the above formula (7) and tetracarboxylic dianhydride primarily having the above formula (8), with aromatic dicarboxylic anhydride of the formula (9)

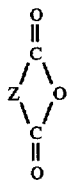
(9)

wherein Z is a divalent radical having 6 to 15 carbon atoms and being selected from the group consisting of a monoaromatic radical, condensed polyaromatic radical and noncondensed aromatic radical connected to each other with a direct bond or a bridge member and/or aromatic monoamine of the formula (10):

$Z_1$—$NH_2$ (10)

wherein $Z_1$ is a monovalent radical having 6 to 15 carbon atoms and being selected from the group consisting of a monoaromatic radical, condensed polyaromatic radical and noncondensed aromatic radical connected to each other with a direct bond or a bridge member, preferably with phthalic anhydride and/or aniline.

The polyimide can be prepared by reacting an aromatic diamine component with aromatic tetracarboxylic dianhydride in the presence of aromatic dicarboxylic anhydride of the formula (9) and/or aromatic monoamine of the formula (10), and successively by thermally or chemically imidizing the resultant polyamic acid Exemplary aromatic dicarboxylic anhydrides of the formula (9) include phthalic anhydride,2,3-benzophenonedicarboxylic anhydride,
3,4-benzophenonedicarboxylic anhydride,
2,3-dicarboxyphenylphenyl ether anhydride,
3,4-dicarboxyphenyl phenyl ether anhydride,
2,3-biphenyldicarboxylic anhydride,
3,4-biphenyldicarboxylic anhydride,
2,3-dicarboxyphenyl phenyl sulfone anhydride,
3,4-dicarboxyphenyl phenyl sulfone anhydride,
2,3-dicarboxyphenyl phenyl sulfide anhydride,
3,4-dicarboxyphenyl phenyl sulfide anhydride,
1,2-naphthalenedicarboxylic anhydride,
2,3-naphthalenedicarboxylic anhydride,
1,8-naphthalenedicarboxylic anhydride,
1,2-anthracenedicarboxylic anhydride,
2,3-anthracenedicarboxylic anhydride, and
1,9-anthracenedicarboxylic anhydride.

These dicarboxylic anhydrides can be substituted with a radical having no reactivity for amine and dicarboxylic anhydride.

Phthalic anhydride is most preferred in these dicarboxylic anhydrides in view of the properties of the resulting polyimide and practical use. Polyimide prepared in the presence of phthalic anhydride has excellent heat stability in high temperature and is very useful for a material of space and aeronautic instruments and electric and electronic devices. A portion of phthalic anhydride can be replaced with other dicarboxylic anhydrides in the range giving no adverse effect on the good properties of polyimide.

The amount of dicarboxylic anhydride is 0.001 to 1.0 mol per mol of aromatic diamine of the formula (7). When the amount is less than 0.01 mol, viscosity increases in high temperature processing. On the other hand, an amount exceeding 1.0 mol decreases mechanical properties of the product. Thus, the preferred amount is in the range of 0.01 to 0.5 mol.

Aromatic monoamines which can be used include, for example, aniline, o-toluidine, m-toluidine, p-toluidine, 2,3-xylidine, 2,6-xylidine, 3,4-xylidine, 3,5-xylidine, o-chloroaniline, m-chloroaniline, p-chloroaniline, o-bromoaniline, m-bromoaniline, p-bromoaniline, m-nitroaniline, p-nitroaniline, o-aminophenol, m-aminophenol, p-aminophenol, o-anisidine, m-anisidine, p-anisidine, o-phenetidine, m-phenetidine, p-phenetidine, o-aminobenzaldehyde, m-aminobenzaldehyde, p-aminobenzaldehyde, o-aminobenzonitrile, m-aminobenzonitrile, p-aminobenzonitrile, 2-aminobiphenyl, 3-aminobiphenyl, 4-aminobiphenyl, 2-aminophenyl phenyl ether, 3-aminophenyl phenyl ether, 4-aminophenyl phenyl ether, 2-aminobenzophenone, 3-aminobenzophenone, 4-aminobenzophenone, 2-aminophenyl phenyl sulfide, 3-aminophenyl phenyl sulfide, 4-aminophenyl phenyl sulfide, 2-aminophenyl phenyl sulfone, 3-aminophenyl phenyl sulfone, 4-aminophenyl phenyl sulfone, α-naphthylamine, β-naphthylamine, 1-amino-2-naphthol, 2-amino-1-naphthol, 4-amino-1-naphthol, 5-amino-1-naphthol, 5-amino-2-naphthol, 7-amino-2-naphthol, 8-amino-1-naphthol, 8-amino-2-naphthol, 1-aminoanthracene, 2-aminoanthracene and 9-aminoanthracene. These aromatic monoamines can be substituted with a radical having no reactivity for amine and dicarboxylic anhydride.

The amount of aromatic monoamine is 0.001 to 1.0 mol per mol of the aromatic tetracarboxylic dianhydride component. An amount less than 0.001 mol leads to viscosity increase in the high temperature processing and causes reduction of processability. On the other hand, an amount exceeding 1.0 mole lowers the mechanical strength of the product.

Thus, preferred range is 0.001 to 0.5 mol.

Consequently, preparation of capped polyimide of the invention which is terminated with an unsubstituted or substituted aromatic ring is carried out by using 0.9 to 1.0 mol of aromatic diamine and 0.001 to 1.0 mol of dicarboxylic anhydride or aromatic monoamine per mol of tetracarboxylic dianhydride.

In the preparation of polyimide, the molar ratio of tetracarboxylic dianhydride to aromatic diamine is usually controlled in order to adjust the molecular weight of the formed polyimide. In order to obtain polyimide having good melt-flowability in the process of the invention, the molar ratio of aromatic diamine to tetracarboxylic dianhydride is suitably in the range of 0.9 to 1.0.

Any process for preparing polyimide including known processes can be applied to the preparation of the polyimide of the invention. Particularly preferred process is to carry out the reaction in an organic solvent.

Exemplary solvents which can be used for the reaction include

N,N-dimethylformamide, N,N-dimethylacetamide, N,N-diethylacetamide,

N,N-dimethylmethoxyacetamide, N-methyl-2-pyrrolidone, 1,3-dimethyl-2-imidazolidinone, N-methylcaprolactam, 1,2-dimethoxyethane, bis(2-methoxyethyl)ether, 1,2-bis(2-methoxyethoxy)ethane, bis[2-(2-methoxyethoxy) ethyl]ether, tetrahydrofuran, 1,3-dioxane, 1,4-dioxane, pyridine, picoline, dimethyl sulfoxide, dimethyl sulfone, tetramethylurea, hexamethylphosphoramide, phenol, o-cresol, m-cresol, p-cresol, m-cresylic acid, p-chlorophenol, anisole, benzene, toluene and xylenes. These organic solvents can be used singly or as a mixture.

In the process of the invention, the reaction is carried out by the addition of aromatic diamine, aromatic tetracarboxylic dianhydride and aromatic dicarboxylic anhydride or aromatic monoamine to the organic solvent according to the following procedures.

(A) After reacting aromatic tetracarboxylic dianhydride with aromatic diamine, aromatic dicarboxylic anhydride or aromatic monoamine is added to continue the reaction.

(B) After reacting aromatic diamine with aromatic dicarboxylic anhydride, aromatic tetracarboxylic dianhydride is added to continue the reaction.

(C) After reacting aromatic tetracarboxylic dianhydride with aromatic monoamine, aromatic diamine is added to continue the reaction. (D) Aromatic tetracarboxlic dianhydride, aromatic diamine and aromatic dicarboxylic anhydride or aromatic monoamine are added at one time and the reaction is carried out. Any of the above addition procedures can be conducted.

Reaction temperature is usually 250° C. or less, preferably 50° C. or less. No particular limitation is imposed upon the reaction pressure. Atmospheric pressure is satisfactory for carrying out the reaction. Reaction time differs depending upon the tetracarboxylic dianhydride, solvent and reaction temperature and sufficient time for carrying out the reaction is usually 4 to 24 hours.

Further, polyamic acid thus obtained is thermally imidized by heating at 100° C. to 400° C. or chemically imidized by using an imidizing agent such as acetic anhydride to give polyimide having recurring structural units corresponding to those of polyamic acid.

The desired polyimide can also be prepared by suspending or dissolving in an organic solvent aromatic diamine and aromatic tetracarboxylic dianhydride, and additionally aromatic dicarboxylic anhydride and/or aromatic monoamine in the case of terminating the polyimide with an aromatic ring, and successively heating the mixture to carry out formation and imidization of the polyimide precursor polyamic acid at the same time.

Polyamic acid which is the precursor of polyimide of the invention has an inherent viscosity of 0.01 to 3.0 dl/g at 35° C. in a N,N-dimethylacetamide solution at a concentration of 0.5 g/dl. The polyimide of the invention has an inherent viscosity of 0.01 to 3.0 dl/g at 35° C. in a solvent mixture composed of 9 parts by weight of p-chlorophenol and 1 parts of weight of phenol at a concentration of 0.5 g/dl.

The polyimide of the invention is soluble in general purpose solvents. Representative solvents include, for example, halogenated hydrocarbon solvents such as dichloromethane, chloroform, carbon tetrachloride, dichloroethane, trichloroethane, tetrachloroethane, dibromomethane, tribromomethane, tetrabromomethane, dibromoethane, tribromoethane and tetrabromoethane; amide solvents such as N,N-dimethylacetamide, N,N-dimethylformamide, N,N-diethylacetamide, N,N-dimethoxyacetamide and N-methyl-2-pyrrolidone; phenolic solvents such as phenol, cresol, halogenated cresol and xylenol; and aromatic hydrocarbon solvents such as benzene, toluene and xylenes. These solvents can be used singly or as a mixture.

The polyimide varnish obtained by dissolving the polyimide of the invention in these solvents can be employed for heat resistant varnishes, coatings and sealants.

Further, polyimide film of the invention can be prepared by casting on a glass plate a varnish of polyamic acid precursor of the polyimide and heating to carry out imidization, by hot-pressing the polyimide powder as intact to form a film or by removing an organic solvent upon heating from the solution dissolved the polyimide to form a film.

That is, films and powder of polyimide can be prepared by known methods.

In the case of melt-processing the polyimide of the invention, other thermoplastic resins can be blended in a suitable amount depending upon the object for use so long as giving no adverse effect on the good properties of polyimides.

Thermoplastic resins which can be blended include, for example, polyethylene, polypropylene, polycarbonate, polyarylate, polyamide, polysulfone, polyether sulfone, polyether ketone, polyphenylene sulfide, polyamideimide, polyetherimide, modified polyphenylene oxide and other kinds of polyimides.

Fillers which are used for common resin compositions can be added in the range not impairing the objects of the invention. Exemplary fillers include graphite, carborundum, silica powder, molybdenum disulfide, fluoro resin and other wear resistance improvers; glass fiber, carbon fiber and other reinforcements; antimony trioxide, magnesium carbonate, calcium carbonate and other flame retardance improvers; clay, mica and other electrical property improvers; asbestos, silica, graphite and other tracking resistance improvers; barium sulfide, silica, calcium metasilicate and other acid resistance improvers; iron powder, zinc powder, aluminum powder, copper powder and other thermal conductivity improvers; and other miscellaneous materials such as glass beads, glass balloons, talc, diatomaceous earth, alumina, silicate balloons, hydrated alumina, metal oxides and colorants.

The polyimide-based resin composition of the invention comprises polyimide resin of the invention and. 5~65 parts by weight, preferably 10~50 parts by weight of fibrous reinforcement for 100 parts by weight of the resin.

When the amount of fibrous reinforcement is less than 5 parts by weight, reinforcing effect is unsatisfactory. On the other hand, when the amount of reinforcement exceeds 65 parts by weight, it becomes difficult to obtain good molded articles by melt processing such as injection molding.

The polyimide-based resin composition of the invention can be prepared by various known processes for blending fibrous reinforcement with resin. For example, polyimide resin powder is premixed with fibrous reinforcement by using a mortar, Henschel mixer, drum blender, tumbling mixer, ball mill or ribbon blender and thereafter melt-kneaded with a melt-mixture or hot rolls to obtained pellets or a powdery mixture.

However, most preferred is the process of the invention for utilizing the solubility which is a characteristic of polyimide of the invention. That is the resin composition can be prepared by way of a preblended state which utilizes solubility of polyimide of the invention. The process is carried out as follows.

A prescribed amount of polyimide of the invention is dissolved in an organic solvent such as a halogenated hydrocarbon solvent, amide solvent or phenol solvent. A prescribed amount of fibrous reinforcement is added to the solution and dispersed with stirring. The resulting dispersion of the fibrous reinforcement in an organic solvent solution of polyimide is successively poured into a lean solvent with vigorous stirring to separate polyimide from the solution.

The precipitate is filtered and the solution is removed from the precipitate to obtain a uniform mixture of polyimide and fibrous reinforcement. Polyimide powder thus obtained is in a premixed state comprising uniformly dispersed fibrous reinforcement and can be converted to a polyimide resin composition such as pellets and a powdery mixture by using a melt mixer or hot rolls.

In the process, concentration of the polyimide solution is 5~50% by weight, preferably 15~40% by weight in view of viscosity in working. Exemplary lean solvents for separation polyimide include methanol, ethanol, propanol, acetone, methyl ethyl ketone, methyl isobutyl ketone, benzene, toluene and xylene. The amount of solvent used is 5~30 times, preferably 10~20 times the total amount of the composition.

The polyimide resin composition of the invention of the invention thus obtained can be processed by various molding methods.

Articles having excellent properties can be obtained by injection molding in particular.

The polyimide-based composite of the invention, laminated composite in particular, comprises a substrate composed of fibrous reinforcement and polyimide of the invention.

The polyimide composite of the invention can be obtained by impregnating fibrous reinforcement, that is, a substrate composed of fibrous reinforcement with a solution of polyimide of the invention in an organic solvent, removing the solvent from the impregnated substrate, heating the substrate above the melt-flew temperature of the above polyimide and applying pressure in a mold.

The fibrous reinforcement impregnated with polyimide of the invention can be used in the form of a single layer or a multi-layer which is obtained by superimposing two or more layers of the substrate.

Exemplary organic solvents used for dissolving polyimide include general purpose solvents such as halogenated hydrocarbon solvents, amide solvents and phenol solvents; practically, those used for the preparation of polyimide resin composition of the invention. In these solvents, N,N-dimethylformamide and N,N-dimethylacetamide are particularly preferred in view of properties and practical usage. These solvents can be used singly or as a mixture.

No particular limitation is put upon the concentration of the polyimide solution so long as the concentration is within the range of solubility of polyimide. The concentration is preferably 1~50% by weight in terms of workability on coating and impregnation of fibrous reinforcement.

The polyimide solution has viscosity has viscosity of usually 10~100,000 cps, preferably 500~50,000 cps in view of workability.

No particular limitation is placed on the dissolving temperature and atmospheric pressure is satisfactory.

Any fibrous reinforcements used for the substrate of a laminated panel can be applied to the fibrous reinforcement of the invention. Exemplary fibrous reinforcement include, for example, glass fiber, carbon fiber, aromatic polyamide fiber, silicon carbide fiber, boron fiber, textiles and nonwoven fabrics of these fibers and paper.

Impregnation of the fibrous reinforcement with the polyimide solution can be conducted by any process which can uniformly build up a desired amount of polyimide on the substrate by treating the fibrous substrate with the polyimide solution. It is often employed a process for impregnating the substrate with the polyimide solution or coating the polyimide solution on the substrate.

The build-up of polyimide on the fibrous reinforcement is 5~50% by weight, preferably 10~30% by weight for the amount of fibrous reinforcement.

Coating of the polyimide solution on fibrous reinforcement can be carried out by any process. For example, a bar coater and doctor blade can be used.

In the process of the invention, the polyimide solution is built up on the substrate by coating or impregnation.

However, coating and impregnation are regarded as substantially the same, and "impregnation" in the invention means "coating or impregnation".

Successively, the solvent is removed from the fibrous reinforcement impregnated with the polyimide solution in a nitrogen or air stream at the temperature above the boiling point of the solvent used.

One or more sheets of the fibrous reinforcement thus impregnated with the polyimide solution (prepreg sheet) are super-imposed, heated above the melt-flow temperature of polyimide, and compression molded to obtain a polyimide composite.

Molding temperature and pressure are individually 250°~450° C. and 1~1000 kg/cm$^2$.

In the preparation of polyimide composite of the invention, other resins can be formulated in the range without impairment of solubility, melt-flowability and adhesion of polyimide used in the invention. Other resins include, for example, various thermoplastic resin which can be formulated in the above composition of the invention and thermosetting resin such as phenolic resin and bismaleimide resin. Further, various fillers which can be used for the above polyimide resin composition of the invention can be formulated in the range giving no adverse effect on the object of the invention.

In the fibrous reinforcement of the invention which has a surface modified with polyimide of the invention, the above polyimide used in the invention can effectively treat the surface of fibrous reinforcement, and additionally, the surface-modified fibrous reinforcement thus obtained has an excellent applicability to a fibrous reinforcement of resins, polyimide resin in particular.

Consequently, polyimide of the invention can be applied to surface modification of fibrous reinforcement in the form of polyimide powder or an organic solvent solution of the powder. Polyimide of the invention can also be applied in the state of polyamide acid, precursor of polyimide, or as a mixture of polyamic acid and polyimide and imidized to obtain a surface-modified fibrous reinforcement.

The surface-modified fibrous reinforcement of the invention is obtained by building up an organic solvent solution of polyimide of the invention on the surface of fibrous reinforcement and removing the solvent.

Preferred polyimide is prepared by heating 3,3'-diamino-4,4'-diphenoxybenzophenone of the formula (13-1):

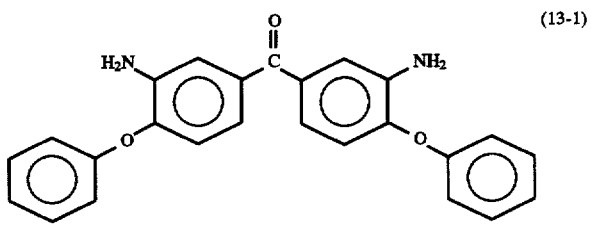

(13-1)

and/or 1,3-bis(3-amino-4-phenoxybenzoyl)benzene of the formula (15-1):

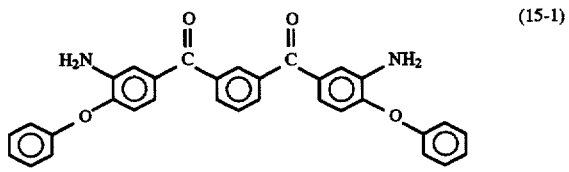

(15-1)

at 100°~250° C. in an organic solvent with one or more tetracarboxylic dianhydride selected from pyromellitic dianhydride, benzophenonetetracarboxylic dianhydride, biphenyltetracarboxylic dianhydride, diphenylethertetracarboxylic dianhydride, naphthalenetetracarboxylic dianhydride, bis(dicarboxyphenyl)sulfone dianhydride, bis[(dicarboxyphenyl)phenyl]propane dianhydride, bis(dicarboxyphenyl)propane dianhydride, bis(dicarboxyphenoxy)benzene dianhydride and bis(dicarboxyphenyl)hexafluoropropane dianhydride.

Fibrous reinforcements which can be used in the invention include glass fiber, carbon fiber, aromatic polyamide fiber, silicon carbide fiber and boron fiber. Carbon fibers which can be more preferably used include acrylic based, rayon-based, lignin-based and pitch-based carbon fibers.

No particular restriction is imposed upon the morphology of fibrous reinforcement and chopped strand, tow (roving) or textile can be used.

The surface-modified fibrous reinforcement of the invention can be obtained by the following processes.

(1) A process for dissolving polyimide of the invention and its precursor in an organic solvent, building up the resulting modifier solution on the surface of fibrous reinforcement and carrying out heat imidization and solvent removal to obtain surface-modified reinforcement.

(2) A process for building up polyamic acid precursor of polyimide of the invention on the surface of fibrous reinforcement and carrying out heat-imidization on the surface of fibrous reinforcement to achieve surface modification.

(3) A process for dissolving polyimide of the invention in an organic solvent, building up the resultant modifier solution on the surface of fibrous reinforcement and removing the solvent to modify the surface.

(4) A process for heat-melting polyimide of the invention on the surface of fibrous reinforcement to coat the surface to be modified.

In these processes, processes (1) and (3) are most common and useful.

The build-up polyimide of the invention as a surface modifier of fibrous reinforcement is preferably 0.5~10 parts by weight, more preferably 2~5 parts by weight for 100 parts by weight of fibrous reinforcement. When the build up is less than 0.5 part by weight, a satisfactory effect cannot be obtained. On the other hand, further improvement of properties cannot be obtained even though the build-up exceeds 10 parts by weight.

In the surface modification of fibrous reinforcement with polyimide of the invention, previous application of other surface treatment on the fibrous reinforcement is preferred because adhesion between polyimide of the invention and fibrous reinforcement is enhanced. No particular restriction is put upon the method of other surface treatment. Any common method for treating the surface of fibrous reinforcement can be applied. Representative methods for the surface treatment include, for example, liquid phase oxidation such as chemical oxidation by nitric acid or permanganate/sulfuric acid and electrolytic oxidation; and gas phase oxidation such as heating in air, oxygen, ozone and other gaseous phases plasma treatment and corona discharge.

The surface of fibrous reinforcement already treated with polyimide of the invention can be further heat treated.

The heat-treating temperature is usually 300°~500° C., preferably 300°~450° C. When the temperature is less than 300° C., the effect of heat treatment cannot be obtained. On the other hand, a temperature exceeding 500° C. is also unfavorable because the surface modifier is liable to decompose by heat. Heating time is usually 0.1~30 hours.

The thus-obtained carbon fiber roving having a surface modified with polyimide resin is cut into a chopped strand having a length of 1~150 mm, dry blended with a desired heat-resistance thermoplastic resin, for example, polyimide resin, polyether ether ketone and polyether sulfone, successively melt-kneaded and extruded with an extruder, and cut into pellets having a prescribed length.

The pellets thus obtained can be processed by commonly known methods such as compression molding, injection molding and extrusion forming to obtain the desired articles.

Further, carbon fiber surface-modified by the above process can also be collected to one direction and successively impregnated with a heat-resistant thermoplastic resin by a common method to obtain prepreg. Such a prepreg can be prepared by melt-impregnation process disclosed, for example, in Japanese Laid-Open Patent HEI 1-121363. Prepregs thus obtained can also be cut into a certain length, laminated so as to orientate the fiber to a prescribed direction and successively hot-pressed to obtain an article.

The surface-modified fibrous reinforcement of the invention has no particular restriction upon thermoplastic resin and can be applied to any known thermoplastic resins.

Exemplary known thermoplastic resins include polycarbonate resin, polyamide resin, polyethylene terephthalate, polybutylene terephthalate, polyphenylene sulfide, polyetherimide, thermoplastic imide resin, polyether sulfone, polyether ether ketone and polyether ketone.

The invention will hereinafter be illustrated further in detail by way of examples. These examples, however, are not to be construed to limit the scope of the invention.

EXAMPLE 1

To a four necked flask equipped with a thermometer, reflux condenser and stirrer, 150 g of N,N-dimethylformamide (DMF), 20 g of toluene, 80 g (0.235 mol) of 4,4'-dichloro-3,3'-dinitrobenzophenone, 45.5 g (0.483 mol) of phenol and 39 g (0.282 mol) of potassium carbonate were charged. The mixture was heated to 130° C. with stirring and successively aged at 130° C. for 5 hours.

After finishing the reaction, the reaction mixture was cooled to 80° C. and filtered to remove inorganic salts.

The filtrate was mixed with 60 g of water and cooled to room temperature to crystallize the desired product.

The precipitated crystals were filtered and sludged with methanol to obtain 92 g (86% yield) of desired 3,3'-dinitro-4,4'diphenoxybenzophenone.

Melting point: 111.0°~112.8° C.

¹H-NMR δ (CDCl₃, ppm): 7.175 (d, 4H (1)), 7.19~7.69 (m, 6H (2)), 7.57 (d, 2H (3)) 8.06 (dd, 2H (4)), 8.52 (d, 2H (5))

(1)~(5) illustrate positions on the following formula.

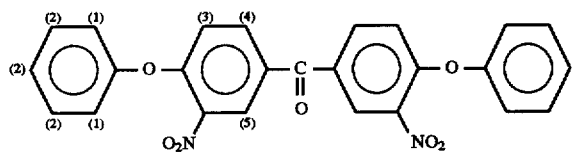

Elemental analysis (C₂₅H₁₆N₂O₇)

|  | C | H | N |
| --- | --- | --- | --- |
| Calculated (%) | 65.79 | 3.53 | 6.13 |
| Found (%) | 65.81 | 3.43 | 6.01 |

EXAMPLE 2

To a reaction apparatus equipped with a thermometer, reflux condenser and stirrer, 60 g (0.131 mol) of 3,3'-dinitro-4,4'-diphenoxybenzophenone, 150 g of methyl cellosolve and 3.0 g of 5%-Pd/C (50% moisture content) were charged and reacted in a hydrogen atmosphere at 70°~80° C. for 4 hours. After finishing the reaction, the catalyst was filtered and the filtrate was concentrated under reduced pressure to obtain 45 g (86% yield) of 3,3'-diamino-4,4'-diphenoxybenzophenone as light yellow crystals.

Melting point: 153.3°~154.0° C.

¹H-NMR δ (CDCl₃, ppm): 4.17 (s, 4H (1)), 6.96 (d, 4H (2)), 7.12~7.63 (m, 6H (3)) 7.21~7.25 (m, 4H (4)), 7.43 (d, 2H (5))

(1)~(5) illustrate positions on the following formula.

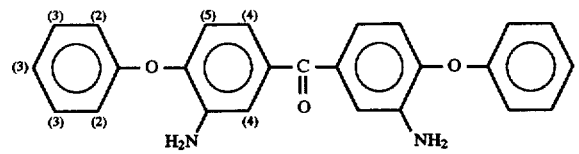

Elemental analysis (C25 H₂₀ N₂ O₃)

|  | C | H | N |
| --- | --- | --- | --- |
| Calculated (%) | 75.74 | 5.18 | 7.07 |
| Found (%) | 75.62 | 5.20 | 7.01 |

EXAMPLE 3

[The first step reaction]

To a glass reaction vessel equipped with a stirrer, thermometer and reflux condenser, 61.3 g (0.2 mol) of 4-chloro-3,3'-dinitrobenzophenone, 19.7 g (0.21 mol) of phenol, 16.6 g (0.12 mol) of potassium carbonate, 220 g of N,N-dimethylformamide and 15 g toluene were charged. The mixture was heated to 140° C. with stirring and aged at 140° C. for 3 hours.

After finishing the reaction, the reaction mixture was cooled to 100° C. and filtered to remove inorganic salts.

The filtrate was mixed with 200 g of water and 50 g of methanol and cooled to room temperature.

The precipitated crystals were filtered and washed with isopropyl alcohol to obtain 69.1 g (94.8% yield) of 3,3'-dinitro-4-phenoxybenzophenone.

The purity measured by high performance liquid chromatography was 99.7%. Melting point was 135.1°~136.0° C.

The IR spectrum is illustrated in FIG. 1.

[The second step reaction]

To a sealed glass reaction vessel equipped with a stirrer, thermometer and reflux condenser, 54.6 g (0.15 mol) of the above obtained 3,3'-dinitro-4-phenoxy-benzophenone, 1.1 g of 5% palladium/alumina catalyst (N.E. Chemcat Co.) and 270 g of N,N-dimethylformamide were charged. Hydrogen was introduced into the reaction vessel at temperature of 40°~50° C. with stirring, and 19.9 1 of hydrogen was absorbed in about 8 hours.

After finishing the reaction, the reaction mixture was filtered at the same temperature to remove the catalyst. The filtrate was concentrated under reduced pressure to obtain 37.0 g (81.2% yield) of 3,3'-diamino-4-phenoxybenzophenone as light yellow crystals.

Purity was 99.1% by high performance liquid chromatography.

Melting point was 111.6°~113.0° C.

Figure 2:
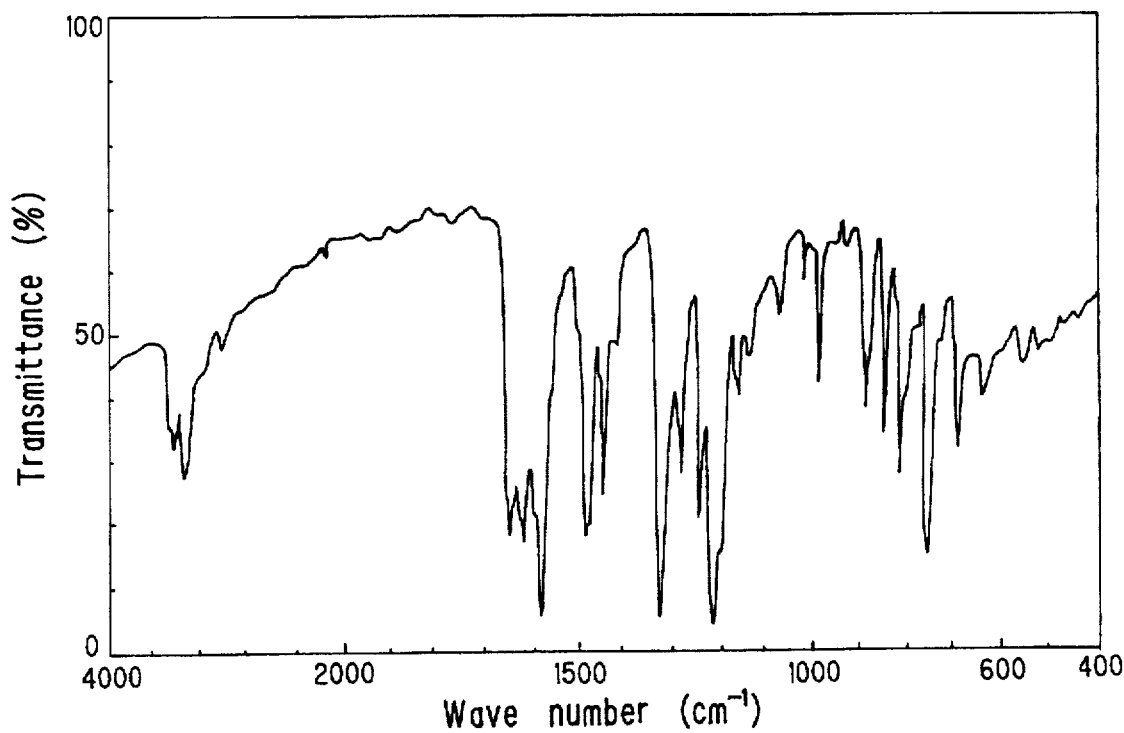
FIG. 2 illustrates an infrared absorption spectrum of 3,3'-diamino-4-phenoxybenzophenone obtained in Example 3.

The IR spectrum is illustrated in FIG. 2.

Elemental analysis (C₁₉H₁₆N₂O₂)

|  | C | H | N |
| --- | --- | --- | --- |
| Calculated (%) | 75.0 | 5.3 | 9.2 |
| Found (%) | 73.9 | 5.6 | 10.1 |

EXAMPLE 4

[The first step reaction]

To a glass reaction vessel equipped with a stirrer, thermometer and reflux condenser, 61.3 g (0.2 mol) of 4-chloro-3,4'-dinitrobenzophenone, 35.7 g (0.21 mol) of p-phenylphenol, 16.6 g (0.12 mol) of potassium carbonate, and 235 g of N,N-dimethylformamide were charged.

The mixture was heated to 140° C. with stirring and aged at 140°~150° C. for 1.5 hours.

After finishing the reaction, the reaction mixture was cooled to 100° C. and filtered to remove inorganic salts.

The filtrate was mixed with water and cooled to room temperature.

The precipitated crystals were filtered and washed with isopropyl alcohol to obtain 73.8 g (83.8% yield) of 3,4'-dinitro-4-biphenoxybenzophenone.

The purity measured by high performance liquid chromatography was 99.5%. Melting point was 139.6°~140.6° C.

Figure 3:
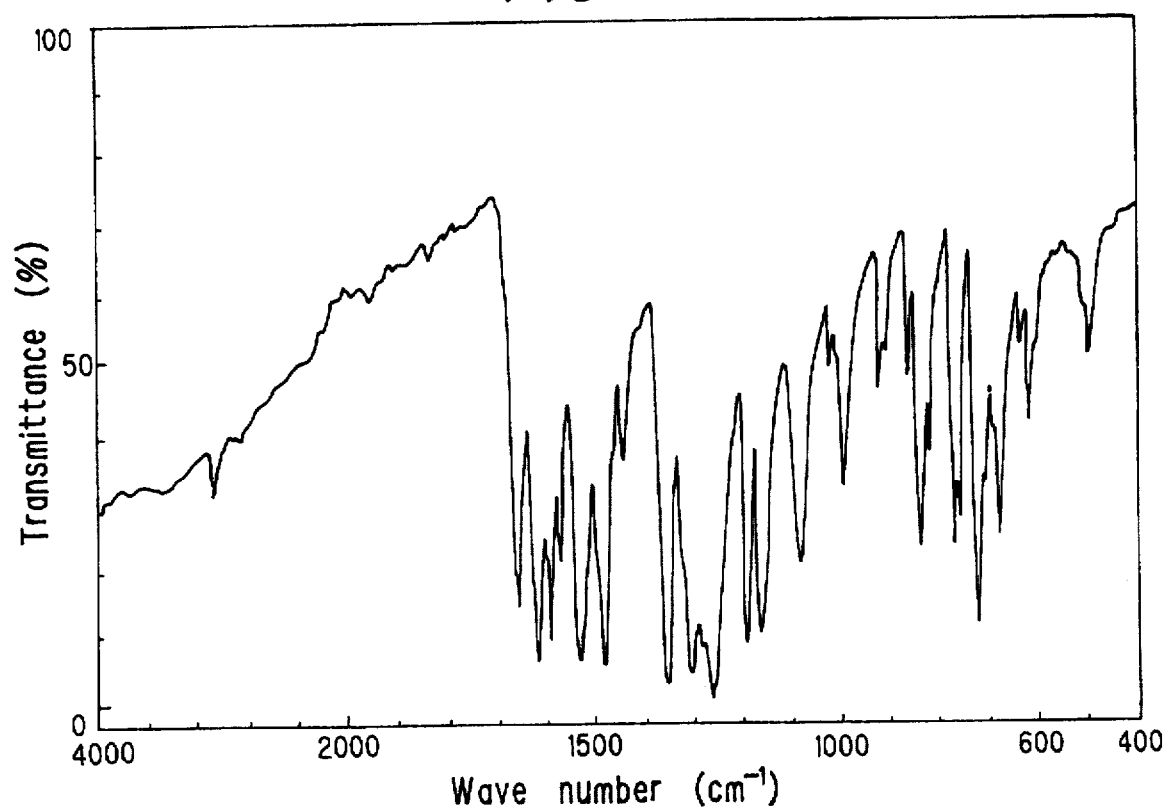
FIG. 3 illustrates an infrared absorption spectrum of 3,4'-dinitro-4-biphenoxybenzophenone obtained in Example 4.

The IR spectrum is illustrated in FIG. 3.

[The second step reaction]

To a sealed glass reaction vessel equipped with a stirrer, thermometer and reflux condenser, 44.0 g (0.1 mol) of the above 3,4'-dinitro-4-biphenoxy-benzophenone, 3.5 g of 5% palladium/alumina catalyst (N. E. Chemcat Co.) and 220 g of N,N-dimethylformamide were charged. Hydrogen was introduced into the reaction vessel at a temperature of 40°~50° C. with stirring, and 12.2 1 of hydrogen was absorbed in about 9 hours.

After finishing the reaction, the reaction was filtered at the same temperature to remove the catalyst. The filtrate was mixed with 70 g of water to obtain 31.8 g (83.6% yield) of 3,4'-diamino-4-biphenoxybenzophenone as light brown crystals.

Purity was 99.1% by high performance liquid chromatography.

Melting point was 244.8°–245.1° C.

Figure 4:
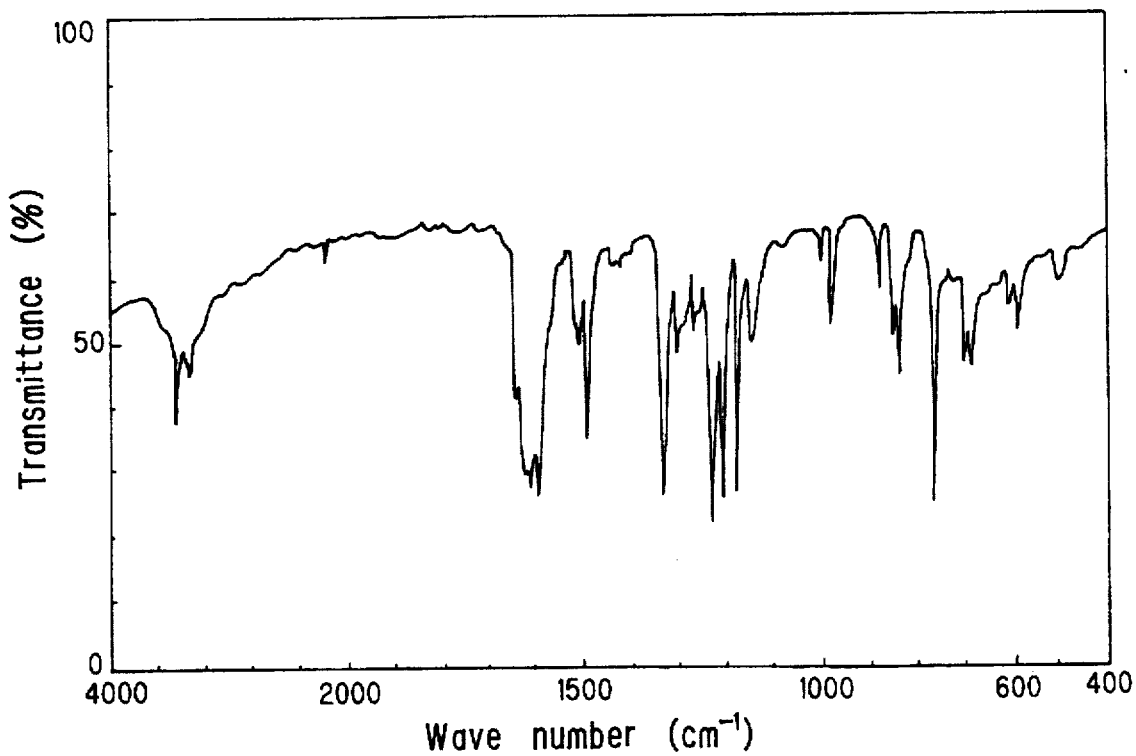
FIG. 4 illustrates an infrared absorption spectrum of 3,4'-diamino-4-biphenoxybenzophenone obtained in Example 4.

The IR spectrum is illustrated in FIG. 4.

Elemental analysis ($C_{25}H_{20}N_2O_2$)

|  | C | H | N |
|---|---|---|---|
| Calculated (%) | 78.9 | 5.3 | 7.4 |
| Found (%) | 78.0 | 5.4 | 7.9 |

EXAMPLE 5

[The first step reaction]

To a glass reaction vessel equipped with a stirrer, thermometer and reflux condenser, 89.0 g (0.2 mol) of 1,3-bis (3-nitro-4-chlorobenzoyl)benzene, 59.3 g (0.63 mol) of phenol, 33.2 g (0.24 mol) of potassium carbonate and 450 g of N,N-dimethylformamide were charged.

The mixture was heated to 110° C. with stirring and aged at 110°–120° C. for 1.5 hours.

After finishing the reaction, the reaction mixture was filtered at the same temperature to remove inorganic salts.

The filtrate was cooled to 80° C., 225 g of water was dropwise added and the mixture was cooled to room temperature.

The precipitated crystals were filtered and recrystallized from 2-methoxyalcohol to obtain 103.7 g (92.5% yield) of 1,3-bis(3-nitro-4-phenoxybenzoyl)benzene.

The purity measured by high performance liquid chromatography was 99.8%. Melting point was 162.3°–163.8° C.

Figure 5:
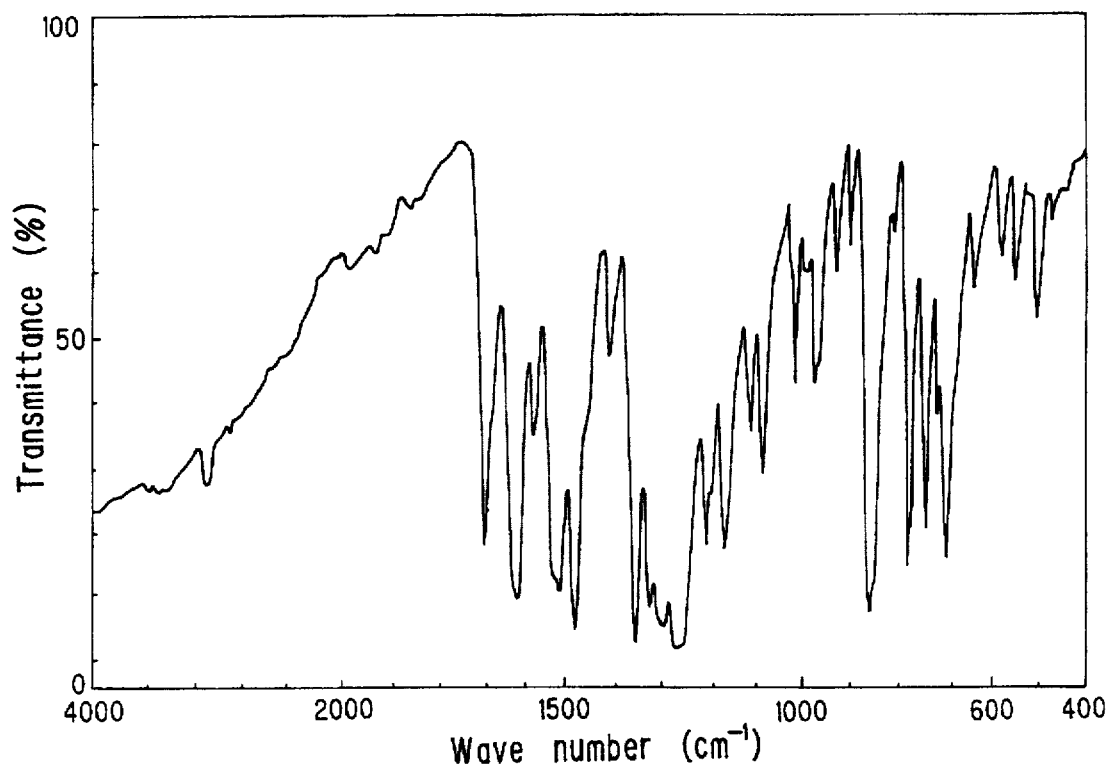
FIG. 5 illustrates an infrared absorption spectrum of 1,3-bis(3-nitro-4-phenoxybenzoyl)benzene obtained in Example 5.

The IR spectrum is illustrated in FIG. 5.

[The second step reaction]

To a sealed glass reaction vessel equipped with a stirrer, thermometer and reflux condenser, 56.1 g (0.1 mol) of the above 1,3-bis(3-nitro-4-phenoxybenzoyl)-benzene, 2.0 g of 5% palladium/alumina catalyst (N. E. Chemcat Co.) and 200 g of N,N-dimethylformamide were charged. Hydrogen was introduced into the reaction vessel at a temperature of 25° C. with stirring, and 12.2 l of hydrogen was absorbed in about 20 hours.

After finishing the reaction, the reaction mixture was filtered at the same temperature to remove the catalyst. The filtrate was mixed with 150 g of water to obtain light brown crystals. The crystals were recrystallized from toluene to obtain 39.1 g (78.1% yield) of 1,3-bis(3-amino-4-phenoxybenzoyl)benzene. Purity was 98.8% by high performance liquid chromatography.

Melting point was 128.0°–129.0° C.

Figure 6:
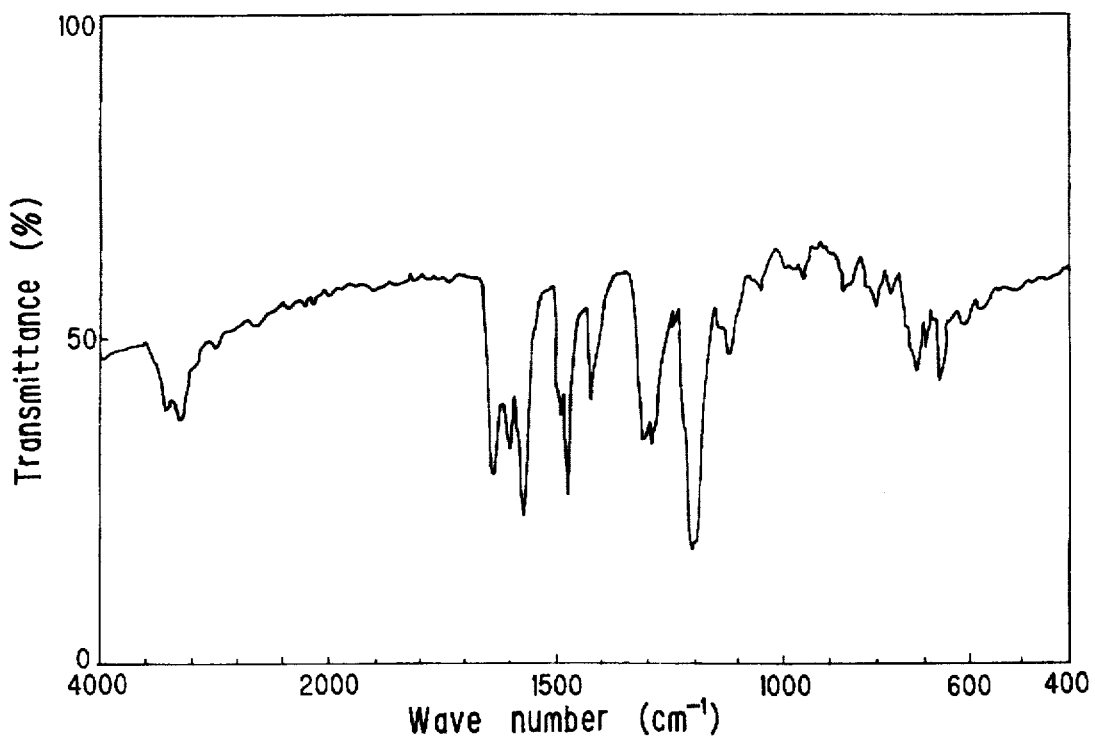
FIG. 6 illustrates an infrared absorption spectrum of 1,3-bis(3-amino-4-phenoxybenzoyl)benzene obtained in Example 5.

The IR spectrum is illustrated in FIG. 6.

Elemental analysis

|  | C | H | N |
|---|---|---|---|
| Calculated (%) | 76.8 | 4.8 | 5.6 |
| Found (%) | 74.0 | 4.9 | 6.1 |

EXAMPLE 6

[The first step reaction]

To a glass reaction vessel equipped with a stirrer, thermometer and reflux condenser, 44.5 g (0.1 mol) of 1,3-bis (3-nitro-4-chlorobenzoyl)benzene, 35.7 g (0.21 mol) of p-phenylphenol, 16.6 g (0.12 mol) of potassium carbonate and 220 g of N,N-dimethylformamide were charged.

The mixture was heated to 90° C. with stirring and aged 3 hours at the same temperature.

After finishing the reaction, the reaction mixture was filtered at the same temperature to remove inorganic salts.

The filtrate was mixed with water. The precipitated crystals were filtered and recrystallized from toluene to obtain 64.7 g (90.5% yield) of 1,3-bis(3-nitro-4-phenoxybenzoyl) benzene.

The purity measured by high performance liquid chromatography was 99.2%. Melting point was 190.6°–191.6° C.

[The second step reaction]

To a sealed glass reaction vessel equipped with a stirrer, thermometer and reflux condenser, 35.7 g (0.05 mol) of the above 1,3-bis(3-nitro-4-biphenoxybenzoyl)-benzene, 33.5 g (0.06 mol) of iron powder and 400 g of a 90% aqueous 2-methoxyethanol solution were charged and warmed to 50° C. To the mixture a solution containing 1.1 g of 35% hydrogen acid in 30 g of 90% 2-methoxyethanol was dropwise added over 2 hours and further stirred for 15 hours at 50°–60° C. After finishing the reaction, the reaction mixture was mixed with 250 g of water and cooled to 25° C. and filtered. The residue was dissolved in 230 g of N,N-dimethylformamide at 110° C. and filtered. The filtrate was mixed with water and cooled to 25° C. The precipitated crystals were recrystallized from toluene to obtain 26.2 g (80.2% yield) of 1,3-bis(3-amino-4-biphenoxybenzoyl) benzene. Purity was 98.8% by high performance liquid chromatography. Melting point was 186.7°–187.8° C.

Figure 7:
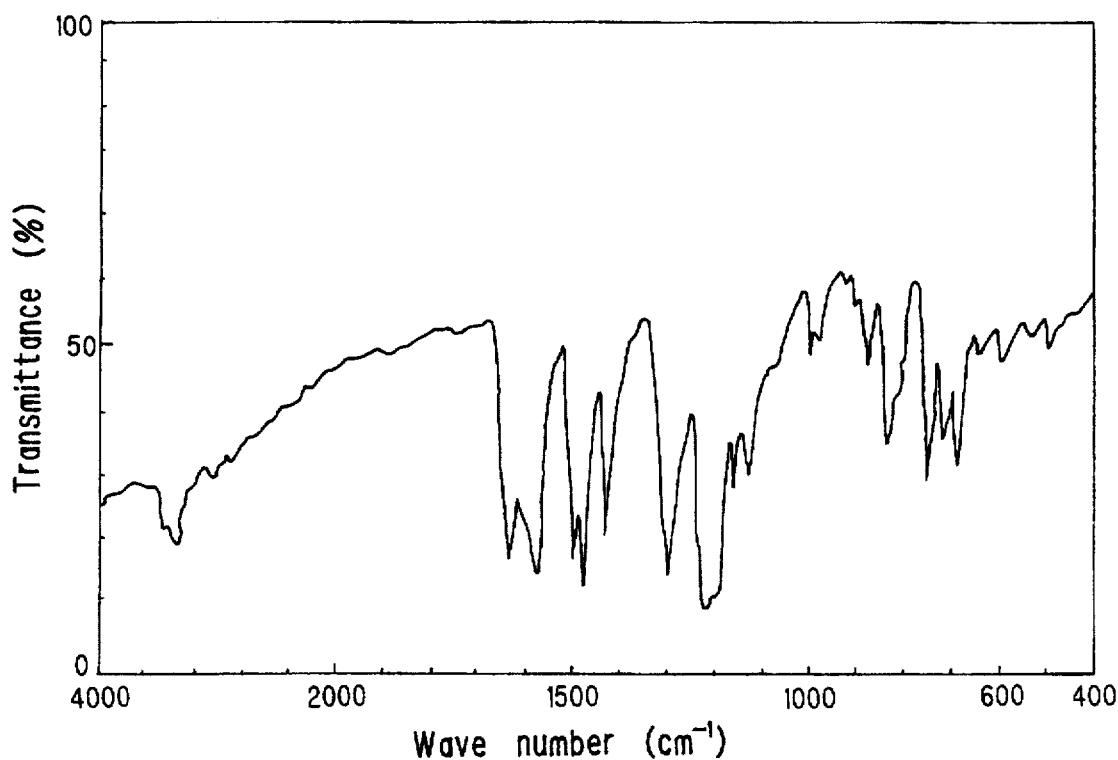
FIG. 7 illustrates an infrared absorption spectrum of 1,3-bis(3-amino-4-biphenoxybenzoyl) benzene obtained in Example 6.

The IR spectrum is illustrated in FIG. 7.

Elemental analysis

|  | C | H | N |
|---|---|---|---|
| Calculated (%) | 81.0 | 4.9 | 4.3 |
| Found (%) | 79.9 | 5.0 | 4.5 |

EXAMPLE 7

[The first step reaction]

To a glass reaction vessel equipped with a stirrer, thermometer and reflux condenser, 500 g of tetrahydrofuran and 100 g (0.293 mol) of 4,4'-dichloro-3,3'-dinitrobenzophenone were charged.

The mixture was cooled to 0° C. with stirring, and then 34.8 g of sodium methoxide (28% methanol solution, 0.645 mol) was added dropwise to the mixture taking 2 hours. Successively, the mixture was aged 3 hours at 20° C.

After finishing the reaction, the reaction mixture was filtered at the same temperature to remove insoluble matter. The filtrate was heated to 60° C. and mixed 990 ml of water and cooled to room temperature to crystallize the desired product.

The above insoluble matter obtained by filtration was sludged with 300 g of water to obtain the desired product.

These products obtained by the above procedures was combined and recrystallized from 1,2-dichloroethane (EDC) to obtain 84 g (86% yield) of 3,3'-dinitro-4,4'-dimethoxybenzophenone. Melting point was 189.0°–189.9° C.

$^1$H-NMR δ (DMSO-$d_6$, ppm): 4.05 (S, 6H(1)), 7.53 (d, 2H(2)), 8.06(dd, 2H(3)), 8.26 (d, 2H(4))

(1)–(4) illustrate positions on the following formula.

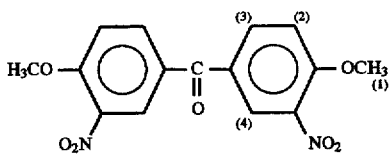

Elemental analysis ($C_{15}H_{12}N_2O_2$)

|  | C | H | N |
| --- | --- | --- | --- |
| Calculated (%) | 54.2 | 3.6 | 8.4 |
| Found (%) | 53.6 | 3.8 | 8.6 |

[The second step reaction]

To a sealed glass reaction vessel equipped with a stirrer, thermometer and reflux condenser, 84 g (0.253 mol) of the above 3,3'-dinitro-4,4'-dimethoxybenzophenone, 420 g of N,N-dimethylformamide and 2.52 g of 5% palladium/alumina catalyst (N.E. Chemcat Co.) were charged and reacted in a hydrogen atmosphere at 45°–55° C. for 3 hours. After finishing the reaction, the catalyst was filtered. The filtrate was heated to 80° C. and then 1275 g of water was added and cooled to temperature to crystallize the desired product. The precipitated crystals were filtered and recrystallized from isopropylalcohol (IPA) to obtain 27 g (39% yield) of 3,3'-diamino-4,4'-dimethoxybenzophenone as light yellow crystals.

Figure 8:
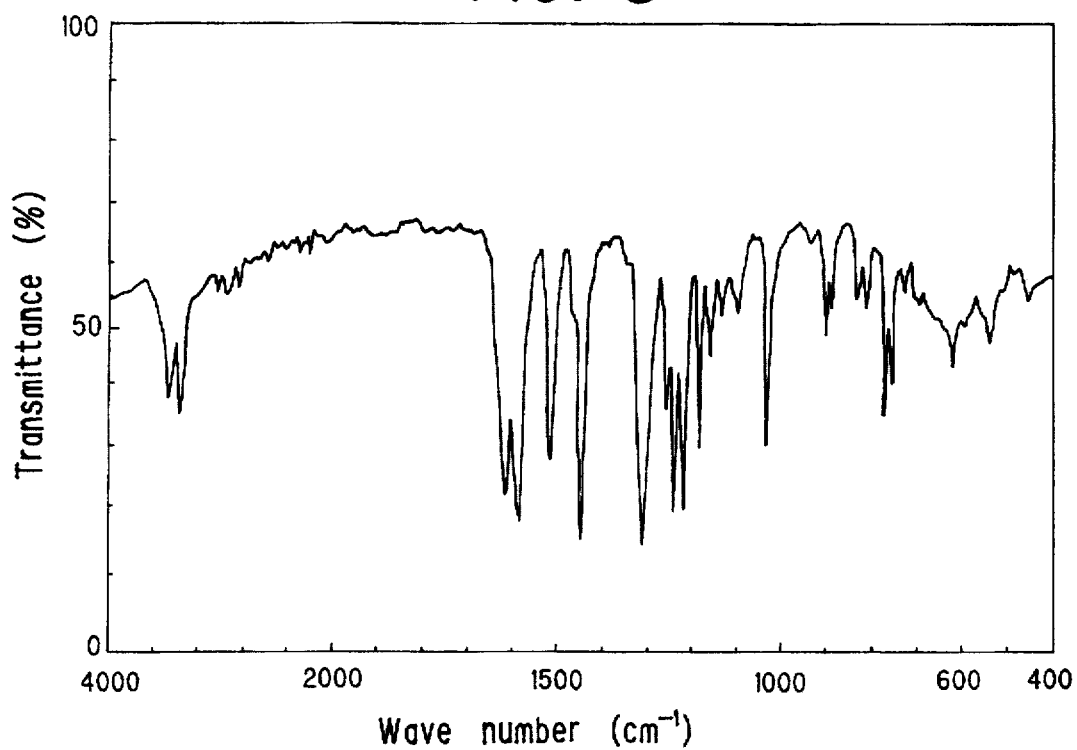
FIG. 8 illustrates an infrared absorption spectrum of 3,3'-diamino-4,4'-dimethoxybenzophenone obtained in Example 7.

Melting point was 128.2°–129.2° C.
The IR spectrum is illustrated in FIG. 8.
Elemental analysis ($C_{15}H_{16}N_2O_2$)

|  | C | H | N |
| --- | --- | --- | --- |
| Calculated (%) | 66.2 | 5.9 | 10.3 |
| Found (%) | 65.9 | 5.8 | 10.1 |

Properties of polyimide in the below examples were measured by the following methods.

Tg, Tc and Tm: Measured in the air by DTG with Shimadzu DT-40 Series DSC-4019.

5% weight loss temperature: Measured by DTA-Tg (Shimazu DT-40 series, DSC-40M) in the air.

Melt viscosity: Measured with a Shimadzu Koka type flow tester (CFT-500A) under 100 kg load.

Melt flow initiation temperature: Measured with a Shimadzu Koka flow tester (SFT-500A) under a 100 kg load at a temperature rise rate of 5° C./min.

Adhesion test (Lap shear strength): Paste was prepared by individually suspending polyimide powder in ethanol and coated on two cold rolled steel panels (JIS G-3141, SPCC, SD) having 1.6×25×100 mm³ in size. The coated panels were hot pressed under a pressure of 21 kg/cm² at temperature of 280°, 300° and 350° C.; respectively. Tensile shear strength of the adhered specimens were measured in accordance with JIS K-6848.

Inherent viscosity: Polyamic acid was dissolved in N,N-dimethylformamide. Polyimide was dissolved in a solvent mixture of p-chlorophenol/phenol (9/1 by weight). The viscosity was at 35° C. in a concentration of 0.5 g sample/100 ml solvent.

EXAMPLE 8

To a reaction vessel equipped with a stirrer, reflux condenser and nitrogen inlet tube, 39.65 g (0.1 mol) of 3,3'-diamino-4,4'-diphenoxybenzophenone, 31.58 g (0.098 mol) of 3,3',4,4'-benzophenonetetracarboxylic dianhydride, 0.592 g (0.04 mol) of phthalic anhydride, 1.40 g of γ-picoline and 284.92 g of m-cresol were charged. The mixture was heated to 150° C. with stirring in a nitrogen atmosphere and successively reacted at 150° C. for 4 hours while distilling out about 3.6 ml of water.

After finishing the reaction, the reaction mixture was cooled to the room temperature and poured into about 2 l of methyl ethyl ketone.

Precipitated powder was filtered, washed with methyl ethyl ketone, and dried in air at 50° C. for 24 hours and successively in a nitrogen atmosphere at 230° C. for 4 hours to obtain 66.25 g (97.1% yield) of polyimide powder.

The polyimide powder had an inherent viscosity of 0.56 dl/g, glass transition temperature of 246° C. and 5% weight loss temperature of 524° C.

The X-ray diffraction pattern (XRD) of the polyimide powder indicated amorphous form.

Figure 9:
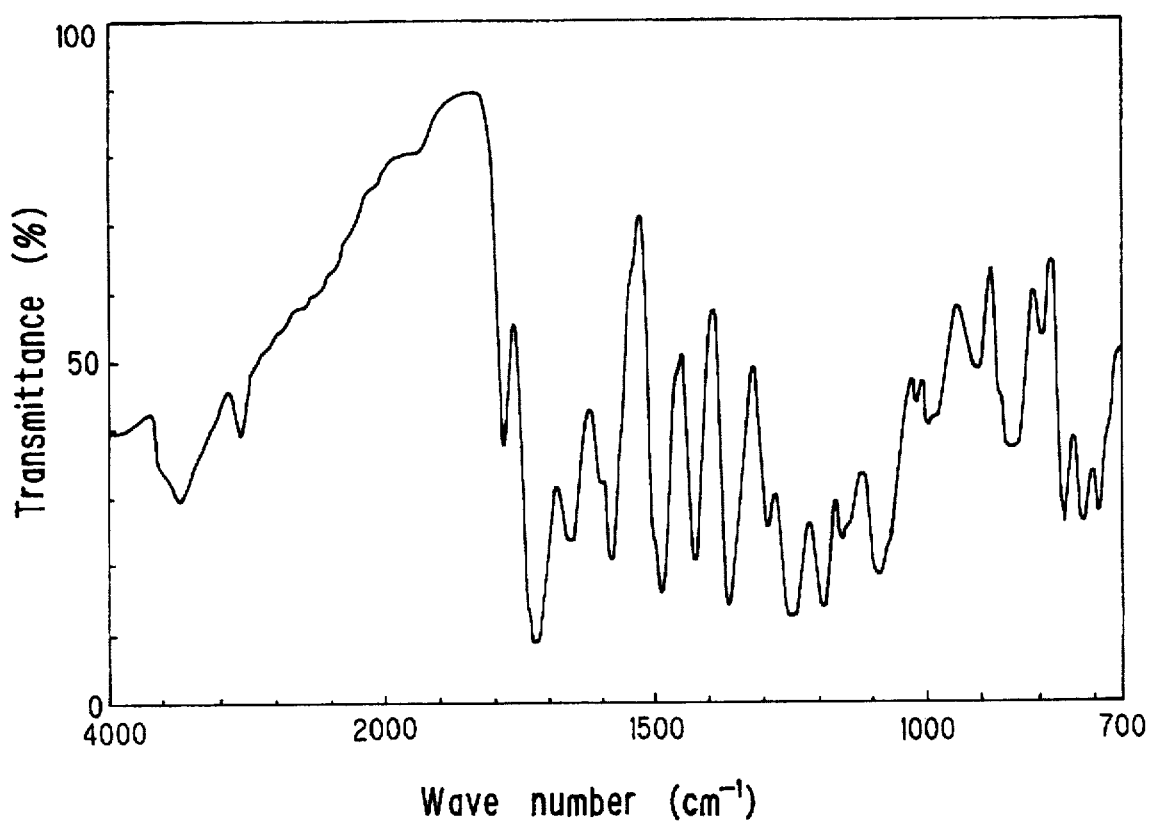
FIG. 9 illustrates an infrared absorption spectrum of polyimide powder in Example 8.

The IR absorption spectrum of the polyimide powder is illustrated in FIG. 9. The spectrum atlas clearly indicated characteristic absorption bands of imide at around 1780 cm$^{-1}$ and 1720 cm$^{-1}$.

Results of elemental analysis on the polyimide powder were as follows.

|  | C | H | N |
| --- | --- | --- | --- |
| Calculated (%) | 73.89 | 3.25 | 4.10 |
| Found (%) | 73.59 | 3.19 | 4.15 |

Figure 10:
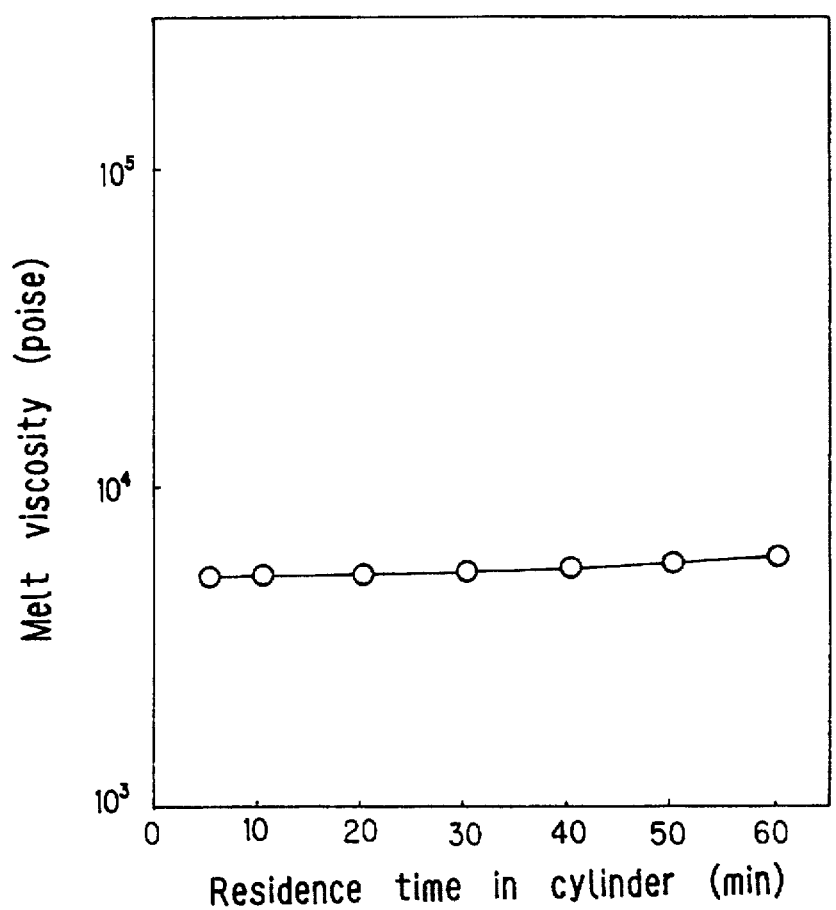
FIG. 10 is a drawing illustrating the relationships between the viscosity and the residence time of the polyimide powder obtained in Example 8 in the cylinder of a flow tester.

Melt flow initiation temperature measured with a Koka type flow tester was 325° C. Processing stability of the polyimide powder was also measured by changing the residence time in the cylinder of the flow tester. Results at 380° C. under a 100 kg load are illustrated in FIG. 10.

Melt viscosity is almost constant even though residence time in the cylinder is extended and indicates good stability in processing the polyimide powder.

An adhesion test (Lap shear strength measurement) was carried out by using the polyimide powder. Lap shear strength was 152 kg/cm² at a press temperature of 280° C., 230 kg/cm² at 300° C. and 332 kg/cm² at 350° C., respectively.

Further, the solubility of the polyimide powder was examined at room temperature. The polyimide powder was dissolved at a concentration of the 20% by weight in chloroform, dichloromethane, carbon tetrachloride, N,N-dimethylformamide, N,N-dimethylacetamide, N-methyl-2-pyrrolidone, and o-, m-, and p-cresol.

Comparative Example 1

To the same apparatus as used in example 7, 21.23 g (0.1 mol) of 3,3'-diaminobenzophenone, 31.58 g (0.098 mol) of 3,3',4,4'-benzophenonetetracarboxylic dianhydride, 0.592 g (0.004 mol) of phthalic anhydride, 1.40 g of γ-picoline and 211 g m-cresol were charged. The mixture was heated to 150° C. with stirring in a nitrogen atmosphere and reacted at 150° C. for 4 hours while distilling out about 3.6 ml of water.

After finishing the reaction, the reaction mixture was cooled to 110° C. and 200 g of toluene was added dropwise to precipitate polyimide powder. The powder was filtered, washed with 300 g of toluene and dried in air at 50° C. for 24 hours and successively in a nitrogen atmosphere at 250° C. for 4 hours to obtain 47.68 g (95.7% yield) of polyimide powder.

The polyimide powder thus obtained had an inherent viscosity of 0.55 dl/g, glass transition temperature of 243° C., melting point of 315° C. and 5% weight loss temperature of 537° C. X-ray diffraction pattern of the polyimide powder indicated crystalline polyimide.

Further, the polyimide powder had a melt flow initiation temperature of 335° C. and a Lap shear strength of 0 kg/cm at 280° C., 21 kg/cm² at 300° C. and 328 kg/cm² at 350° C., respectively.

The polyimide powder was partly dissolved only in cresol at a concentration of 10% by weight at room temperature, and quite insoluble in other organic solvents enumerated in Example 8.

EXAMPLES 9 TO 21, COMPARATIVE EXAMPLES 2 AND 3

Various kinds of polyimide powder were prepared from the diamine components illustrated in Table 1 by carrying out the same procedures as described in Example 8.

Table 1 illustrates diamine components, acid anhydride components, yield, fundamental properties such as inherent viscosity and Tg, and Lap shear strengths of these examples together with the results in Example 8 and Comparative Example 1.

Table 2 illustrates results on dissolving the polyimide of these examples in various organic solvents together with the results in Example 8 and Comparative Example 1.

EXAMPLE 22

To a flask equipped with a stirrer, reflux condenser and nitrogen inlet tube, 39.65 g (0.1 mol) of 3,3'-diamino-4,4'-diphenoxybenzophenone and 287.5 g of N,N-dimethylacetamide were charged and 32.22 g (0.1 mol) of 3,3',4,4'-benzophenonetetracarboxylic dianhydride was added by portions in a nitrogen atmosphere with caution to prevent temperature rise of the solution.

Thereafter the mixture was stirred for about 30 hours at room temperature. Polyamic acid thus obtained had an inherent viscosity of 0.74 dl/g. A portion of the polyimide solution was cast on a glass plate and heated at 100°, 200° and 300° C. in order, respectively for an hour to obtain a film.

The polyimide film thus obtained had Tg of 250° C., tensile strength of 11.35 kg/cm², elongation of 3.2% and tensile elastic modulus of 384 kg/cm². The polyimide film was dissolved in all organic solvents enumerated in Example 8 at a concentration of 20% by weight.

EXAMPLES 23 TO 30, COMPARATIVE EXAMPLES 4 AND 5

Various kinds of polyimide film were prepared from diamine components illustrated in Table 3 by carrying out the same procedures as described in Example 22.

Table 3 illustrates diamine components, acid anhydride components, inherent viscosity of polyamic acids, Tg and mechanical properties of these films together with the results in Example 8.

Table 3 also illustrates results on dissolving these films at a concentration of 20% by weight in chloroform, N,N-dimethylacetamide and m-cresol.

TABLE 1

| | Diamine | Acid anhydride | Yield | η | Tg | Tm | Td(5.0)*[1] | Flow initiation temperature | XRD | Lap shear strength*[2] | | |
|---|---|---|---|---|---|---|---|---|---|---|---|---|
| | g (mol) | g (mol) | (%) | (dl/g) | (°C.) | (°C.) | (°C.) | (°C.) | PATTERN | 280° C. | 300° C. | 350° C. |
| Example 8 | 3,3'-DABP-DPO*[3] 39.65 (0.1) | BTDA*[9] 31.58(0.098) | 97.1 | 0.56 | 246 | no | 524 | 325 | amorphous | 152 | 230 | 332 |
| Example 9 | 3,3'-DABP-MPO*[4] 30.44(↑) | ↑ | 96.3 | 0.59 | 248 | ↑ | 533 | 325 | ↑ | 209 | 263 | 357 |
| Example 10 | 3,4'-DABP-MPO*[5] ↑ | ↑ | 96.6 | 0.58 | 265 | ↑ | 529 | 340 | ↑ | 84 | 172 | 351 |
| Example 11 | 3,3'-DABP-DBO*[6] 54.78 (↑) | ↑ | 97.0 | 0.47 | 241 | ↑ | 525 | 320 | ↑ | 148 | 214 | 304 |
| Example 12 | 3,3'-DABP-MBO*[7] 38.05 (↑) | ↑ | 97.7 | 0.56 | 246 | ↑ | 535 | 325 | ↑ | 142 | 232 | 353 |
| Example 13 | 3,4'DABP-MB)*[8] ↑ | ↑ | 96.2 | 0.55 | 258 | ↑ | 530 | 340 | ↑ | 109 | 220 | 327 |
| Comparative Example 1 | 3,3'-DABP*[9] 21.23 (↑) | ↑ | 97.0 | 0.55 | 243 | 315 | 537 | 335 | crystalline | 0 | 21 | 328 |
| Example 14 | 3,3'-DABP-DPO 39.65 (0.1) | PMDA*[10] 21.38 (0.098) | 98.0 | 0.53 | 259 | no | 530 | 340 | amorphous | 95 | 230 | 300 |
| Example 15 | 3,3'-DABP-MPO 30.44 (↑) | ↑ | 97.9 | 0.54 | 258 | ↑ | 528 | 345 | ↑ | 120 | 235 | 310 |
| Example 16 | 3,3'-DABP-DBO 54.78 (0.1) | BPDA*[11] 28.83 (0.098) | 96.8 | 0.60 | 231 | ↑ | 537 | 310 | ↑ | 130 | 243 | 293 |
| Example 17 | 3,4'-DABP-MBO 38.05 (0.1) | ↑ | 97.3 | 0.58 | 232 | ↑ | 532 | 320 | ↑ | 145 | 234 | 272 |
| Example 18 | 3,3'-DABP-DPO 39.65 (0.1) | 6FDA*[12] 43.54 (0.098) | 98.1 | 0.57 | 225 | ↑ | 521 | 300 | ↑ | 150 | 261 | 279 |
| Example 19 | 3,4'-DABP-MBO 38.05 (0.1) | NTDA*[13] 26.28 (0.098) | 97.5 | 0.59 | 280 | ↑ | 550 | 380 | ↑ | 86 | 123 | 241 |
| Example 20 | 3,3'-DABP-DMO 27.33 (0.1) | BTDA ↑ 31.58 (0.098) | 97.1 | 0.58 | 243 | ↑ | 523 | 330 | ↑ | 155 | 181 | 321 |
| Example 21 | 3,3'-DABP-DMO 27.33 (0.1) | PMDA 21.38 (0.098) | 98.2 | 0.60 | 252 | ↑ | 530 | 330 | ↑ | 131 | 203 | 290 |
| Comparitive | 3,3'-DABP | PMDA | 96.8 | 0.54 | 260 | ↑ | 540 | 350 | ↑ | 154 | 231 | 310 |

TABLE 1-continued

| | Diamine g (mol) | Acid anhydride g (mol) | Yield (%) | η (dl/g) | Tg (°C.) | Tm (°C.) | Td(5.0)*[1] (°C.) | Flow initiation temperature (°C.) | XRD PATTERN | Lap shear strength*[2] 280° C. | 300° C. | 350° C. |
|---|---|---|---|---|---|---|---|---|---|---|---|---|
| Example 2 Comparative Example 3 | 21.23 (0.1) ↑ (↑) | 21.38 (0.098) BPDA 28.83 (0.098) | 97.2 | 0.55 | 235 | ↑ | 538 | 320 | ↑ | 161 | 200 | 270 |

Note
*[1] 5% weight loss temperature
*[2] Kg/mm² unit
*[3] 3,3'-diamino-4,4-diphenoxybenzophenone
*[4] 3,3'-diamino-4-phenoxybenzophenone
*[5] 3,4'-diamino-4-phenoxybenzophenone
*[6] 3,3'-diamino-4,4'-dibiphenoxybenzophenone
*[7] 3,3'-diamino-4-biphenoxybenzophenone
*[8] 3,4'-diamino-4-biphenoxybenzophenone
*[9] 3,3',4,4-benzophenonetetracarboxylic dianhydride
*[10] pyromellitic dianhydride
*[11] 3,3',4,4'-biphenyltetracarboxylic dianhydride
*[12] 1,1,1,3,3,3-hexafluoro-2,2-bis(dicarboxphenyl)dianhydride
*[13] 2,3,6,7-naphthalenetetracarboxylic dianhydride
*[14] 3,3'-diamino-4,4'-dimethoxybenzophenone

TABLE 2

| | Organic solvent | | | | | | |
|---|---|---|---|---|---|---|---|
| | Chloroform | Dichloromethane | Carbon tetrachloride | N,N-Dimethylformamide | N,N-Dimethylacetamide | N-Methyl-2-pyrrolidone | m-cresol |
| Example 8 | o | o | o | o | o | o | o |
| Example 9 | o | o | o | o | o | o | o |
| Example 10 | o | o | o | o | o | o | o |
| Example 11 | o | o | o | o | o | o | o |
| Example 12 | o | o | o | o | o | o | o |
| Example 13 | o | o | o | o | o | o | o |
| Comparative Example 1 | x | x | x | x | x | x | partly soluble |
| Example 14 | o | o | o | o | o | o | o |
| Example 15 | o | o | o | o | o | o | o |
| Example 16 | o | o | o | o | o | o | o |
| Example 17 | o | o | o | o | o | o | o |
| Example 18 | o | o | o | o | o | o | o |
| Example 19 | o | partly soluble | partly soluble | o | o | o | o |
| Example 20 | o | partly soluble | partly soluble | o | o | o | o |
| Example 21 | o | partly soluble | partly soluble | o | o | o | o |
| Comparative Example 2 | x | x | x | x | x | x | x |
| Comparative Example 3 | x | x | x | x | x | x | partly soluble |

Note
o: soluble
x: insoluble

TABLE 3

| | Diamine g (mol) | Acid anhydride g (mol) | η (dl/g) | Tg (°C.) | Mechanical Property*[1] Ts (Kg/mm²) | El (%) | TM (Kg/mm²) | Solubility*[10] Chloroform | DNAC*[2] | m-Cresol |
|---|---|---|---|---|---|---|---|---|---|---|
| Example 22 | 3,3'-DABP-DPO*[3] 39.65 (0.1) | BTDA*[9] 31.58 (0.098) | 0.74 | 250 | 11.35 | 3.2 | 384 | o | o | o |
| Example 23 | 3,3'-DABP-MPO*[4] 30.44 (↑) | ↑ | 0.81 | 252 | 13.23 | 4.6 | 359 | o | o | o |
| Example 24 | 3,4'-DABP-MPO*[5] 30.44 (↑) | ↑ | 0.70 | 270 | 14.05 | 4.5 | 378 | o | o | o |
| Example 25 | 3,3'-DABP-DBO*[6] 54.78 (↑) | ↑ | 0.63 | 244 | 12.89 | 4.3 | 366 | o | o | o |

TABLE 3-continued

| | Diamine g (mol) | Acid anhydride g (mol) | η (dl/g) | Tg (°C.) | Mechanical Property*[1] | | | Solubility*[10] | | |
|---|---|---|---|---|---|---|---|---|---|---|
| | | | | | Ts (Kg/mm²) | El (%) | TM (Kg/mm²) | Chloroform | DNAC*[2] | m-Cresol |
| Example 26 | 3,3'-DABP-MBO*[7] 38.05 (↑) | ↑ | 0.74 | 247 | 13.28 | 3.9 | 379 | o | o | o |
| Example 27 | 3,4'-DABP-MBO*[8] 38.05 (↑) | ↑ | 0.68 | 260 | 13.59 | 5.3 | 391 | o | o | o |
| Example 28 | 3,3'-DABP-DBO 54.78 (0.1) | PMDA*[10] 21.38 (0.098) | 0.71 | 251 | 13.21 | 6.5 | 351 | o | o | o |
| Example 29 | 3,3'-DABP-DPO 39.65 (↑) | ↑ | 0.77 | 259 | 13.85 | 6.7 | 342 | o | o | o |
| Example 30 | 3,4'-DABP-DMO 27.33 (↑) | BPDA*[11] 28.83 (0.098) | 0.70 | 240 | 12.34 | 7.0 | 356 | partly soluble | o | o |
| Comparative Example 4 | 3,3'-DABP 21.23 (↑) | BTDA 31.58 (0.098) | 0.85 | 251 | 13.60 | 6.0 | 360 | x | x | partly soluble |
| Comparative Example 5 | 3,3'-DABP 21.23 (↑) | PMDA 21.38 (0.098) | 0.75 | 268 | 13.45 | 6.6 | 358 | x | x | x |

Note
*[1]Ts: Tensile strength
El: Elongation
TM: Tensile modulus
*[2]: N,N-dimethylacetamide
*[3]: 3,3'-diamino-4,4'-diphenoxybenzophenone
*[4]: 3,3'-diamino-4-phenoxybenzophenone
*[5]: 3,4'-diamino-4-phenoxybenzophenone
*[6]: 3,3'-diamino-4,4'-dibiphenoxybenzophenone
*[7]: 3,3'-diamino-4-biphenoxybenzophenone
*[8]: 3,4'-diamino-4-biphenoxybenzophenone
*[9]: 3,3',4,4'-benzophenonetetracarboxylic dianhydride
*[10]o: soluble x: insoluble

EXAMPLE 31

To a reaction vessel equipped with a stirrer, reflux condenser and nitrogen inlet tube, 25.03 g (0.05 mol) of 1,3-bis(3-amino-4-phenoxybenzoyl)benzene, 15.47 g (0.048 mol) of 3,3',4,4'-benzophenonetetracarboxylic dianhydride, 0.592 g (0.004 mol) of phthalic anhydride, 0.70g γ-picoline and 162.0 g of m-cresol were charged. The mixture was heated to 150° C. with stirring in a nitrogen atmosphere and successively reacted at 150° C. for 4 hours while distilling out about 1.8 mL of water.

After finishing the reaction the reaction mixture was cooled to room temperature and poured into about 1 l of methyl ethyl ketone. Precipitated powder was filtered, washed with methyl ethyl ketone, and dried in air at 50° C. for 24 hours and successively in a nitrogen atmosphere at 220° C. for 4 hours to obtain 37.88 g (96.4% yield) of polyimide powder.

The polyimide powder had an inherent viscosity of 0.51 dl/g, glass transition temperature of 233° C. and 5% weight loss temperature of 522° C.

The X-ray diffraction pattern (XRD) of the polyimide powder indicated an amorphous form.

Figure 11:
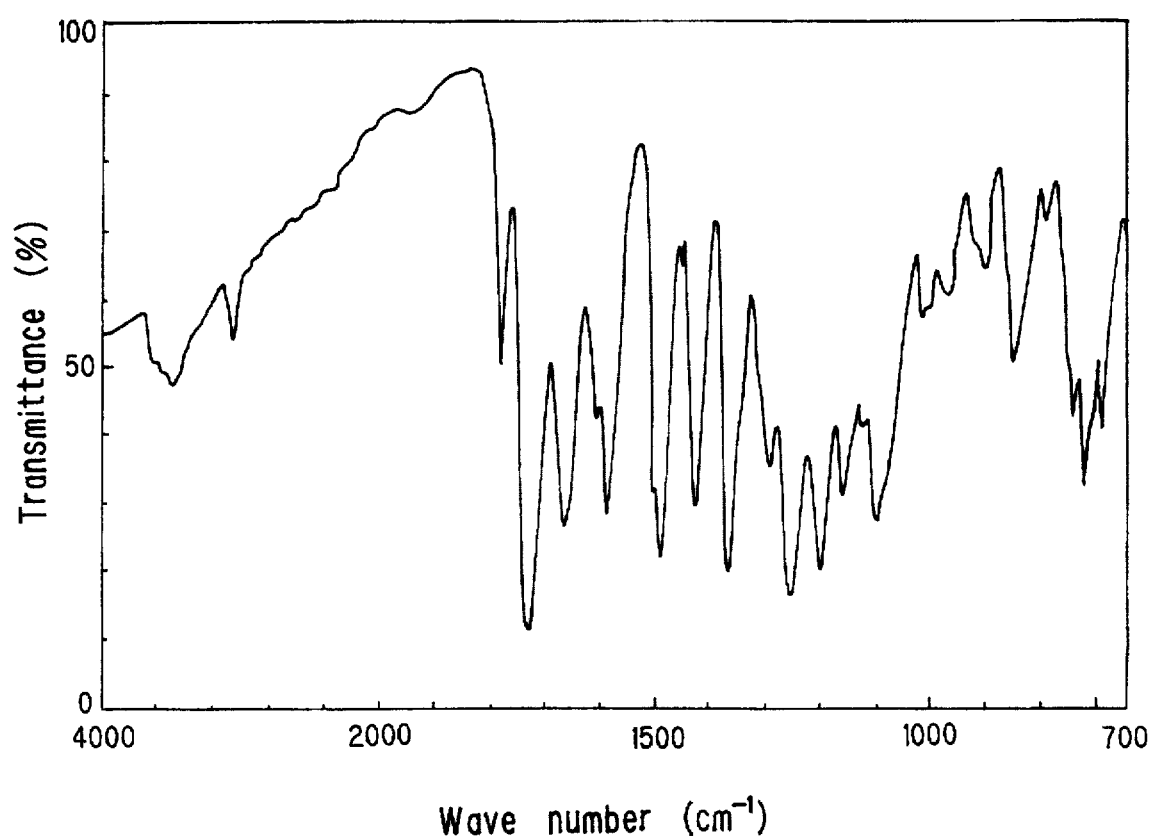
FIG. 11 illustrates an infrared absorption spectrum of the polyimide powder obtained in Example 31.

The IR absorption spectrum of the polyimide powder is illustrated in FIG. 11. The spectrum atlas clearly indicated characteristic absorption bands of imide at around 1780 cm⁻¹ and 1720 cm⁻¹.

Results of elemental analysis on the polyimide powder were as follows.

| | C | H | N |
|---|---|---|---|
| Calculated (%) | 74.80 | 3.34 | 3.56 |
| Found (%) | 73.55 | 3.38 | 3.67 |

Figure 12:
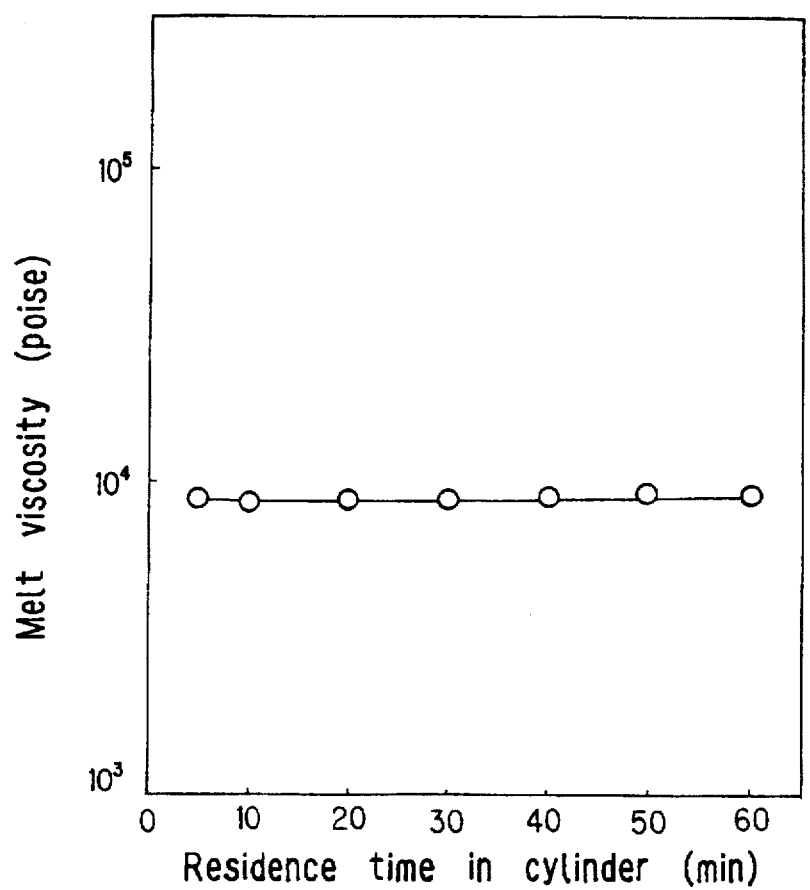
FIG. 12 is a drawing illustrating the relationship between the viscosity and the residence time of the polyimide powder obtained in Example 31 in the cylinder of a flow tester.

Melt flow initiation temperature measured with a Koka type flow tester was 330° C. Processing stability of the polyimide powder was also measured by changing the residence time in the cylinder of the flow tester. Results at 380° C. under a 100 kg load are illustrated in FIG. 12.

Melt viscosity is almost constant even though residence time in the cylinder is extended and indicates good stability in processing the polyimide powder.

Further, solubility of the polyimide powder was examined at room temperature. The polyimide powder was dissolved at a concentration of 20% by weight in chloroform, dichloromethane, carbon tetrachloride, 1,1,2-trichloroethane, N,N-dimethylformamide, N,N-dimethylacetamide, N-methyl-2-pyrrolidone, and o-, m- and p-cresol.

Comparative Example 6

To the same apparatus as used in example 31, 15.82 g (0.05 mol) of 1,3-(3-aminobenzoyl)benzene, 15.47 g (0.048 mol) of 3,3',4,4'-benzophenonetetracarboxylic dianhydride, 0.592 g (0.004 mol) of phthalic anhydride, 0.70 g γ-picoline and 125.2 g of m-cresol were charged. The mixture was heated to 150° C. with stirring in a nitrogen atmosphere and reacted at 150° C. for 4 hours while distilling out about 1.8 ml of water.

After finishing the reaction, the reaction mixture was treated by the same procedures used in Example 31.

Polyimide powder thus obtained was 28.96 g (96.3% yield) and had an inherent viscosity of 0.49 dl/g and 5% weight loss temperature of 529° C.

Further, the polyimide powder had a flow initiation temperature of 325° C.

The polyimide powder was partly dissolved only in cresol at a concentration of 20% by weight at room temperature, and quite insoluble in other organic solvents enumerated in Example 31.

EXAMPLES 32 TO 34 AND COMPARATIVE EXAMPLE 7

Various kinds of polyimide powder were prepared from the diamine components illustrated in Table 4 by carrying out the same procedures as described in Example 31.

Table 4 illustrates diamine components acid anhydride components, yield, fundamental properties such as inherent viscosity and Tg of these examples together with the results in Example 31 and Comparative Example 6.

Table 5 further illustrates results on dissolving the polyimide of these examples in various organic solvents together with the results in Example 31 and Comparative Example 6.

EXAMPLE 35

To a flask equipped with a stirrer, reflux condenser and nitrogen inlet tube, 25.03 g (0.05 mol) of 1,3-bis(3-amino-4-phenoxybenzoyl)benzene and 164.6 g of N,N-dimethylacetamide were charged and 16.11 g (0.05 mol) of 3,3',4,4'-benzophenonetetracarboxylic dianhydride was added by portions in a nitrogen atmosphere with caution to prevent temperature rise of the solution.

Thereafter the mixture was stirred for about 30 hours at room temperature. Polyamic acid thus obtained had an inherent viscosity of 0.92 dl/g. A portion of the polyimide solution was cast on a glass plate and heated at 100°, 200° and 300° C. in order, respectively for an hour to obtain a film.

The polyimide film thus obtained had Tg of 231° C., tensile strength of 11.70 kg/cm$^2$, elongation of 3.9% and tensile elastic modulus of 336 kg/cm$^2$. The polyimide film was dissolved in all organic solvents enumerated in Example 31 at a concentration of 20% by weight.

EXAMPLE 36 AND COMPARATIVE EXAMPLE 8

Various Kinds of polyimide film were prepared from diamine components illustrated in Table 6 by carrying out the same procedures as described in Example 35.

Table 6 illustrates diamine components, acid anhydride components, inherent viscosity of polyamic acids, Tg and mechanical properties of these films together with the results in Example 35.

Table 6 also illustrates the results on dissolving these films at a concentration of 20% by weight in chloroform, N,N-dimethylacetamide and m-cresol.

TABLE 4

| | Diamine g (mol) | Acid anhydride g (mol) | Yield (%) | η (dl/g) | Tg (°C.) | Tm (°C.) | Td(5.0)*[1] (°C.) | Flow initiation temperature (°C.) | XRD PATTERN |
|---|---|---|---|---|---|---|---|---|---|
| Example 31 | m,m-ABB-DPO*[2] 25.03 (0.05) | BTDA*[5] 15.47(0.048) | 96.4 | 0.51 | 233 | no | 522 | 330 | amorphous |
| Example 32 | ↑ | PMDA*[6] 10.47(0.046) | 95.7 | 0.50 | 256 | ↑ | 527 | 330 | ↑ |
| Example 33 | m,m-ABB-DBO*[3] 32.64 (↑) | BTDA 15.47(0.048) | 96.8 | 0.53 | 231 | ↑ | 523 | 320 | ↑ |
| Example 34 | ↑ | PMDA 10.47(0.048) | 96.0 | 0.49 | 248 | ↑ | 527 | 315 | ↑ |
| Comparative Example 6 | m,m-ABB*[4] 15.82 (0.05) | BTDA 15.47(0.048) | 96.3 | 0.49 | 219 | ↑ | 535 | 325 | ↑ |
| Comparative Example 7 | ↑ | PNDA 10.47(0.048) | 97.0 | 0.48 | 251 | 451 | 538 | no flow | crystalline |

Note
*[1] 5% weight loss temperature
*[2] 1,3-bis(3-amino-4-phenoxybenzoyl)benzene
*[3] 1,3-bis(3-amino-4-biphenoxybenzoyl)benzene
*[4] 1,3-bis(3-aminobenzoyl)benzene
*[5] 3,3',4,4'-benzophenonetetracarboxylic dianhydride
*[6] pyromellitic dianhydride

TABLE 5

| | Organic solvent | | | | | | |
|---|---|---|---|---|---|---|---|
| | Chloroform | Dichloromethane | Carbon tetrachloride | N,N-Dimethylformamide | N,N-Dimethylacetamide | N-Methyl-2-pyrrolidone | m-cresol |
| Example 31 | o | o | o | o | o | o | o |
| Example 32 | o | o | o | o | o | o | o |
| Example 33 | o | o | o | o | o | o | o |
| Example 34 | o | o | o | o | o | o | o |
| Comparative Example 6 | x | x | x | x | x | x | partly soluble |
| Comparative Example 7 | x | x | x | x | x | x | x |

Note:
o: soluble
x: insoluble

TABLE 6

| | Diamine g (mol) | Acid anhydride g (mol) | η (dl/g) | Tg (°C.) | Mechanical Property*[1] | | | Solubility*[7] | | |
|---|---|---|---|---|---|---|---|---|---|---|
| | | | | | Ts (Kg/mm²) | El (%) | TM (Kg/mm²) | Chloroform | DNAC*[2] | m-Cresol |
| Example 35 | m,m'-ABB-DPD*[3] 25.03 (0.05) | BTDA*[6] 16.11(0.05) | 0.92 | 231 | 11.70 | 3.9 | 336 | o | o | o |
| Example 36 | m,m'-ABB-DBD*[4] 32.64 (0.05) | ↑ | 0.78 | 228 | 8.71 | 2.9 | 321 | o | o | o |
| Comparative Example 8 | m,m'-ABB*[5] 15.82 (0.05) | ↑ | 1.01 | 229 | 11.00 | 4.1 | 330 | x | x | partly soluble |

Note
*[1] Ts: Tensile strength
El: Elongation
TM: Tensile modulus
*[2] N,N-dimethylacetamide
*[3] 1,3-bis(3-amino-4-phenoxybenzoyl)benzene
*[4] 1,3 bis(3-amino-4-biphenoxybenzoyl)benzene
*[5] 1,3-bis(3-aminobenzoyl)benzene
*[6] 3,3',4,4'-benzophenonetetracarboxylic dianhydride
*[7] o: soluble x: insoluble

EXAMPLE 37

To a reaction vessel equipped with a stirrer, reflux condenser and nitrogen inlet tube, 35.69 g (0.09 mol) of 3,3'-diamino-4,4'-diphenoxybenzophenone, 2.13 g (0.01 mol) of 3,3'-diaminobenzophenone, 31.58 g (0.098 mol) of 3,3',4,4'-benzophenonetetracarboxylic dianhydride, 0.592 g (0.0045 mol) of phthalic anhydride, 1.40 g of γ-picoline and 284.82 g of m-cresol were charged. The mixture was heated to 150° C. with stirring in a nitrogen atmosphere and successively reacted at 150° C. for 4 hours while distilling out about 3.6 ml of water.

After finishing the reaction, the reaction mixture was cooled to room temperature and poured into about 2 l of methyl ethyl ketone.

Precipitated powder was filtered, washed with methyl ethyl ketone, and dried in air at 50° C. for 24 hours and successively in a nitrogen atmosphere at 230° C. for 4 hours to obtain 65.18 g (98.0% yield) of polyimide powder.

The polyimide powder thus obtained had an inherent viscosity of 0.55 dl/g, glass transition temperature of 244° C. and 5% weight loss temperature of 530° C.

The X-ray diffraction pattern(XRD) of the polyimide powder indicated an amorphous form.

Flow initiation temperature of the polyimide which was measured with a Koka type flow tester was 325° C.

In an adhesion test, the polyimide powder exhibited a lap shear strength of 152 kg/cm² at a press temperature of 280° C., 230 kg/cm² at 300° C., and 332 kg/cm² at 350° C.

Further, solubility of the polyimide powder was examined at room temperature. The polyimide powder was dissolved at a concentration of 20% by weight in chloroform, dichloromethane, carbon tetrachloride, N,N-dimethylformamide, N,N-dimethylacetamide, N-methyl-2-pyrrolidone and o-, m- and p-cresol.

EXAMPLES 38 TO 40

Various kinds of polyimide powder having a composition ratio illustrated in Table 7 were prepared by carrying out the same procedures as described in Example 37. The same evaluation as Example 37 was conducted. The results are illustrated in Table 7 together with the results of Example 37. Results on solubility test are illustrated in Table 8.

TABLE 7

| | Diamine g (mol) | Diamine g (mol) | Acid anhydride g (mol) | Yield (%) | η (dl/g) | Tg (°C.) | Tm (°C.) | Td(5.0)*[4] (°C.) | Flow initiation temperature (°C.) | XRD PATTERN |
|---|---|---|---|---|---|---|---|---|---|---|
| Example 37 | 3,3'-DABP-DPO*[1] 35.69 (0.09) | 3,3'-DABP*[2] 2.12 (0.01) | BTDA*[3] 31.58 (0.098) | 97.3 | 0.57 | 246 | no | 530 | 325 | amorphous |
| Example 38 | ↑ 27.76 (0.07) | ↑ 6.37 (0.03) | ↑ | 98.0 | 0.53 | 245 | ↑ | 535 | 325 | ↑ |
| Example 39 | ↑ 19.83 (0.05) | ↑ 10.62 (0.05) | ↑ | 98.5 | 0.55 | 245 | ↑ | 531 | 330 | ↑ |
| Example 40 | ↑ 11.90 (0.03) | ↑ 14.86 (0.07) | ↑ | 97.8 | 0.53 | 243 | ↑ | 529 | 330 | ↑ |

Note:
*[1] 3,3'-diamino-4,4'-diphenoxybenzophenone
*[2] 3,3'-diaminobenzophenone
*[3] 3,3'4,4'-benzophenonetetracarboxylic dianhydride
*[4] 5% weight loss temperature

TABLE 8

| | Organic solvent | | | | | | | |
|---|---|---|---|---|---|---|---|---|
| | Chloroform | Dichloro-methane | Carbon tetrachloride | 1,1,2-trichloroethane | N,N-Dimethyl-formamide | N,N-Dimethyl-acetamide | N-Methyl-2-pyrrolidone | m-cresol |
| Example 37 | o | o | o | o | o | o | o | o |
| Example 38 | o | o | o | o | o | o | o | o |
| Example 39 | o | o | o | o | o | o | o | o |
| Example 40 | partly soluble | partly soluble | partly soluble | partly soluble | o | o | o | o |

Note:
o: soluble
x: insoluble

EXAMPLES 41 TO 61

Various kinds of copolyimide were prepared from various diamine component and various tetracarboxylic dianhydride illustrated in Tables 9 and 12 by carrying out the same procedures as described in Example 37.

The same evaluation as Example 37 was conducted. The results are illustrated in Tables 10 and 13. Results on solubility test are illustrated in Tables 11 and 14.

EXAMPLE 62

To a vessel, 3 kg of polyimide powder obtained by the same procedures as Example 8, 3 kg of polyether sulfone VICTREX 4100G (Trade Mark of I.C.I. Ltd.) and 54 kg of m-cresol were charged and mixed for 24 hours at room temperature to obtain a polymer solution. To the polymer solution, 100 kg of methanol was added under strong stirring.

Precipitated polymer powder was filtered, washed with methanol and dried at 150° C. for 8 hours in a nitrogen atmosphere. Polyimide powder thus obtained was pelletized by melt-extruding at 380° C. with a single screw extruder having a bore diameter of 30 mm.

Pellets thus obtained were injection molded at a cylinder temperature of 370°~380° C., injection pressure of 500 kg/cm$^2$ and mold temperature of 180° C. to obtain tensile test specimens. Tensile test was carried out in accordance with ASTM D-638. Results are illustrated in Table 15.

TABLE 9

| | Diamine g (mol) | Diamine g (mol) | Acid anhydride g (mol) | Acid anhydride g (mol) |
|---|---|---|---|---|
| Example 41 | 3,3'-DABP-DPO 19.82 (0.05) | 3,3'-DABP-MPO 15.22 (0.05) | BTDA 31.58 (0.098) | no |
| Example 42 | 3,3'-DABP-MPO 15.22 (0.05) | 3,4'-DABP-MPO 15.22 (0.05) | ↑ | ↑ (0) |
| Example 43 | 3,3'-DABP-DBO 27.43 (0.05) | 3,4'-DABP-MBO 19.02 (0.05) | ↑ | ↑ (↑) |
| Example 44 | 3,3'-DABP-DPO 19.82 (0.05) | mm-ABB-DPO 25.03 (0.05) | ↑ | ↑ (↑) |
| Example 45 | mm-ABB-DPO 25.03 (0.05) | mm-ABB-DBO 32.64(0.05) | ↑ | ↑ (↑) |
| Example 46 | 3,3'-DABP-DPO 39.64 (0.1) | no | BTDA 16.11 (0.05) | PMDA 10.47 (0.048) |
| Example 47 | 3,3'-DABP-MPO 30.44 (0.1) | ↑ (0) | ↑ | BPDA 14.12 (↑) |
| Example 48 | mm-ABB-DPO 50.06 (0.1) | ↑ (↑) | ↑ | PMDA 10.47 (↑) |
| Example 49 | mm-ABB-DBO 65.28 (0.1) | ↑ (↑) | ↑ | BPDA 14.12 (↑) |
| Example 50 | 3,3'-DABP-DPO 19.82 (0.05) | 3,3'-DABP-MPO 15.22 (0.05) | ↑ | PMDA 10.47 (↑) |
| Example 51 | 3,3'-DABP-DBO 27.43 (0.05) | mm-ABB-DPO 25.03 (0.05) | PMDA 10.91 (0.05) | BPDA 14.12 (↑) |
| Example 52 | mm-ABB-DPO 25.03 (0.05) | mm-ABB-DBO 32.64 (0.05) | BTDA 16.11 (↑) | PMDA 10.47 (↑) |

Note: Abbreviations in Table 9 are the same as Tables 1 and 4.

TABLE 10

| | Yield (%) | η (dl/g) | Tg (°C.) | Tm (°C.) | Td(5.0) (°C.) | Flow initiation temperature (°C.) | XRD PATTERN |
|---|---|---|---|---|---|---|---|
| Example 41 | 98.3 | 0.51 | 248 | no | 536 | 325 | Amorphous |
| Example 42 | 97.6 | 0.53 | 246 | ↑ | 533 | 330 | ↑ |

TABLE 10-continued

| | Yield (%) | η (dl/g) | Tg (°C.) | Tm (°C.) | Td(5.0) (°C.) | Flow initiation temperature (°C.) | XRD PATTERN |
|---|---|---|---|---|---|---|---|
| Example 43 | 97.2 | 0.57 | 245 | ↑ | 542 | 330 | ↑ |
| Example 44 | 97.4 | 0.49 | 248 | ↑ | 530 | 325 | ↑ |
| Example 45 | 98.5 | 0.55 | 249 | ↑ | 527 | 330 | ↑ |
| Example 46 | 99.0 | 0.56 | 246 | ↑ | 547 | 325 | ↑ |
| Example 47 | 97.2 | 0.55 | 250 | ↑ | 533 | 335 | ↑ |
| Example 48 | 96.8 | 0.50 | 240 | ↑ | 529 | 310 | ↑ |
| Example 49 | 97.7 | 0.59 | 235 | ↑ | 527 | 315 | ↑ |
| Example 50 | 97.9 | 0.47 | 246 | ↑ | 551 | 330 | ↑ |
| Example 51 | 98.1 | 0.55 | 247 | ↑ | 538 | 330 | ↑ |
| Example 52 | 98.3 | 0.53 | 233 | ↑ | 526 | 320 | ↑ |

Note: *¹5% weight loss temperature

TABLE 11

| | Organic solvent | | | | | | | |
|---|---|---|---|---|---|---|---|---|
| | Chloroform | Dichloromethane | Carbon tetrachloride | 1,1,2-trichloroethane | N,N-Dimethylformamide | N,N-Dimethylacetamide | N-Methyl-2-pyrrolidone | m-cresol |
| Example 41 | o | o | o | o | o | o | o | o |
| Example 42 | o | o | o | o | o | o | o | o |
| Example 43 | o | o | o | o | o | o | o | o |
| Example 44 | o | o | o | o | o | o | o | o |
| Example 45 | o | o | o | o | o | o | o | o |
| Example 46 | o | o | o | o | o | o | o | o |
| Example 47 | o | o | o | o | o | o | o | o |
| Example 48 | o | o | o | o | o | o | o | o |
| Example 49 | o | o | o | o | o | o | o | o |
| Example 50 | o | o | o | o | o | o | o | o |
| Example 51 | o | o | o | o | o | o | o | o |
| Example 52 | o | o | o | o | o | o | o | o |

Note
o: soluble
x: insoluble

TABLE 12

| | Diamine g (mol) | Diamine g (mol) | Acid anhydride g (mol) | Acid anhydride g (mol) |
|---|---|---|---|---|
| Example 53 | 3,3'-DABP-DPO 35.68 (0.09) | 4,4'-ODA*¹ 2.00 (0.01) | BTDA 31.58 (0.098) | no |
| Example 54 | 3,3'-DABP-MPO 15.22 (0.05) | m-BP*² 18.42 (0.05) | ↑ | ↑ |
| Example 55 | 3,3'-DABP-DBO 27.43 (0.05) | APB*³ 14.62 (0.05) | ↑ | ↑ |
| Example 56 | mm-ABB-DPO 25.03 (0.05) | m-BP 18.42 (0.05) | ↑ | ↑ |
| Example 57 | 3,3'-DABP-DPO 35.68 (0.09) | 4,4'-ODA 2.00 (0.01) | PMDA 21.38 (0.098) | ↑ |
| Example 58 | 3,3'-DABP-MBO 19.02 (0.05) | m-BP 18.42 (0.05) | ↑ | ↑ |
| Example 59 | 3,3'-DABP-DMO 13.67 (0.05) | APB 14.62 (0.05) | BPDA ↑ 28.83 (0.098) | ↑ |
| Example 60 | 3,3'-DABP-DPO 35.68 (0.05) | n-BP 18.42 (0.05) | PMDA 10.91 (0.05) | BPDA 14.12 (0.048) |
| Example 61 | mm-ABB-DBO 32.64 (0.05) | APB 14.62 (0.05) | BTDA 16.11 (0.05) | 6FDA ↑ 21.33 (0.048) |

Note:
*¹: 4,4'-diaminodiphenylether
*²: 4,4'-bis(3-aminophenoxy)biphenyl
*³: 1,3-bis(3-aminophenoxy)benzene
Other Abbreviations are the same as Table 1

TABLE 13

| | Yield (%) | η (dl/g) | Tg (°C.) | Tm (°C.) | Td(5.0) (°C.) | Flow initiation temperature (°C.) | XRD PATTERN |
|---|---|---|---|---|---|---|---|
| Example 53 | 97.3 | 0.52 | 253 | mo | 530 | 330 | amorphous |
| Example 54 | 95.2 | 0.56 | 247 | ↑ | 524 | 325 | ↑ |
| Example 55 | 96.7 | 0.55 | 232 | ↑ | 550 | 320 | ↑ |
| Example 56 | 97.3 | 0.48 | 238 | ↑ | 548 | 320 | ↑ |
| Example 57 | 97.2 | 0.54 | 258 | ↑ | 537 | 340 | ↑ |
| Example 58 | 98.0 | 0.51 | 252 | ↑ | 538 | 335 | ↑ |
| Example 59 | 96.7 | 0.50 | 228 | ↑ | 551 | 330 | ↑ |
| Example 60 | 97.1 | 0.55 | 240 | ↑ | 543 | 330 | ↑ |
| Example 61 | 99.0 | 0.54 | 225 | ↑ | 539 | 320 | ↑ |

Note: Abbreviations in Table 9 are the same as Tables 1 and 4.

TABLE 14

| | Organic solvent | | | | | | | |
|---|---|---|---|---|---|---|---|---|
| | Chloroform | Dichloromethane | Carbon tetrachloride | 1,1,2-trichloroethane | N,N-Dimethylformamide | N,N-Dimethylacetamide | N-Methyl-2-pyrrolidone | m-cresol |
| Example 53 | o | o | o | o | o | o | o | o |
| Example 54 | o | o | o | o | o | o | o | o |
| Example 55 | o | o | o | o | o | o | o | o |
| Example 56 | o | o | o | o | o | o | o | o |
| Example 57 | o | o | o | o | o | o | o | o |
| Example 58 | o | o | o | o | o | o | o | o |
| Example 59 | o | o | o | o | o | o | o | o |
| Example 60 | o | o | o | o | o | o | o | o |
| Example 61 | o | o | o | o | o | o | o | o |

Note:
o; soluble
x; insoluble

EXAMPLES 63–67

Blending was carried out as illustrated in Table 15 by the same procedures as described in Example 62.

Evaluation was carried out by the same procedures as described in Example 62. Results are illustrated in Table 15 together with Example 62.

Comparative Example 9

A mixture composed of 3 kg of the polyimide powder obtained by the same procedures as Example 8 and 3 kg of polyether sulfone powder used in Example 62 were prepared by mixing these two materials as intact. The mixture was pelletized by extrusion as described in Example 62. The pellets thus obtained were pelletized again by melt-kneading with an extruder and injection molded to obtain tensile test specimens. Tensile properties were tested by the same procedures as described in Example 62 and results are illustrated in Table 15.

Comparative Example 10 and 11

Blending was carried out as illustrated in Table 15 by the same procedures as Comparative Example 9. Properties of the mixture were evaluated and results are illustrated in Table 15.

TABLE 15

| | Polyimide | | Other resin | | Tensile test | |
|---|---|---|---|---|---|---|
| | Example No. | Amount (kg) | polymer | Amount (kg) | TS*2 (kg/cm²) | El*3 (%) |
| Example 63 | 8 | 3 | polyether sulfone | 3 | 1750 | 30 |
| Example 64 | 8 | 4.5 | ↑ | 1.5 | 1200 | 20 |
| Example 65 | 31 | 3 | ↑ | 3 | 1180 | 28 |
| Example 66 | 31 | 4.5 | ↑ | 1.5 | 1230 | 23 |
| Example 67 | 8 | 3 | polyetherimide*1 | 3 | 1090 | 43 |
| Comparative Example 9 | 8 | 3 | polyether sulfone | 3 | 730 | 10 |
| Comparative Example 10 | 8 | 4.5 | ↑ | 1.5 | 820 | 8 |
| Comparative Example 11 | 31 | 3 | ↑ | 3 | 840 | 10 |

Note:
*1ULTEM T-1000 (Trade Mark of G E CO.)
*2Tensile strength
*3Elongation

Properties of polyimide in the further below examples were measured by the following methods.
Tg, Tc, Tm:
  Measured by DSC (Shimadzu DE-40 series, DSC-41M)
5% Weight loss temperature:
  Measured in air by DTG (Shimadzu DT-40 series, DTG-40M)
Inherent viscosity (ηinh):
  Polyimide powder was dissolved in a solvent mixture of p-chlorophenol/phenol in the ratio of 9/1 by weight into a concentration of 0.5 g/100 ml and measured at 35° C.
Tensile test of injection molded specimens:
  Measured in accordance with ASTM D-3039

Measuring conditions:

| RT · DRY ... | room temperature (18 ~ 25° C.) moisture absorption 0.2% or less |
| HOT · WET ... | high temperature (177° C. and 204° C.) moisture absorption 0.6 ± 0.1% |

Water absorption:
Measured in accordance with JIS K-7209
Viscosity:
Measured at room temperature with a viscometer Model E (Manufactured by Toki Sangyo Co.)
Melt initiation temperature:
Measured with a Shimadzu Type Flowtester (CFT 500A) under 100 kg load, at a temperature rise rate of 0.5° C./min
Melt viscosity:
Measured with a Shimadzu Koka Type Flowtester (CFT 500A) under 100 kg load
Adhesion test (tensile shear adhesive strength)

Polyimide powder was suspended in ethanol to form a paste. The paste was coated on two cold rolled steel panels (JIS G-3141 SPCC. SD. Size 1.6×25×100 mm). Two panels were adhered by pressing at 350° C. under 300 psi. Tensile shear strength of adhered specimens was measured in accordance with JIS K-6848.
Flexural strength and Flexural modulus:
Measured in accordance with ASTM D-790 at 25° C. and 200° C.

Synthetic Example 1

To a reaction vessel equipped with a stirrer, reflux condenser and a nitrogen inlet tube, 396.5 g (1.0 mol) of 3,3'-diamino-4,4'-diphenoxybenzophenone, 315.8 g (0.98 mol) of 3,3',4,4'-benzophenonetetracarboxylic dianhydride, 5.92 g (0.04 mol) of phthalic anhydride, 14.0 g of γ-picoline and 2849.2 g of m-cresol were charged and heated to 150° C. with stirring in a nitrogen atmosphere. Thereafter the mixture was reacted at 150° C. for 4 hours while distilling out about 30 ml of water.

After finishing the reaction, the reaction mixture was cooled to the room temperature, poured into about 20 liters of methyl ethyl ketone. The precipitated polyimide powder was filtered, washed with methyl ethyl ketone and dried in the air at 50° C. for 24 hours and in a nitrogen atmosphere at 230° C. for 4 hours. Polyimide powder obtained was 670 g (98.2% yield). Polyimide powder thus obtained had an inherent viscosity of 0.56 dl/g, a glass transition temperature of 246 and a 5% weight loss temperature of 524° C.

Synthetic Examples 2~12

Polyimide powder was prepared by carrying out the same procedures as described in Synthetic Example 1 except that aromatic diamine and aromatic tetracarboxylic dianhydride were used as illustrated in Table 1.

Table 16 illustrates aromatic diamine, tetracarboxylic dianhydride, yield, inherent viscosity, glass transition temperature and 5% weight loss temperature.

Synthetic Example 13

Polyimide powder was prepared by carrying out the same procedures as Synthetic Example 1 without using phthalic anhydride. Yield was 96.6%.

Table 16 illustrates yield, inherent viscosity, glass transition temperature and 5% weight loss temperature.

TABLE 16

| Synth. Examp. | Diamine | Acid dianhydride | Yield (%) | η inh (dl/g) | Tg (°C.) | Td$_{5.0}$ (°C.) |
|---|---|---|---|---|---|---|
| 1 | 3,3'-DABP-DPO*[1] | BTDA*[11] | 98.2 | 0.56 | 246 | 524 |
| 2 | 3,3'-DABP-MPO*[2] | BTDA | 97.4 | 0.59 | 248 | 533 |
| 3 | 3,4'-DABP-MPO*[3] | BTDA | 98.0 | 0.58 | 263 | 529 |
| 4 | 3,3'-DABP-DBO*[4] | BTDA | 95.6 | 0.48 | 243 | 525 |
| 5 | 3,3'-DABP-MBO*[5] | BTDA | 98.3 | 0.56 | 248 | 535 |
| 6 | 3,4'-DABP-MPO*[6] | BTDA | 97.7 | 0.55 | 258 | 530 |
| 7 | m,m-ABB-DPO*[7] | PMDA*[12] | 95.5 | 0.66 | 256 | 527 |
| 8 | m,m-ABB-DPO | BTDA | 95.5 | 0.75 | 233 | 522 |
| 9 | m,m-ABB-DBO*[8] | PMDA | 96.2 | 0.71 | 248 | 527 |
| 10 | m,m-ABB-DBO | BTDA | 97.3 | 0.73 | 237 | 523 |
| 11 | 3,3'-DABP*[9] | BTDA | 97.5 | 0.56 | 245 | 554 |
| 12 | m,m-ABB*[10] | BTDA | 96.1 | 0.49 | 219 | 551 |
| 13 | 3,3'-DABP-DPO | BTDA | 96.6 | 0.61 | 252 | 520 |

Note:
*[1]3,3'-diamino-4,4'-diphenoxybenzophenone
*[2]3,3'-diamino-4-phenoxybenzophenone
*[3]3,4'-diamino-4-phenoxybenzophenone
*[4]3,3'-diamino-4,4'-dibiphenoxybenzophenone
*[5]3,3'-diamino-4-biphenoxybenzophenone
*[6]3,4'-diamino-4-biphenoxybenzophenone
*[7]1,3-bis(3-amino-4-phenoxybenzoyl)benzene
*[8]1,3-bis(3-amino-4-biphenoxybenzoyl)benzene
*[9]3,3'-diaminobenzophenone
*[10]1,3-bis(3-aminobenzoyl)benzene
*[11]3,3',4,4'-benzophenonetetracarboxylic dianhydride
*[12]pyromellitic dianhydride

EXAMPLE 68

Polyimide obtained in Synthetic Example 1 was dissolved in N,N-dimethylformamide (DMF) in a concentration of about 30% by weight. For 100 parts by weight of the polyimide powder, 40 parts by weight of carbon fiber HTA-C6 (manufactured by Toho Rayon Co.) was dispersed with stirring in the solution thus obtained. The resulting polyimide resin mixture was poured with vigorous stirring into methyl ethyl ketone which is about 15 times the weight of polyimide powder. The precipitate was filtered and dried at 200° C. for about 4 hours in a nitrogen atmosphere to obtain a polyimide/carbon fiber mixture. The mixture thus obtained was melt-kneaded with a single screw extruder having 30 mon in diameter. Delivered strand was air cooled and cut into pellets. The pellets were injection molded with an Arburg injection molding machine at injection pressure of 500 kg/cm$^2$, cylinder temperature of 410° C. and mold temperature of 180° C. to obtain JIS No.1 dumbbell specimens. The polyimide/carbon fiber mixture obtained above had moisture absorption of 0.73%.

As mentioned above, the tensile test of the specimens were carried out at room temperature under dry state (hereinafter referred to as RT.DRY) and at high temperatures of 177° C. and 204° C. under moist state (hereinafter referred to as HOT.WET). Results are illustrated in Table and indicate that tensile strength in HOT.WET is maintained at about 80% of tensile strength in RT.DRY.

EXAMPLES 69~78

Polyimide powder obtained in Synthetic Examples 2~10 and 13 were used. Test specimens were prepared by carrying out the same procedures as Example 68. These specimens were used for the same tensile test as carried out in Example 17. Results are illustrated in Table 17 together with moisture absorption.

The results illustrate that tensile strength in HOT.WET is maintained at about 80~90% of tensile strength in RT.DRY.

Comparative Examples 12 and 13

Polyimide powder obtained in Synthetic Examples 11 and 12 were insoluble in DMF. Thus, the resin mixture having equal ratio to that of Example 68 was prepared by using a drum blender (manufactured by Kawata Seisakusho Co.)

Test specimens were prepared by carrying out the same procedures as Example 68 and the same tensile test was conducted. Results are illustrated in Table 17 together with the results of moisture absorption. The results illustrate that polyimide obtained in Synthetic Examples 11 and 12 maintains tensile strength in HOT.WET at about 60% of tensile strength in RT.DRY.

Comparative Examples 14 and 15

Resin compositions outside the scope of the invention were prepared by using polyimide obtained in Synthetic Example 1. Specimens were prepared from the resin composition and tensile test was carried out by the same procedures as above. Results are illustrated in Table 17.

As compared with the case of using carbon fiber within the range of the invention, use of smaller amounts led to reduction of tensile strength and use of excessive amounts made injection molding impossible.

TABLE 17

| Synthetic Example No. | Polyimide /Carbon fiber wt. part | Moisture absorption (%) | Tensile strength (kgf/mm$^2$)*$^1$ | | |
|---|---|---|---|---|---|
| | | | RT-DRY | 177° C. -WET | 204° C. -WET |
| Example 68 | 1 | 100/40 | 0.73 | 30.6 | 27.7 | 25.5 |
| Example 69 | 2 | ↑ | 0.83 | 30.4 | 27.0 | 25.7 |
| Example 70 | 3 | ↑ | 0.79 | 32.5 | 30.0 | 28.4 |
| Example 71 | 4 | ↑ | 0.64 | 30.3 | 29.1 | 28.0 |
| Example 72 | 5 | ↑ | 0.69 | 30.4 | 29.4 | 28.2 |
| Example 73 | 6 | ↑ | 0.68 | 32.2 | 30.0 | 28.8 |
| Example 74 | 7 | ↑ | 0.88 | 30.7 | 28.7 | 24.3 |
| Example 75 | 8 | ↑ | 0.92 | 29.2 | 27.9 | 23.6 |
| Example 76 | 9 | ↑ | 0.83 | 30.6 | 28.6 | 25.0 |
| Example 77 | 10 | ↑ | 0.88 | 29.0 | 27.9 | 23.1 |
| Example 78 | 13 | ↑ | 0.75 | 31.9 | 29.5 | 28.9 |
| Comparative Example 12 | 11 | ↑ | 2.02 | 29.8 | 21.3 | 19.2 |
| Comparative Example 13 | 12 | ↑ | 1.91 | 29.3 | 20.1 | 19.2 |
| Comparative Example 14 | 1 | 100/3 | — | 24.3 | no measurement | |
| Comparative Example 15 | ↑ | 100/7 | — | injection molding impossible | | |

| Synthetic Example No. | Polyimide/Carbon fiber wt. part | Moisture absorption (%) | Retention of tensile strength (%) | |
|---|---|---|---|---|
| | | | 177° C. | 204° C. |
| Example 68 | 1 | 100/40 | 0.73 | 90.5 | 83.3 |
| Example 69 | 2 | ↑ | 0.83 | 88.8 | 84.5 |
| Example 70 | 3 | ↑ | 0.79 | 93.2 | 87.4 |
| Example 71 | 4 | ↑ | 0.64 | 96.0 | 92.4 |
| Example 72 | 5 | ↑ | 0.69 | 96.7 | 92.8 |
| Example 73 | 6 | ↑ | 0.68 | 93.2 | 89.4 |
| Example 74 | 7 | ↑ | 0.88 | 93.5 | 79.2 |
| Example 75 | 8 | ↑ | 0.92 | 95.5 | 80.8 |
| Example 76 | 9 | ↑ | 0.83 | 93.5 | 81.7 |
| Example 77 | 10 | ↑ | 0.88 | 96.2 | 79.7 |
| Example 78 | 13 | ↑ | 0.75 | 92.8 | 90.6 |
| Comparative Example 12 | 11 | ↑ | 2.02 | 71.5 | 64.4 |
| Comparative Example 13 | 12 | ↑ | 1.91 | 68.6 | 58.4 |

TABLE 17-continued

| Comparative Example 14 | 1 | 100/3 | — | — |
| Comparative Example 15 | ↑ | 100/7 | — | — |

Note
*$^1$RT.DRY: 18–25° C., moisture absorption 0.2 or less
*$^2$177° C. · WET: 177° C., moisture absorption 0.6 ± 0.1%
*$^3$204° C. · WET: 177° C., moisture absorption 0.6 ± 0.1 %

EXAMPLE 79

Polyimide used for the surface modifier composed of 3,3'-diamino-5,5'-phenoxybenzophenone as a diamine component and 3,3',4,4'-benzophenonetetracarboxylic dianhydride as an acid anhydride component, had a ηinh of 0.45 dl/g. Tg of 245° C., flow initiation temperature of 325° C., melt viscosity at 380° C. of 13500 poise, and tensile shear strength of 332 kg/mm$^2$.

A polyimide solution was prepared by dissolving 20 g of polyimide in 80 g of N,N-dimethylformamide at room temperature in a nitrogen atmosphere. The polyimide solution obtained had viscosity of 5000 cps.

A woven fabric of carbon fiber (Toreca T300, KPL) was coated and impregnated with the polyimide solution.

Thereafter the impregnated woven fabric was heated to 170° C. for about 2 hours in a nitrogen atmosphere to remove the solvent. The woven fabric of carbon fiber impregnated with polyimide (prepreg sheet) had a degree of impregnation of about 10% by weight.

Eight prepreg sheets were laminated and compression molded at 350° C. under pressure of 50 kg/cm$^2$ for 30 minutes to obtain a polyimide/carbon fiber composite having a thickness of about 2.5 mm. A cut surface of the composite obtained was inspected under an optical microscope. Voids and other defects were not observed. Flexural strength and flexural modulus of the composite were individually 89 kg/mm$^2$ and 7400 kg/mm$^2$ at 25° C., and 81 kg/mm$^2$ and 6600 kg/mm$^2$ at 200° C.

EXAMPLES 80–89

Soluble polyimide obtained by using the diamine component and anhydride component as illustrated in Table 18 were used. Polyimide impregnated carbon fiber composite was prepared by carrying out the same procedures as described in Example 79. Table 18 illustrates diamine component and acid anhydride component; inherent viscosity, glass transition temperature (Tg), flow initiation temperature, melt viscosity at 380° C. and tensile shear strength of polyimide powder; viscosity of polyimide solution; and presence or absence of voids, flexural strength and flexural modulus of composite.

Comparative Example 16

Polyimide composed of 3,3'-diaminobenzophenone as a diamine component and 3,3',4,4'-benzophenonetetracarboxylic dianhydride as an acid anhydride component and which had an ηinh of 0.44 dl/g and a glass transition temperature of 240° C., was attempted to be dissolved in N,N-dimethylformamide into a concentration of 20% by weight as carried out in Example 79. However, the polyimide was quite insoluble and thus impregnation of fibrous reinforcement with the polyimide solution was impossible.

Comparative Example 17

The same carbon fiber woven fabric as used in Example 79 was melt-impregnated by hot-pressing at 350° C. under pressure of 50 kg/mm² with the same polyimide powder as used in Comparative Example 16 which had a melt initiation temperature of 325° C. and melt viscosity at 380° C. of 12000 poise to prepare a prepreg sheet.

Eight prepreg sheets thus obtained were laminated as carried out in Example 79 to obtaine a polyimide/carbon fiber composite having a thickness of about 2.5 mm. A cut surface of the composite obtained was inspected under an optical microscope. Voids were observed.

Flexural strength and flexural modulus of the composite were individually 63 kg/mm² and 5000 kg/mm² at 25° C. Thus, mechanical properties of the composite were inferior to those of the polyimide/carbon fiber composite in the above examples.

Comparative Example 18

Polyimide composed of 1,3-bis(3-aminobenzoyl)benzene as a diamine component and 3,3',4,4'-benzophenonetetracarboxylic dianhydride as an acid anhydride component and which had an ηinh of 0.42 dl/g and a glass transition temperature of 228° C., was attempted to be dissolved in N,N-dimethylformamide into a concentration of 20% by weight as carried out in Example 79. However, the polyimide was quite insoluble and thus impregnation of fibrous reinforcement with the polyimide solution was impossible.

Comparative Example 19

The same carbon fiber woven fabric as used in Example 79 was melt-impregnated by hot-pressing at 350° C. under pressure of 50 kg/mm² with the same polyimide powder as used in Comparative Example 18 which had a melt initiation temperature of 310° C. and melt viscosity at 380° C. of 8200 poise to prepare a prepreg sheet.

Eight prepreg sheets thus obtained were laminated as carried out in Example 79 to obtain a polyimide/carbon fiber composite having a thickness of about 2.5 mm.

A cut surface of the composite obtained was inspected under an optical microscope. Voids were observed.

Flexural strength and flexural modulus of the composite were individually 57 kg/mm² and 4800 kg/mm² at 25° C.

Thus, mechanical properties properties of the composite were inferior to those of the polyimide/carbon fiber composite in the above examples.

Comparative Example 20

A marketed polyetherimide, ULTEM-1000 (manufactured by General Electric Co., ηinh=0.60 dl/g) was used to carry out solution impregnation of a carbon fiber woven fabric by the same procedures as described in Example 79. However, polyetherimide had a relatively low glass transition temperature of 216° C.

Thus, heat-resistance and mechanical properties of the composite were inferior to those of the composite prepared in the the above examples.

Results are illustrated in Table 18.

TABLE 18

| | Diamine | Acid dianh-ydride | η inh (dl/g) | Tg (°C.) | FST*[1] (°C.) | Melt viscosity 380 °C. (poise) | LSS*[2] (kg/cm²) |
|---|---|---|---|---|---|---|---|
| Example 79 | 3,3'-DABP-DPO*[3] | BTDA *4 | 0.45 | 245 | 325 | 13500 | 332 |
| Example 80 | 3,3'-DABP-MPO*[5] | ↑ | 0.47 | 243 | 320 | 12400 | 325 |
| Example 81 | 3,4'-DABP-MPO*[6] | ↑ | 0.44 | 266 | 340 | 15900 | 320 |
| Example 82 | 3,3'-DABP-DBO*[7] | ↑ | 0.42 | 243 | 320 | 10800 | 316 |
| Example 83 | 3,3'-DPBP-MBO*[8] | ↑ | 0.44 | 245 | 325 | 11700 | 302 |
| Example 84 | 3,3'-DABP-MBO*[9] | ↑ | 0.45 | 259 | 340 | 13000 | 301 |
| Example 85 | 3,3'-DABP-DMO*[10] | ↑ | 0.45 | 244 | 325 | 13200 | 328 |
| Example 86 | 3,3'-DABP-MMO*[11] | ↑ | 0.48 | 246 | 320 | 12500 | 330 |
| Example 87 | 3,4'-DABP-MMO*[12] | ↑ | 0.47 | 263 | 340 | 14800 | 304 |
| Example 88 | m,m-AMB-DPO*[13] | ↑ | 0.47 | 233 | 315 | 9500 | 296 |
| Example 89 | m,m-AMB-DBO*[14] | ↑ | 0.44 | 229 | 315 | 8900 | 290 |
| Compara. example 20 | G. E. Ultem 1000 | | 0.60 | 216 | 295 | 5200 | 265 |

| | Diamine | Acid dianh-ydride | Void | Flex. strength (kg/mm²) 25° C. 200° C. (Retention) | Flex. modulus (kg/mm²) 25° C. 200° C. (Retention) |
|---|---|---|---|---|---|
| Example 79 | 3,3'-DABP-DPC*[3] | BTDA *4 | no | 89  81 (91.0) | 7400  6600 (89.2) |
| Example 80 | 3,3'-DABP-MPO*[5] | ↑ | ↑ | 85  79 (92.9) | 8100  6900 (85.2) |

TABLE 18-continued

| | | *1 | *2 | | | | |
|---|---|---|---|---|---|---|---|
| Example 81 | 3,4'-DABP-MPO*6 | ↑ | ↑ | 86 (89.5) | 77 | 7800 (83.3) | 6500 |
| Example 82 | 3,3'-DABP-DBO*7 | ↑ | ↑ | 83 (88.0) | 73 | 7200 (84.7) | 6100 |
| Example 83 | 3,3'-DPBP-MBO*8 | ↑ | ↑ | 84 (95.2) | 80 | 8000 (83.8) | 6700 |
| Example 84 | 3,3'-DABP-MBO*9 | ↑ | ↑ | 83 (90.4) | 75 | 7300 (82.2) | 6000 |
| Example 85 | 3,3'-DABP-DMO*10 | ↑ | ↑ | 86 (93.0) | 80 | 8200 (80.5) | 6600 |
| Example 86 | 3,3'-DABP-MMO*11 | ↑ | ↑ | 85 (89.4) | 76 | 8000 (80.0) | 6400 |
| Example 87 | 3,4'-DABP-MMO*12 | ↑ | ↑ | 84 (88.1) | 74 | 7600 (82.9) | 6300 |
| Example 88 | m,m-AMB-DPO*13 | ↑ | ↑ | 74 (87.8) | 65 | 7000 (84.3) | 5900 |
| Example 89 | m,m-AMB-DBO*14 | ↑ | ↑ | 77 (88.3) | 68 | 7300 (82.2) | 6000 |
| Compara. example 20 | G. E. Ultem 1000 | | ↑ | 64 (82.8) | 53 | 5500 (81.8) | 4500 |

Note
*1 Flow initiation temperature
*2 Tensile shear adhesive strength (23° C., 50% RH)
*3 3,3'-diamino-4,4'diphenoxybenzophenone
*4 3,3',4,4'-benzophenonetetracarboxylic dianhydride
*5 3,3'-diamino-4-phenoxybenzophenone
*6 3,4'-diamino-4-phenoxybenzophenone
*7 3,3'-diamino-4,4'-dibiphenoxybenzophenone
*8 3,3'-diamino-4-biphenoxybenzophenone
*9 3,4'-diamino-4-biphenoxybenzophenone
*10 3,3'-diamino-4,4'-dimethoxybenzophenone
*11 3,3'-diamino-4-methoxybenzophenone
*12 3,4'-diamino-4-methoxybenzophenone
*13 1,3-bis(3-amino-4-phenoxy)benzene
*14 1,3-bis(3-amino-4-biphenoxy)benzene

What is claimed is:

1. An aromatic nitro compound of the formula (11):

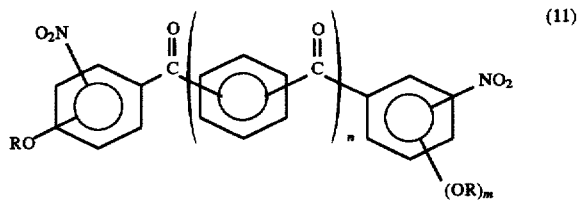
(11)

wherein m and n are individually an integer of 0 or 1, and R is

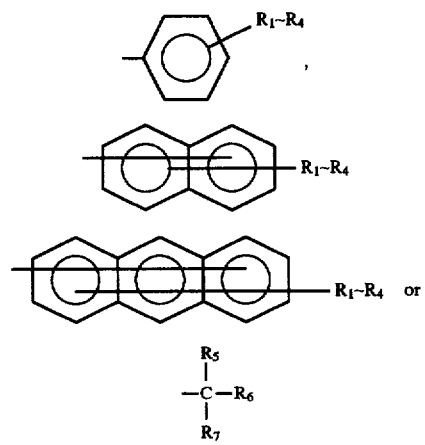

wherein $R_1$, $R_2$, $R_3$ and $R_4$ are individually a hydrogen atom, halogen atom, alkyl having 1 to 8 carbon atoms, aryl, alkenyl, aralkyl or alkoxy having 1 to 5 carbon atoms, and $R_5$, $R_6$ and $R_7$ are individually a hydrogen atom, alkyl having 1 to 8 carbon atoms, aryl, alkenyl, aralkyl or δ-alkyloxyoligo-(alkyleneoxy)alkyl having 1 to 10 carbon atoms and 1 to 3 oxygen atoms with the proviso that $R_5$, $R_6$ and $R_7$ are not all hydrogen.

2. An aromatic diamino compound of the formula (7):

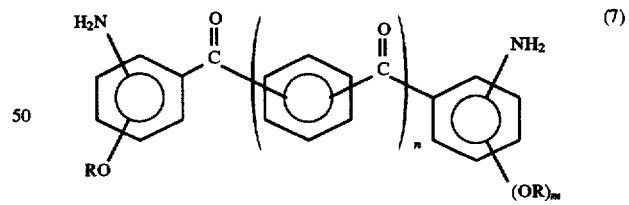
(7)

wherein m and n are individually an integer of 0 or 1, and R is

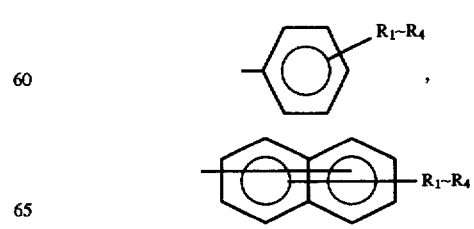

-continued

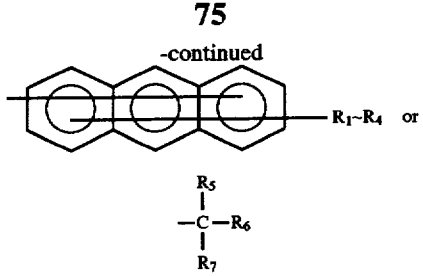

wherein $R_1$, $R_2$, $R_3$ and $R_4$ are individually a hydrogen atom, halogen atom, alkyl having 1 to 8 carbon atoms, aryl, alkenyl, aralkyl or alkoxy having 1 to 5 carbon atoms, and $R_5$, $R_6$ and $R_7$ are individually a hydrogen atom, alkyl having 1 to 8 carbon atoms, aryl, alkenyl, aralkyl or ω-alkyloxyoligo(alkyleneoxy)alkyl having 1 to 10 carbon atoms and 1 to 3 oxygen atoms with the proviso that $R_5$, $R_6$ and $R_7$ are not all hydrogen.

3. An aromatic diamino compound of claim 2 wherein the aromatic diamino compound of the formula (7) is represented by the formula (12):

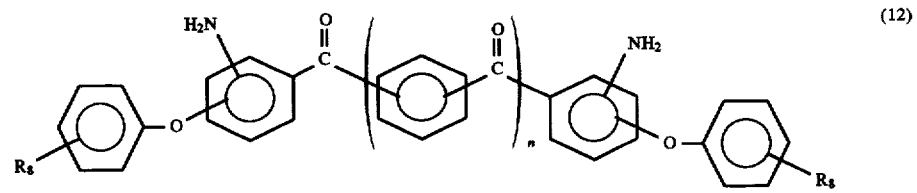

(12)

wherein n is an integer of 0 or 1, and $R_8$ is a hydrogen atom, halogen atom, alkyl of 1 to 4 carbon atoms, alkoxy and phenyl.

4. An aromatic diamine compound of claim 2 wherein the aromatic diamino compound of the formula (7) is represented by the formula (13):

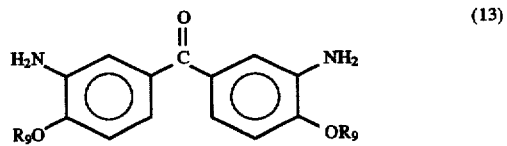

(13)

wherein $R_9$ is

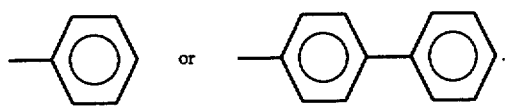

5. An aromatic diamine compound of claim 2 wherein the aromatic diamino compound of the formula (7) is represented by the formula (14):

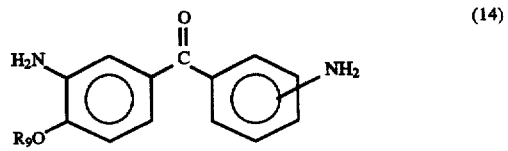

(14)

wherein $R_9$ is

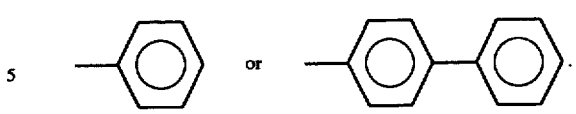

6. An aromatic diamine compound of claim 2 wherein the aromatic diamino compound of the formula (7) is represented by the formula (15):

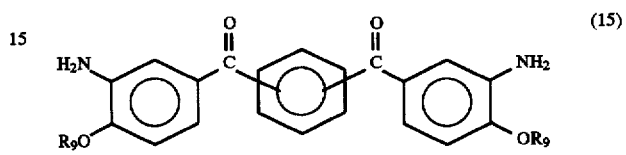

(15)

wherein $R_9$ is

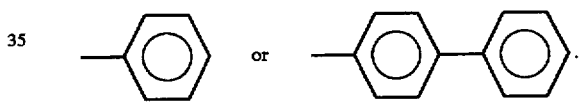

7. A preparation process of an aromatic diamino compound of the formula (7):

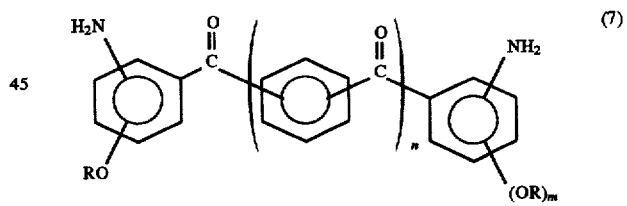

(7)

wherein m and n are individually an integer of 0 or 1, and R is

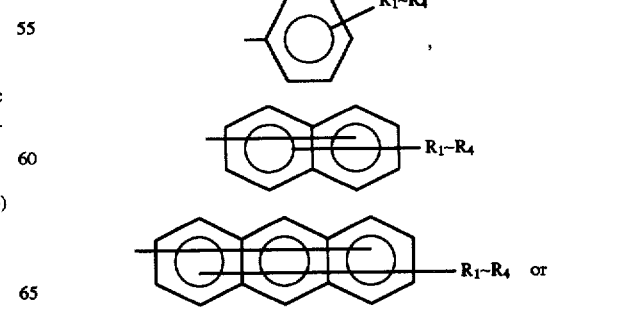

-continued

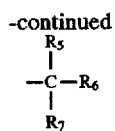

wherein $R_1$, $R_2$, $R_3$ and $R_4$ are individually a hydrogen atom, halogen atom, alkyl having 1 to 8 carbon atoms, aryl, alkenyl, aralkyl or alkoxy having 1 to 5 carbon atoms, and $R_5$, $R_6$ and $R_7$ are individually a hydrogen atom, alkyl having 1 to 8 carbon atoms, aryl, alkenyl, aralkyl or ω-alkyloxyoligo-(alkyleneoxy)alkyl having 1 to 10 carbon atoms and 1 to 3 oxygen atoms, comprising carrying out condensation of a dinitro compound of the formula (16):

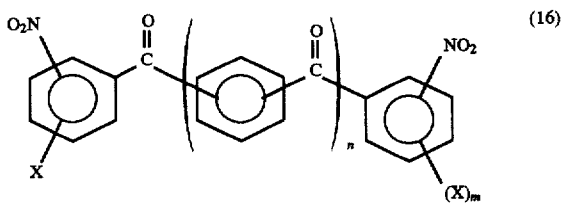

wherein X is halogen atom and m and n are individually an integer of 0 or 1, and a hydroxy compound of the formula (17):

R—OH         (17)

wherein R is the same as above, in an aprotic polar solvent in the presence of a base to obtain an aromatic dinitro compound of the formula (11):

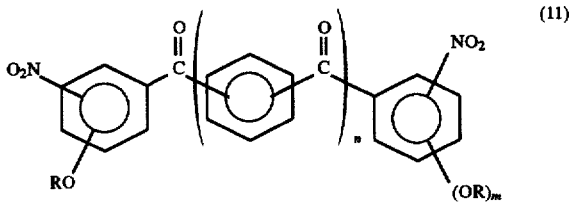

wherein R, m and n are the same as above, and successively reducing the aromatic dinitro compound.

* * * * *

UNITED STATES PATENT AND TRADEMARK OFFICE
CERTIFICATE OF CORRECTION

PATENT NO. : 5,710,334
DATED : January 20, 1998
INVENTOR(S) : Yuko ISHIHARA et al It is certified that error appears in the above-identified patent and that said Letters Patent is hereby corrected as shown below:

In claim 1, column 74, line 41, delete "δ" and insert -- ω --.

Signed and Sealed this

Eighth Day of December, 1998

Attest:

BRUCE LEHMAN

Attesting Officer          Commissioner of Patents and Trademarks